(12) United States Patent
Zheng et al.

(10) Patent No.: US 8,753,426 B2
(45) Date of Patent: Jun. 17, 2014

(54) POLYMERS, POLYMER MEMBRANES AND METHODS OF PRODUCING THE SAME

(75) Inventors: Shiying Zheng, Center Valley, PA (US); Jeffrey Raymond Quay, Kutztown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 134 days.

(21) Appl. No.: 13/566,535

(22) Filed: Aug. 3, 2012

(65) Prior Publication Data

US 2014/0033918 A1    Feb. 6, 2014

(51) Int. Cl.
| B01D 53/22 | (2006.01) |
| B01D 71/64 | (2006.01) |
| C08G 73/10 | (2006.01) |
| C08G 73/18 | (2006.01) |
| C08G 73/22 | (2006.01) |

(52) U.S. Cl.
USPC ............. 95/51; 95/45; 95/53; 95/54; 95/55; 96/4; 96/8; 96/10; 96/13; 96/14; 528/312; 528/322

(58) Field of Classification Search
USPC ............ 95/45, 51, 52, 53, 54; 96/4, 8, 10, 13, 96/14; 528/312, 322
See application file for complete search history.

(56) References Cited

U.S. PATENT DOCUMENTS

| 3,133,132 | A |   | 5/1964 | Loeb et al. |
| 4,728,345 | A |   | 3/1988 | Murphy |
| 5,085,676 | A |   | 2/1992 | Ekiner et al. |
| 5,098,985 | A | * | 3/1992 | Harris et al. ............... 528/128 |
| 5,104,532 | A |   | 4/1992 | Thompson et al. |
| 5,120,825 | A | * | 6/1992 | Vora et al. ................ 528/350 |
| 5,288,304 | A |   | 2/1994 | Koros et al. |
| 7,259,230 | B2 | * | 8/2007 | Klaehn et al. ............. 528/423 |
| 8,013,103 | B2 |   | 9/2011 | Lee et al. |
| 2004/0247974 | A1 | * | 12/2004 | Uensal et al. ............... 521/27 |
| 2009/0286078 | A1 | * | 11/2009 | Lee et al. .................... 428/364 |
| 2009/0286904 | A1 |   | 11/2009 | Lee et al. |
| 2010/0133187 | A1 | * | 6/2010 | Liu et al. ................... 95/45 |

OTHER PUBLICATIONS

Park, Ho Bum, Polymers With Cavities Tuned for Fast Selective Transport of Small Molecules and Ions, www.sciencemag.org, Science vol. 318, Oct. 12, 2007, pp. 254-258.
Freeman, Benny D., Basis of Permeability/Selectivity Tradeoff Relations in Polymeric Gas Separation Membranes, Macromolecules, 1999, vol. 32, pp. 375-380. Published on web Jan. 5, 1999.
Robeson, Lloyd M., The Upper Bound Revisited, Journal of Membrane Science, vol. 320, 2008, pp. 390-400.
Roberson, Lloyd M., Correlation of Separation Factor Versus Permeability for Polymeric Membranes, Journal of Membrane Science, vol. 62, 1991, pp. 165-185.

\* cited by examiner

*Primary Examiner* — Jason M Greene
(74) *Attorney, Agent, or Firm* — Eric J. Schaal; Larry S. Zelson

(57) ABSTRACT

The invention describes a polymeric material comprising repeating units of Formulae I-III and methods of preparation. Novel polymeric materials, gas separation membranes and fluid component separation methods are also described.

Formula I

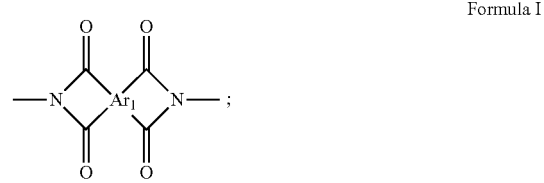

Formula II

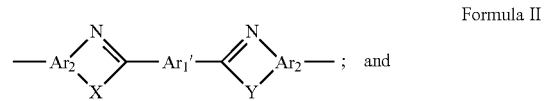

and

Formula III

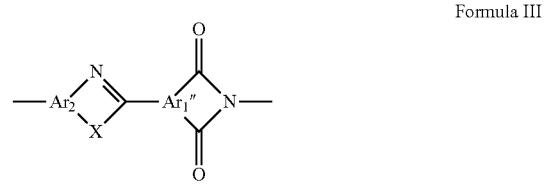

20 Claims, 5 Drawing Sheets

TGA of dry P2 solid. The solid was dried under this condition: ramp to 250 °C from room temperature at 10 °C/min, hold for 2 hours.

$^{13}$CNMR of P2 solid dissolved in d6-DMSO.

TGA of dried P5 film. Film was dried under this condition: ramp to 250 °C from room temperature at 10 °C/min, hold for 2 hours.

POLYMERS, POLYMER MEMBRANES AND METHODS OF PRODUCING THE SAME

BACKGROUND OF THE INVENTION

The present invention relates to polymeric materials, a method for preparation of the polymeric materials, and the separation of mixtures using polymer membranes fabricated from the polymeric materials.

Polymer membranes have been utilized for various separations including gas separation as well as liquid separation. Membrane-based gas separation has become an important alternative to well-established separation operations, such as cryogenic distillation, and adsorption processes. Membrane-based gas separation is a pressure-driven process that does not require a high energy cost phase change of the feed gas mixture, as in other separation operations. Moreover, the mechanical simplicity and small footprint of membrane-based gas separation units provides a great deal of flexibility in installation and operation.

Such advantages have led to a wide range of applications for membrane-based gas separations. These separations include the gas pair (i.e., mixtures of at least two gases to be separated): $O_2/N_2$, $H_2/N_2$, $H_2/CH_4$, $CO_2/CH_4$, $H_2O/air$, $He/air$, $He/N_2$, $He/CH_4$, $He/H_2$, $He/CO_2$, $H_2/CO_2$, $H_2S/natural$ gas and $H_2O/natural$ gas. With increasing costs of energy and environmental concerns regarding $CO_2$ separation, collection, and sequestration, gas membrane separation offers significant promise in present and emerging industries. One emerging environmental application could involve membrane $CO_2/N_2$ separation of flue gas to allow for $CO_2$ collection and sequestration.

The choice of a membrane material for gas separation applications is based on specific physical and chemical properties, since these materials should be tailored in an advanced way to separate particular gas mixtures. Commercial gas separation modules generally employ organic polymers as asymmetric non-porous membranes. The polymeric membrane materials are typically used in processes in which a feed gas mixture contacts the upstream side of the membrane, resulting in a permeate mixture on the downstream side of the membrane with a greater mole fraction of one of the components than the composition of the original feed gas mixture. A pressure differential is maintained between the upstream and downstream sides, providing the driving force for permeation. The downstream side can be maintained as a vacuum, or at any pressure below the upstream pressure.

The membrane performance is characterized by permeability and selectivity. Permeability (P) is the rate at which any gas component permeates through the membrane. The separation of a gas mixture is achieved by a membrane material that permits a faster permeation rate for one component (i.e., higher permeability) over that of another component. The efficiency of the membrane in enriching a component over another component in the permeate stream can be expressed as a quantity called selectivity. Selectivity (S) can be defined as the ratio of the permeabilities of the gas components across the membrane. The selectivity is a key parameter to achieve high product purity at high recoveries. A membrane's permeability and selectivity are material properties of the membrane material itself, and thus these properties are ideally constant with feed pressure, flow rate and other process conditions. However, permeability and selectivity are both temperature-dependent. It is desired to develop membrane materials with a high selectivity (efficiency) for the desired component, while maintaining a high permeability (productivity) for the desired component.

Typically, polymeric membranes show relatively high selectivity and low permeability (throughput) when compared to porous materials, due to their low free volume. Polymer free volume, the fraction of the volume not occupied by the electronic clouds of the polymer, plays an important role in the transport properties of low molecular weight species and gases.

Almost all industrial gas separation membrane processes utilize glassy polymers because of relatively high gas selectivity and good mechanical properties. In glassy polymers, the more permeable species are those with low molecular diameter and selectivity is due to differences in molecular dimension. Medium to high free volume glassy polymers (e.g., polyimides, polyphenyleneoxides, poly(trimethylsilylpropyne), etc.) are used to produce membranes since the higher free volume aids the transport of gas or liquid through the material.

In addition to the overall amount of free volume, polymer membrane properties are also influenced by the size distribution and shape of free volume structure represented by microcavities, pores, and channels. In amorphous polymer, the size distribution and shape of free volume structures are not uniform. The broad size range and shape preclude the possibility of achieving both high selectivity and high permeability simultaneously. Thus, typical polymeric membranes generally undergo a trade-off limitation between permeability and selectivity: as selectivity increases, permeability decreases, and vice versa. Robeson showed in several references (L. M. Robeson, J. Mem. Sci. 62, 195 (1991); B. D. Freeman, Macromolecules 32, 375 (1999); L. M. Robeson, J. Mem. Sci. 320, 375 (2008)) that as for small gaseous molecules (e.g., $O_2$, $N_2$, $CO_2$, and $CH_4$) a superior limit or "upper bound" exists in a selectivity/permeability diagram. To achieve higher selectivity/permeability combinations, materials that do not obey those simple rules would be required.

A recent publication has noted that the upper bound can be exceeded with a polymer system that is thermally rearranged to promote main chain heterocyclic structures not present in the precursor polymer (Park et al., Science 318, 254 (2007)). It was noted that the pore size distribution in the thermally rearranged polymer is much narrower than in the precursor polymer, yielding molecular sieving like permeability/selectivity properties. It is believed by Park et al. that the thermal rearrangement process, not the removal of volatile gas $CO_2$, leads to a pore size distribution narrower than the original membrane. Increasing free volume leads to increased permeability and decreasing the pore size distribution in polymers leads to increased selectivity. However, high degree of thermal rearrangement led to high crosslinking and polymer densification which in turn compromised the mechanical properties of the polymer such as tensile strength and elongation to break. Methods to achieve both high permeability and selectivity simultaneously while maintaining mechanical strength are highly desired.

Despite the foregoing developments, there is still room in the membrane separation art for further improvements.

Thus, in the design of polymeric membranes for gas separation, it is desired to increase free volume by providing pore and cavity sizes having a narrower distribution than that typically achieved with solution casting or melt processing of polymers.

It is therefore desired to provide a polymer with increased free volume and a narrow size distribution of the free volume structure, and improved mechanical properties.

It is further desired to provide a method for producing a polymer with increased free volume a narrow size distribution of the free volume structure, and improved mechanical properties.

It is still further desired to provide a gas separation membrane produced from a polymer with increased free volume and narrow size distribution of the free volume structure, and improved mechanical properties.

It is still further desired to provide a process for producing a gas separation membrane produced from a polymer with increased free volume and narrow size distribution of the free volume structure, and improved mechanical properties.

All references cited herein are incorporated herein in their entireties.

BRIEF SUMMARY OF THE INVENTION

Accordingly, a first aspect of the invention comprises a polymeric material comprising repeating units of the following Formulae I-III:

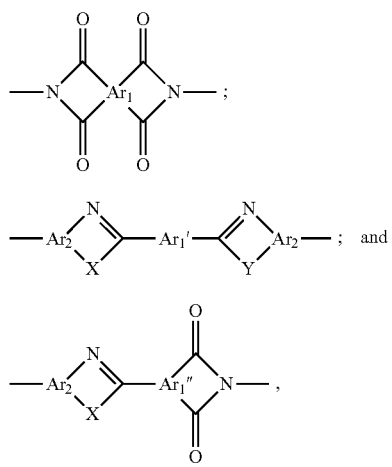

Formula I

Formula II

Formula III wherein,

Formula I can be connected to Formula II or III, but cannot be connected to itself;

Formula II can be connect to Formula I or III, but cannot be connected to itself; and Formula III can be connected to Formula I or II or itself, wherein:

$Ar_1$ is:

a) a tetravalent arylene group having 6 to 24 carbon atoms which is unsubstituted or substituted with at least one substituent selected from the group consisting of $C_1$-$C_{10}$ alkyl, $C_1$-$C_{10}$ haloalkyl, $C_1$-$C_{10}$ alkoxy, and $C_1$-$C_{10}$ haloalkoxy;

b) a tetravalent $C_4$-$C_{24}$ heteroarylene, which is unsubstituted or substituted with at least one substituent selected from the group consisting of $C_1$-$C_{10}$ alkyl, $C_1$-$C_{10}$ haloalkyl, $C_1$-$C_{10}$ alkoxy, and $C_1$-$C_{10}$ haloalkoxy; or c) two or more of $Ar_1$ are fused together to form a fuse ring or are covalently bonded to each other via a functional group selected from the group consisting of O, S, C(=O), CH(OH), S(=O)$_2$, Si(CH$_3$)$_2$, (CH$_2$)$_m$, (CF$_2$)$_n$, C(CF$_3$)$_2$, and C(=O)NH, wherein m is an integer from 1 to 10, and n is an integer from 1 to 10;

$Ar_2$ is:

a) a $C_6$-$C_{24}$ trivalent arylene group;

b) a $C_4$-$C_{24}$ trivalent heteroarylene, which is unsubstituted or substituted with at least one substituent selected from the group consisting of $C_1$-$C_{10}$ alkyl, $C_1$-$C_{10}$ haloalkyl, $C_1$-$C_{10}$ alkoxy, and $C_1$-$C_{10}$ haloalkoxy; or c) two or more of $Ar_2$ are joined together to form a fused ring or are covalently bonded to each other via a functional group selected from the group consisting of O, S, C(=O), CH(OH), S(=O)$_2$, Si(CH$_3$)$_2$, (CH$_2$)$_m$, (CF$_2$)$_n$, C(CF$_3$)$_2$, and C(=O)NH, wherein m is an integer from 1 to 10, and n is an integer from 1 to 10;

$Ar_1$ and $Ar_2$ can be identical or different arylene or heteroarylene ring structures relative to each other;

$Ar_1'$ is a divalent group derived from $Ar_1$;

$Ar_1''$ is a trivalent group derived from $Ar_1$; and

X and Y are identical or different from each other, and are selected from O, S, NH, and NR, wherein R is a substituted or un-substituted $C_1$-$C_{10}$ alkyl or $C_1$-$C_{10}$ alkoxy, or a substituted or un-substituted $C_6$-$C_{20}$ aryl group, or a substituted or un-substituted $C_4$-$C_{20}$ heteroaryl group.

As used herein, the term "derived from" in connection with $Ar_1'$ and $Ar_1''$ means that $Ar_1'$ and $Ar_1''$ are derived through the further condensation with at least one functional group on $Ar_2$.

A second aspect of the invention comprises a method for preparing a polymeric material comprising repeating units of Formulae I-III by thermally treating aromatic polyimide precursors containing ortho-positioned functional groups selected from OH, SH, NH, and NR.

A third aspect of the invention comprises a polymeric material prepared by a method of the invention, wherein the polymeric material is adapted for use as a gas separation membrane.

A fourth aspect of the invention comprises a gas separation membrane comprising a polymeric material of the invention.

A fifth aspect of the invention comprises a method for separating components of a fluid, said method comprising:

providing a separation device comprising a polymeric material of the invention as a separation membrane;

feeding a feed fluid to the separation device, wherein the feed fluid comprises a mixture of a first fluid and at least one second fluid; and collecting a product from the separation device, wherein the product contains the first fluid at a higher purity than the feed fluid.

DETAILED DESCRIPTION OF THE INVENTION

Figure 1:
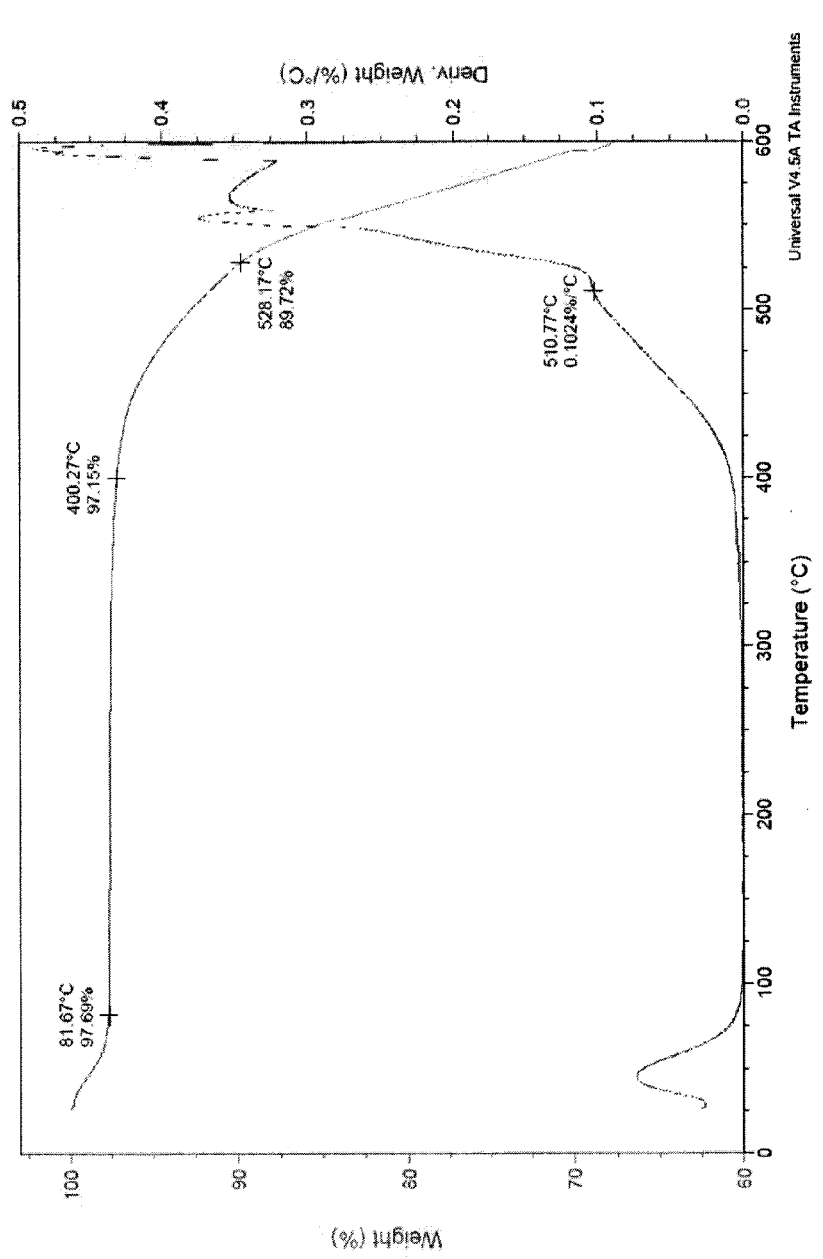
FIG. 1 provides TGA of dry P2 solid. The solid was dried by ramping to 250° C. from room temperature at 10° C./min, and holding for 2 hours.
Figure 2:
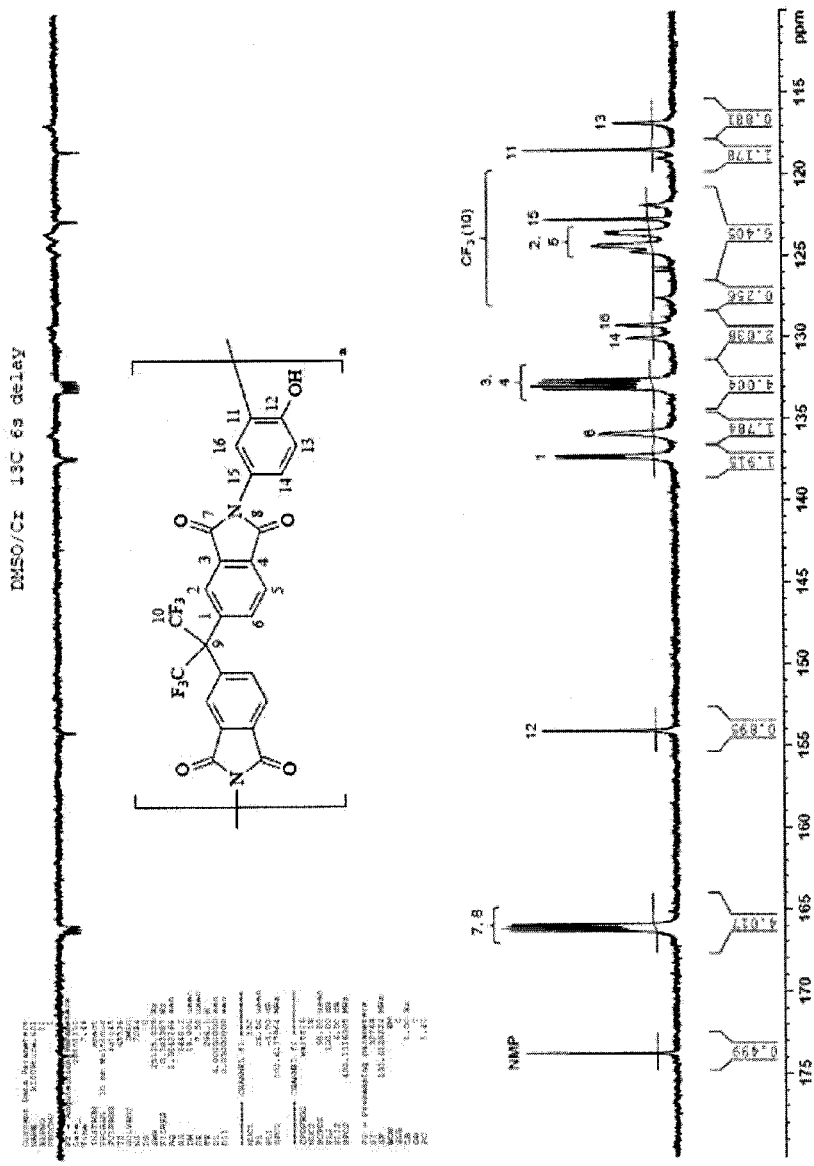
FIG. 2 provides $^{13}$CNMR of P2 solid dissolved in D6-DMSO.
Figure 3:
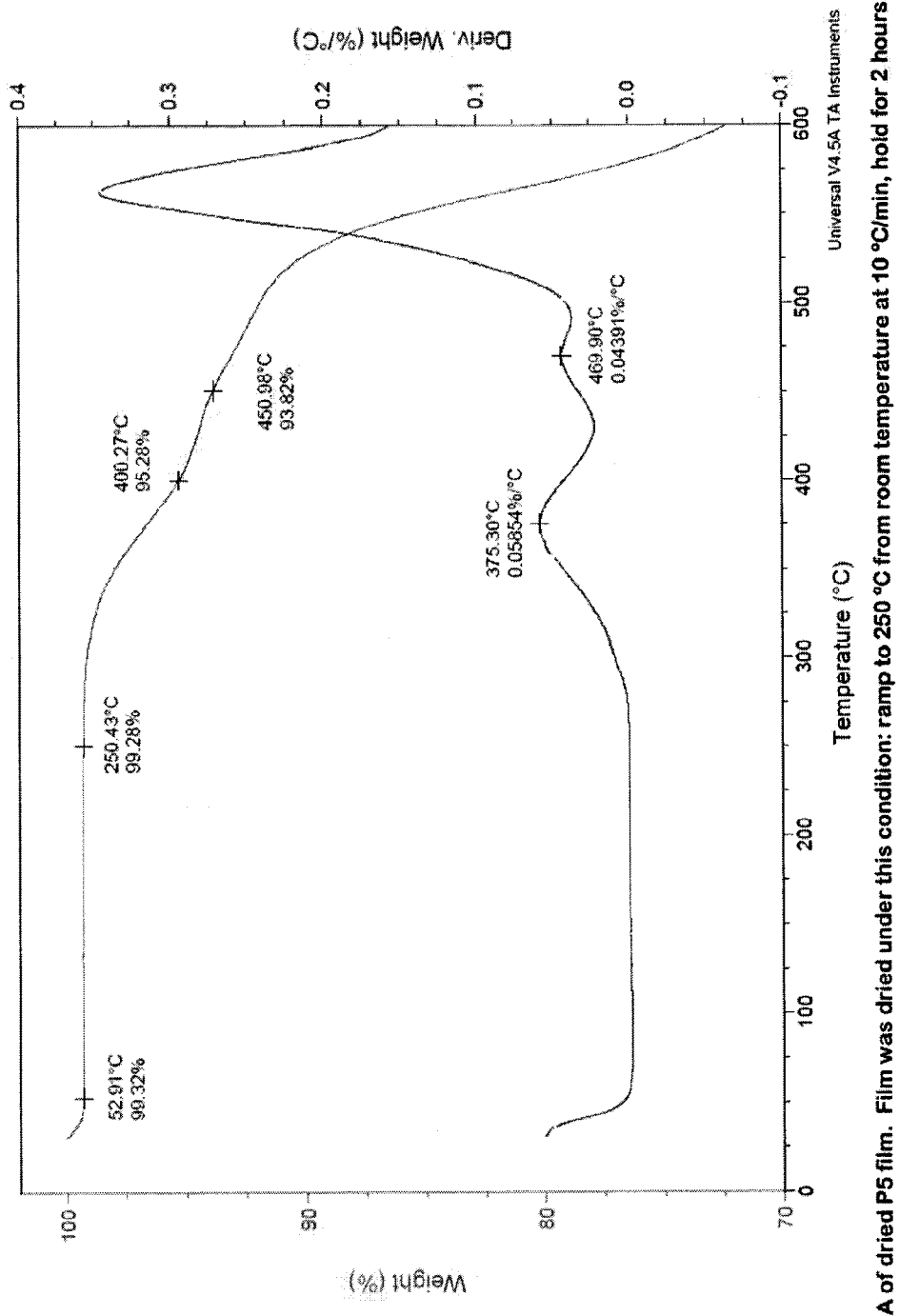
FIG. 3 provides TGA of dry P5 film. The film was dried ramping to 250° C. from room temperature at 10° C./min, and holding for 2 hours.
Figure 4:
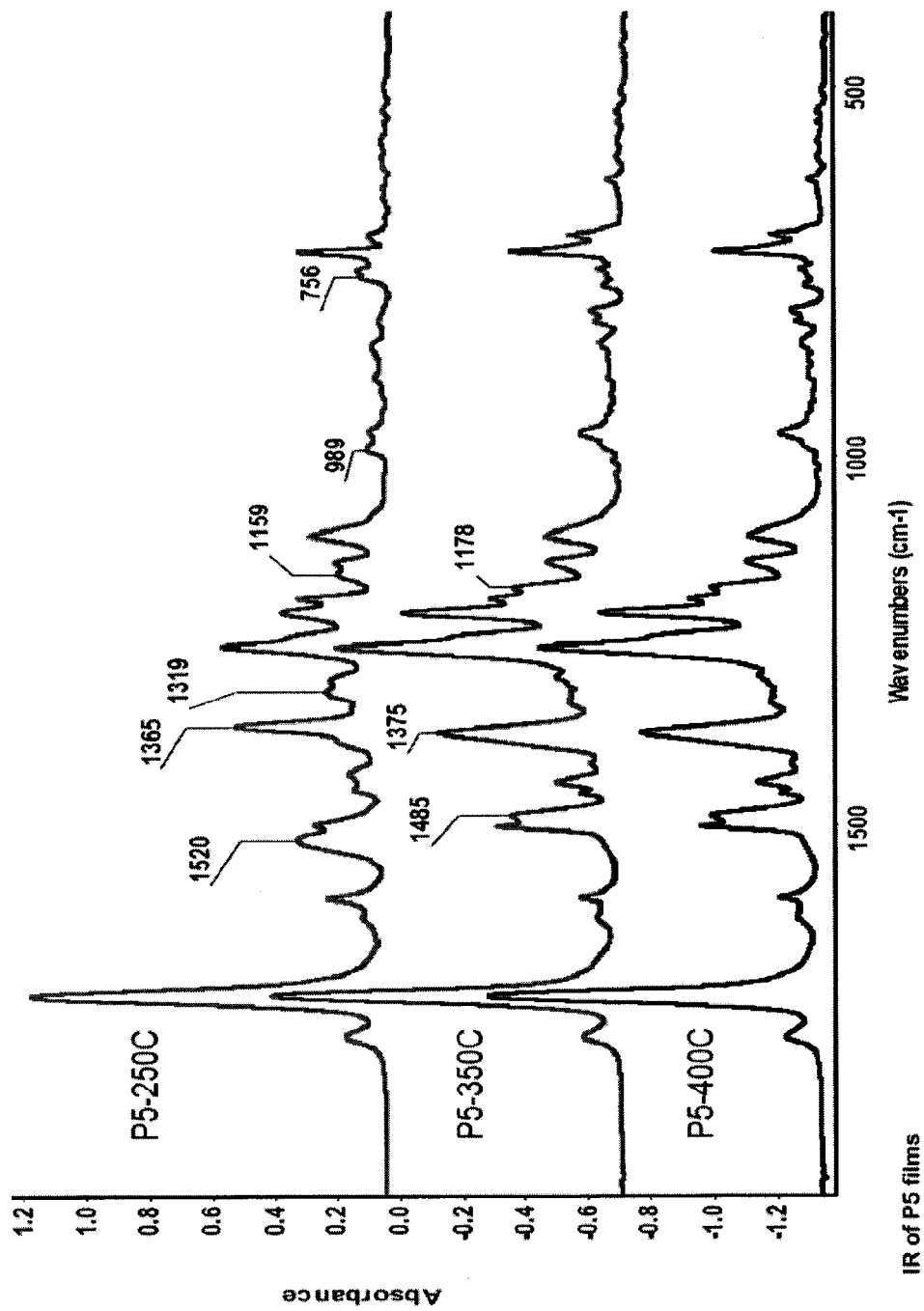
FIG. 4 provides the IR spectra of P5 films.
Figure 5:
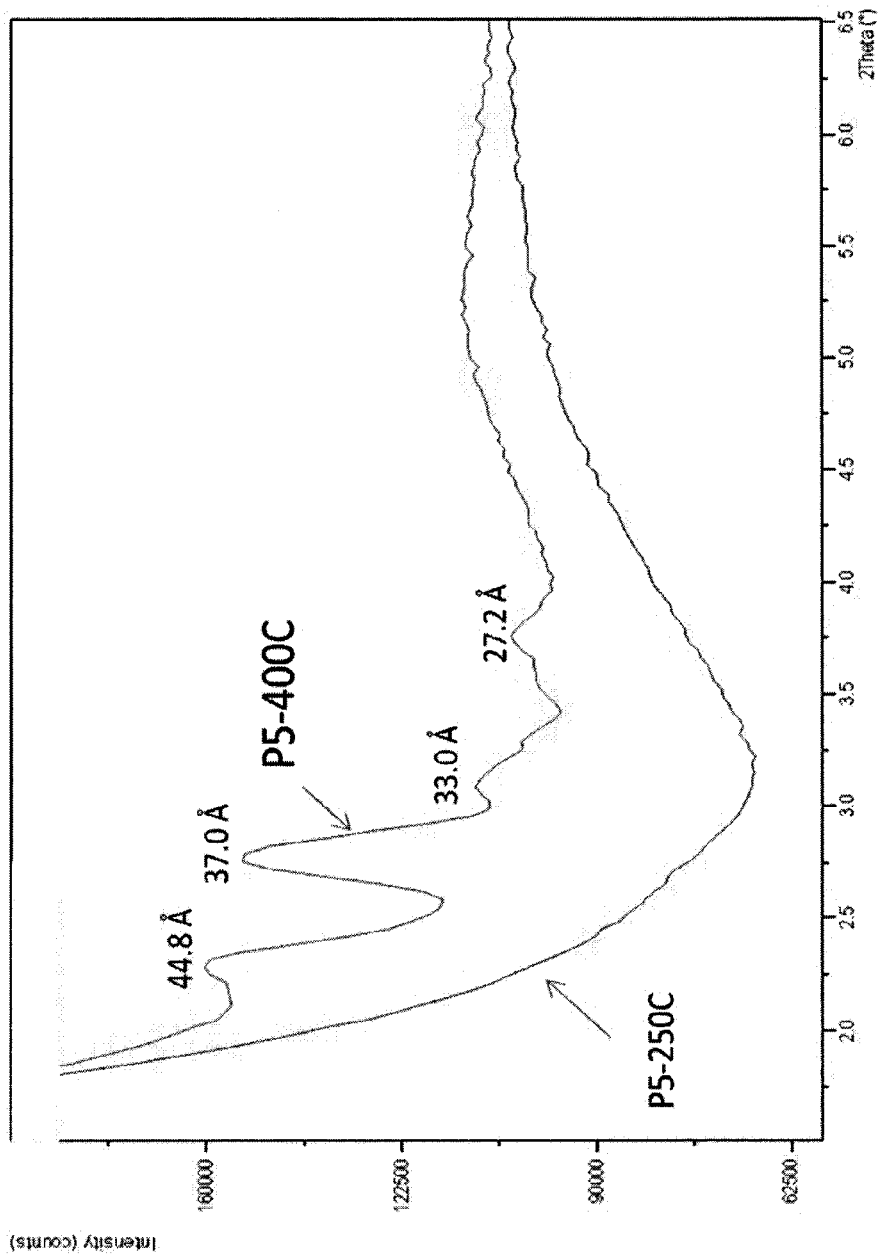
FIG. 5 provides the X-ray diffraction analysis of P5 films.

The invention was largely inspired by the discovery that polymers having one or more of the aforementioned desired characteristics can be provided by a polymeric material comprising repeating units of the following Formulae I-III:

Formula I

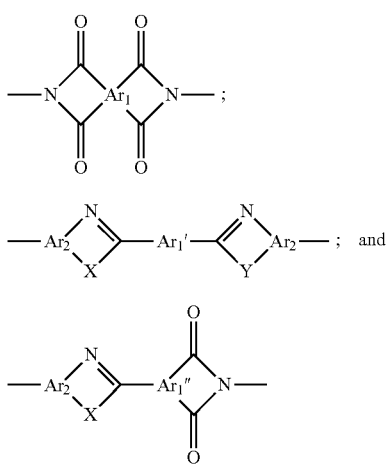

Formula II

—Ar$_2$$\overset{\displaystyle N}{\underset{\displaystyle X}{\diamond}}$Ar$_1'$—Ar$_2'$$\overset{\displaystyle N}{\underset{\displaystyle Y}{\diamond}}$Ar$_2$— ; and Formula III —Ar$_2$$\overset{\displaystyle N}{\underset{\displaystyle X}{\diamond}}$Ar$_1''$$\overset{\displaystyle O}{\underset{\displaystyle O}{\diamond}}$N— wherein,
Formula I can be connected to Formula II or III, but cannot be connected to itself;
Formula II can be connect to Formula I or III, but cannot be connected to itself; and
Formula III can be connected to Formula I or II or itself;
Ar$_1$ is:
 a) a tetravalent arylene group having 6 to 24 carbon atoms which is unsubstituted or substituted with at least one substituent selected from the group consisting of $C_1$-$C_{10}$ alkyl, $C_1$-$C_{10}$ haloalkyl, $C_1$-$C_{10}$ alkoxy, and $C_1$-$C_{10}$ haloalkoxy;
 b) a tetravalent $C_4$-$C_{24}$ heteroarylene, which is unsubstituted or substituted with at least one substituent selected from the group consisting of $C_1$-$C_{10}$ alkyl, $C_1$-$C_{10}$ haloalkyl, $C_1$-$C_{10}$ alkoxy, and $C_1$-$C_{10}$ haloalkoxy; or
 c) two or more of Ar$_1$ are fused together to form a fuse ring or are covalently bonded to each other via a functional group selected from the group consisting of O, S, C(=O), CH(OH), S(=O)$_2$, Si(CH$_3$)$_2$, (CH$_2$)$_m$, (CF$_2$)$_n$, C(CF$_3$)$_2$, and C(=O)NH, wherein m is an integer from 1 to 10, and n is an integer from 1 to 10;
Ar$_2$ is:
 a) a $C_6$-$C_{24}$ trivalent arylene group;
 b) a $C_4$-$C_{24}$ trivalent heteroarylene, which is unsubstituted or substituted with at least one substituent selected from the group consisting of $C_1$-$C_{10}$ alkyl, $C_1$-$C_{10}$ haloalkyl, $C_1$-$C_{10}$ alkoxy, and $C_1$-$C_{10}$ haloalkoxy; or
 c) two or more of Ar$_2$ are joined together to form a fused ring or are covalently bonded to each other via a functional group selected from the group consisting of O, S, C(=O), CH(OH), S(=O)$_2$, Si(CH$_3$)$_2$, (CH$_2$)$_m$, (CF$_2$)$_n$, C(CF$_3$)$_2$, and C(=O)NH, wherein m is an integer from 1 to 10, and n is an integer from 1 to 10;
Ar$_1$ and Ar$_2$ can be identical or different arylene or heteroarylene ring structures relative to each other;
Ar$_1'$ is a divalent group derived from Ar$_1$;
Ar$_1''$ is a trivalent group derived from Ar$_1$; and
X and Y are identical or different from each other, and are selected from O, S, NH, and NR, wherein R is a substituted or un-substituted $C_1$-$C_{10}$ alkyl or $C_1$-$C_{10}$ alkoxy, or a substituted or un-substituted $C_6$-$C_{20}$ aryl group, or a substituted or un-substituted $C_4$-$C_{20}$ heteroaryl group.
Preferably, Ar$_1$ of the repeating units of Formulae I-III is selected from the following structures:

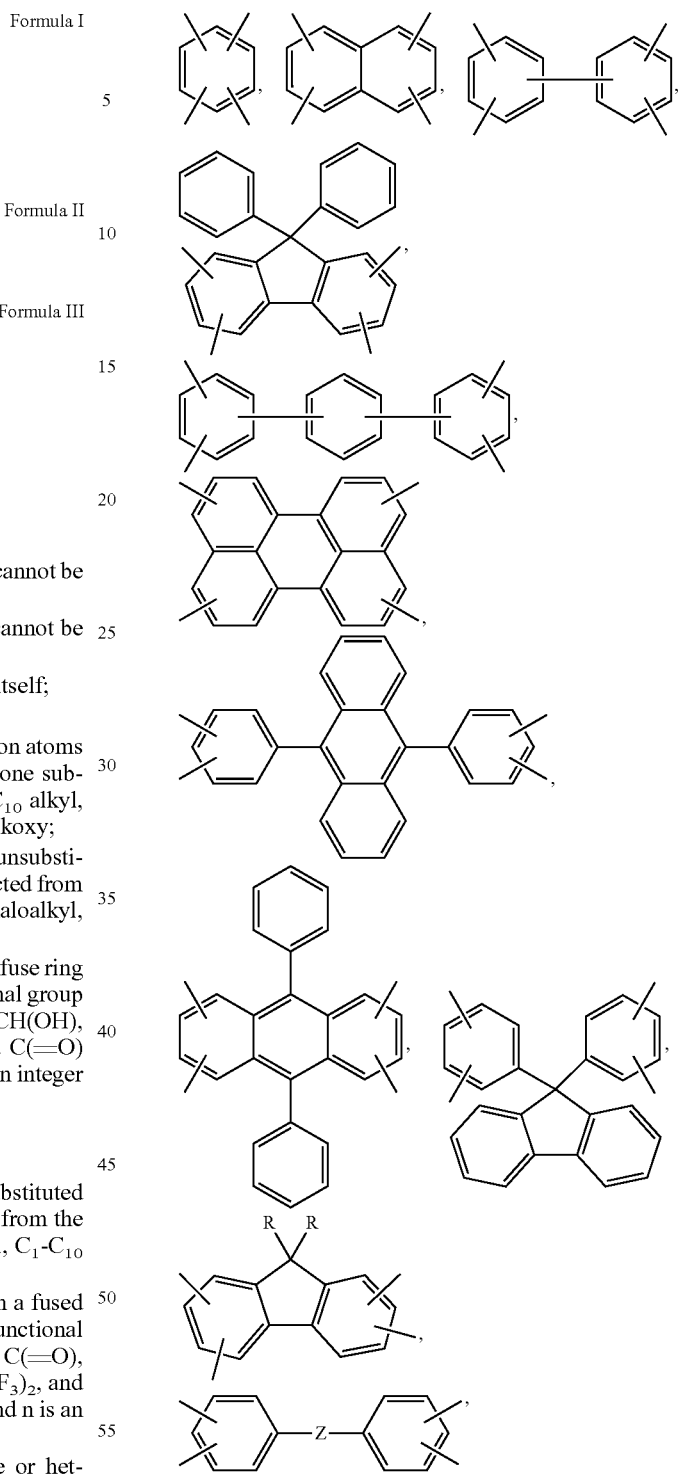

wherein,
R is a substituted or un-substituted $C_1$-$C_{10}$ alkyl or $C_1$-$C_{10}$ alkoxy group, or a substituted or un-substituted $C_6$-$C_{20}$ aryl group, or substituted or un-substituted $C_4$-$C_{20}$ heteroaryl group; and
Z is O, S, C(=O), CH(OH), S(=O)$_2$, Si(CH$_3$)$_2$, (CH$_2$)$_m$, (CF$_2$)$_n$, C(CH$_3$)$_2$, C(CF$_3$)$_2$, or C(=O)NH, wherein m is an integer from 1 to 10, and n is an integer from 1 to 10;

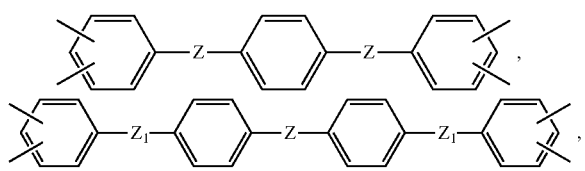

wherein,
$Z_1$ is O, S, C(=O), or S(=O)$_2$; and Z is as defined above;

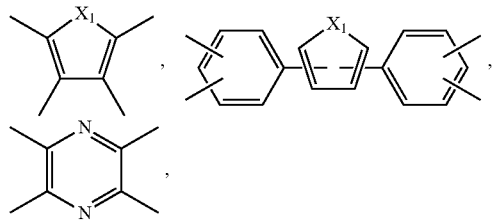

wherein:
$X_1$ is N, O, or S;

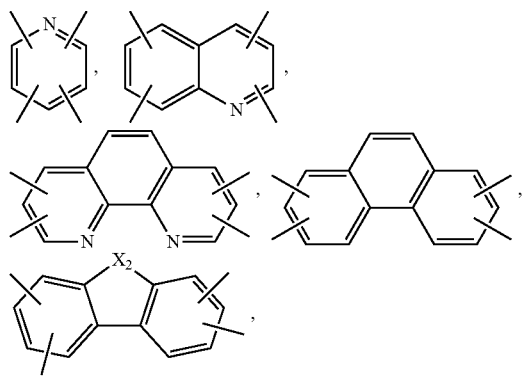

wherein:
$X_2$ is S, O, NR, Se, or SiR$_2$; and

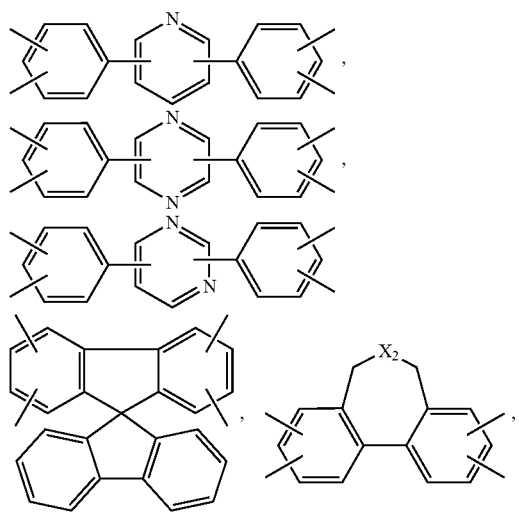

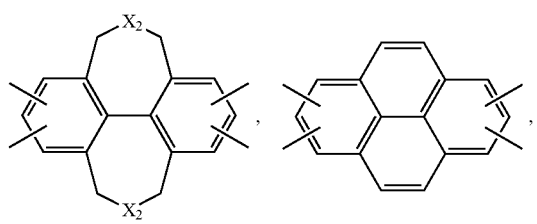

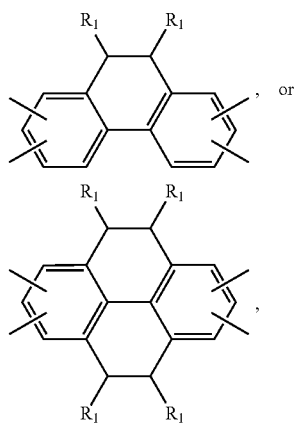

wherein:
$R_1$ is selected from hydrogen, a $C_1$-$C_{10}$ substituted or un-substituted alkyl group, a substituted or un-substituted $C_1$-$C_{10}$ alkoxy group, a substituted or un-substituted $C_6$-$C_{20}$ aryl group, or a substituted or un-substituted $C_4$-$C_{20}$ heteroaryl group.

More preferably, $Ar_1$ of repeating units of Formulae I-III is selected from the following structures:

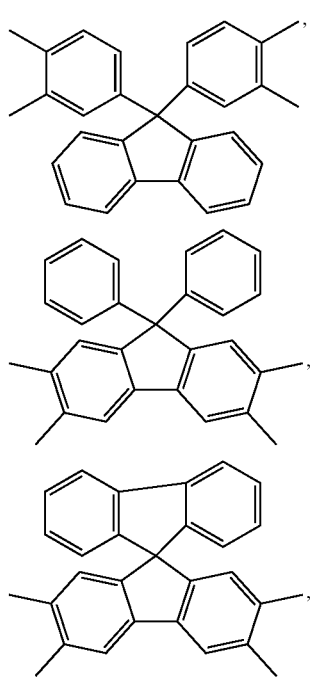

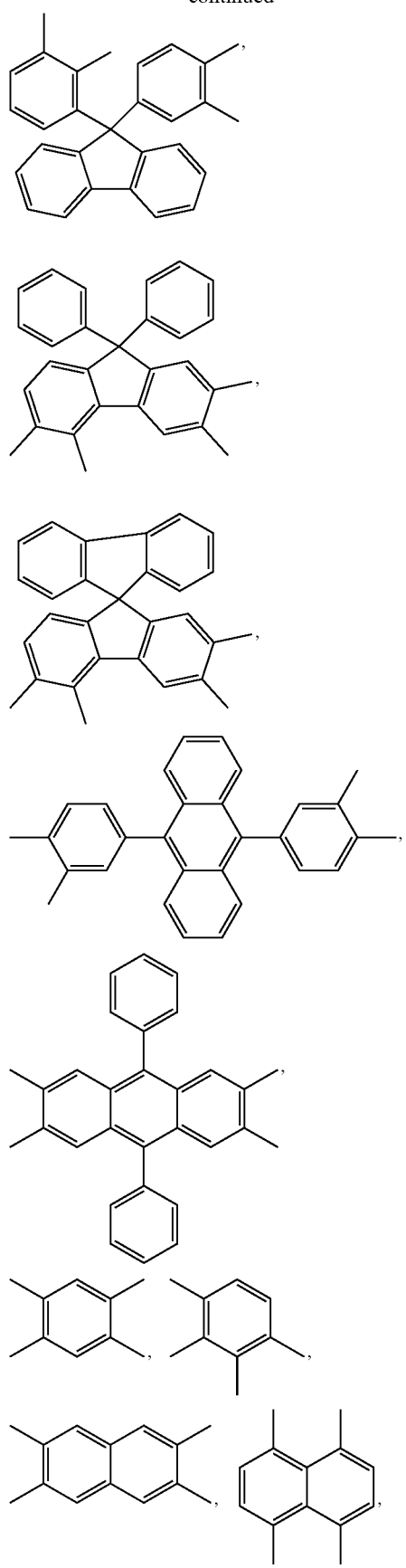
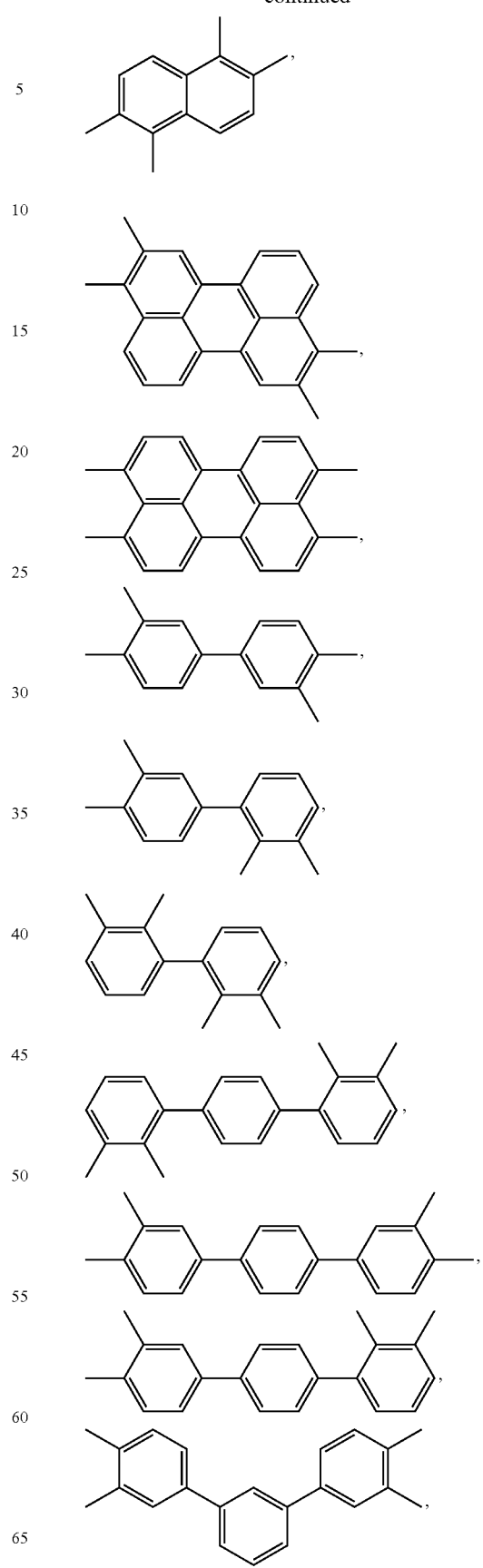

-continued
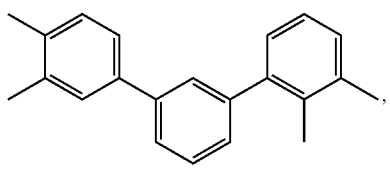
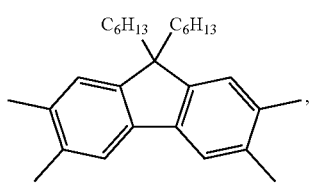
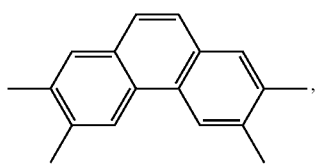
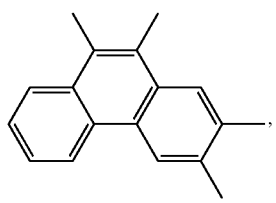
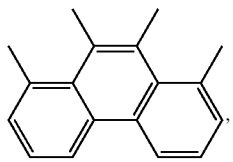
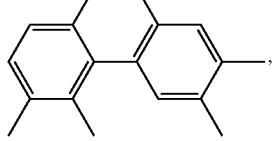
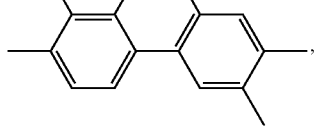
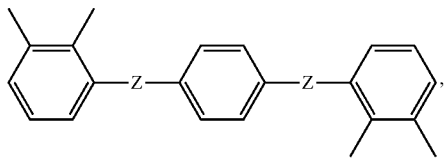
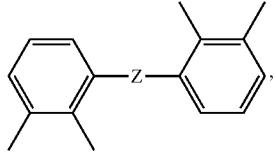
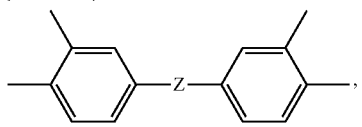
-continued
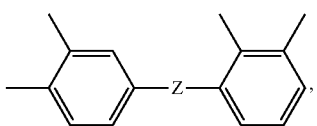
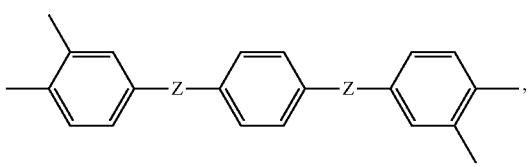
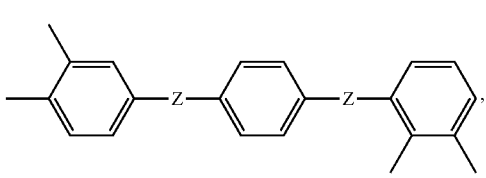
wherein Z is O, S, C(=O), CH(OH), S(=O)$_2$, Si(CH$_3$)$_2$, CH$_2$, CF$_2$, C(CH$_3$)$_2$, C(CF$_3$)$_2$, or C(=O)NH;
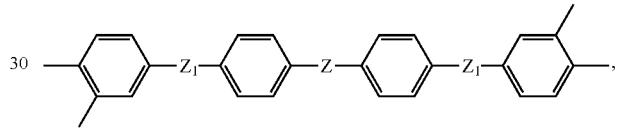
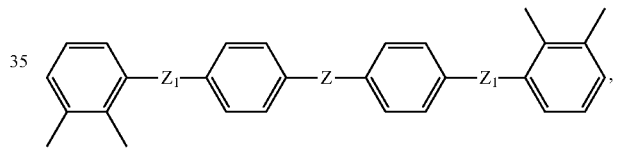
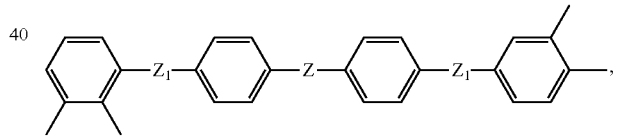
wherein:
Z$_1$ is O, S, S(=O)$_2$, or C(=O); and Z is as defined above;
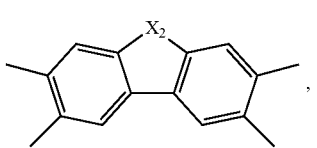
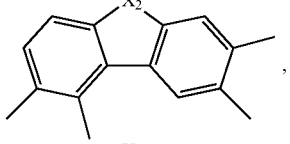
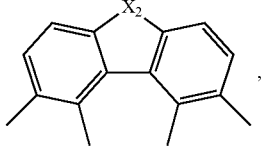

wherein:
$X_2$ is S, O, NR, Se, or $SiR_2$;
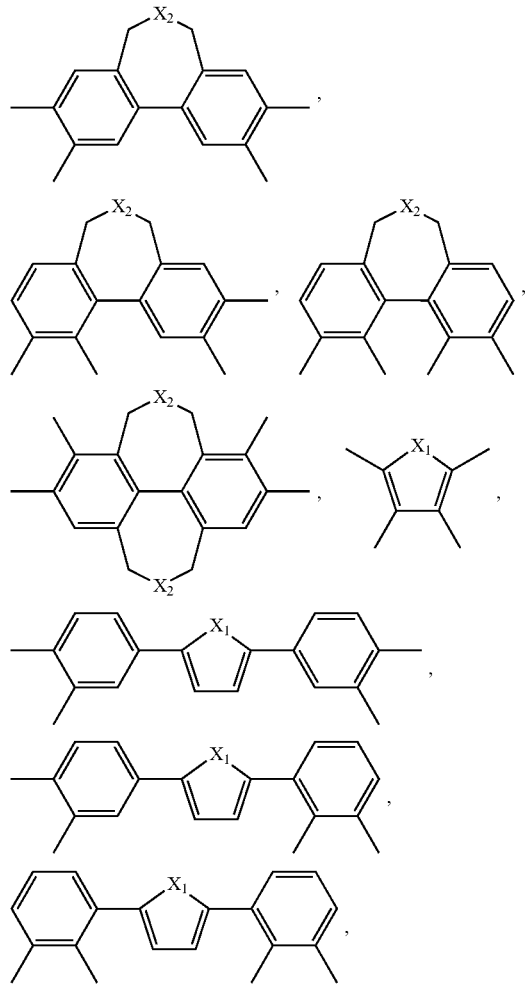
wherein:
$X_1$ is N, O, or S; and $X_2$ is as defined above.
$Ar_1$ of repeating units of Formulae I-III can also be selected from the following structures:
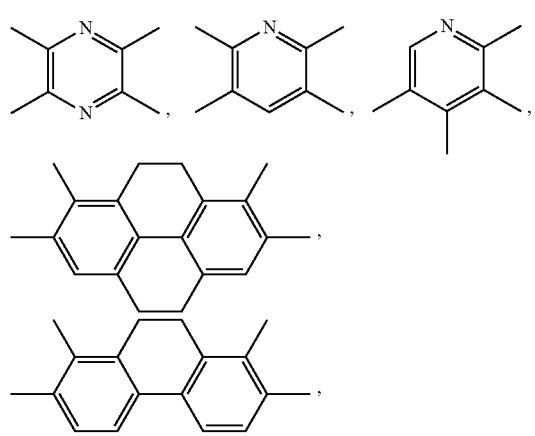
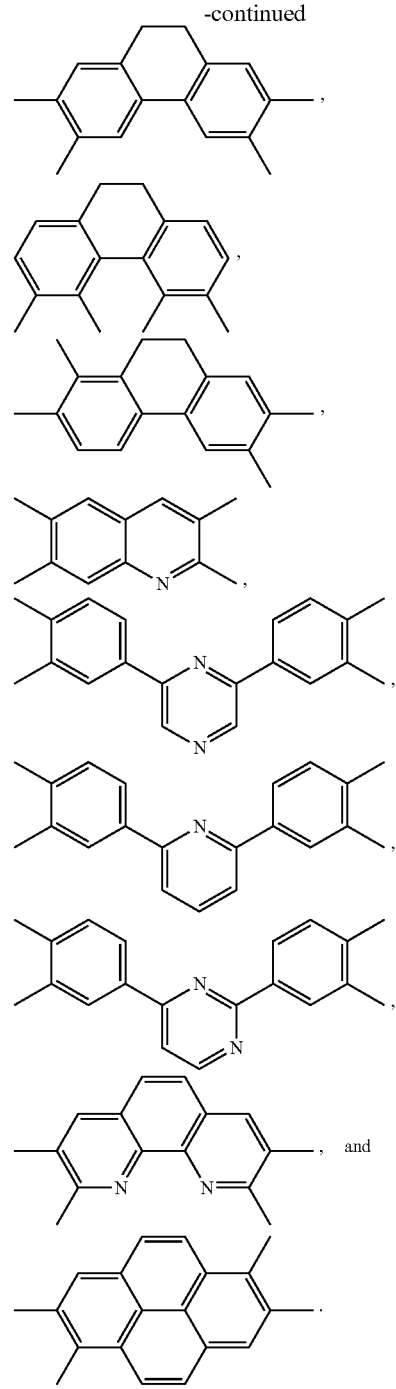
Preferably, $Ar_2$ of repeating units of Formulae I-III is selected from the following structures:
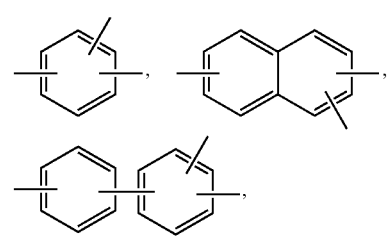

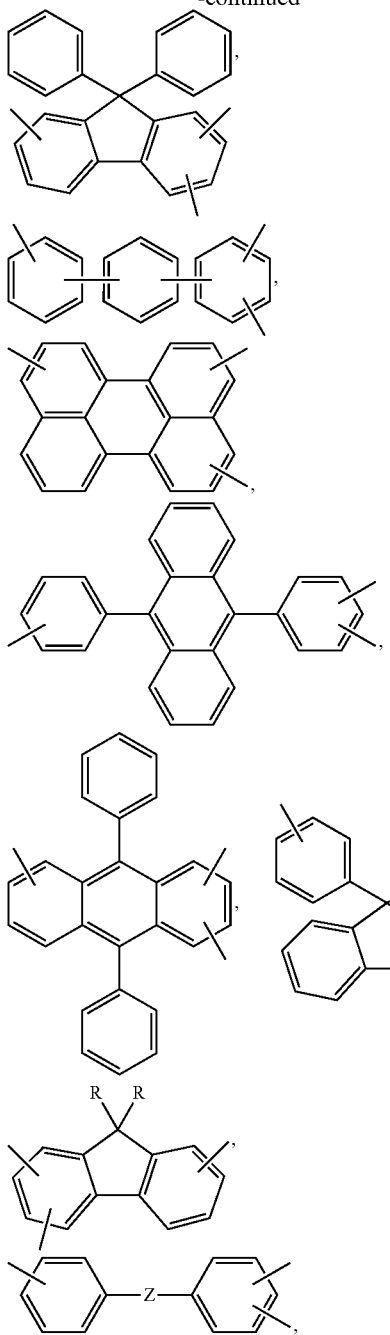

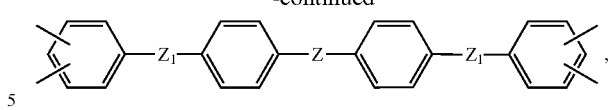

wherein, $Z_1$ is O, S, C(=O), or S(=O)$_2$; and Z is as defined above;

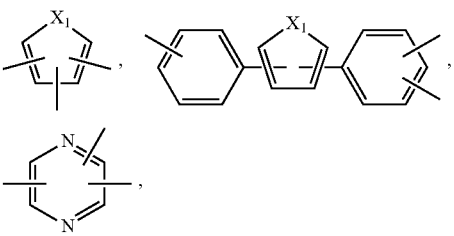

wherein, $X_1$ is N, O, or S;

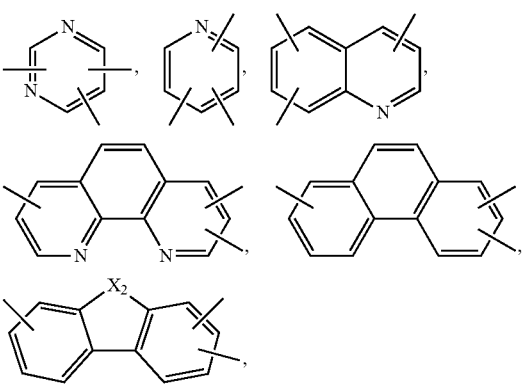

wherein, $X_2$ is S, O, NR, Se, or SiRR; wherein R is as defined above;

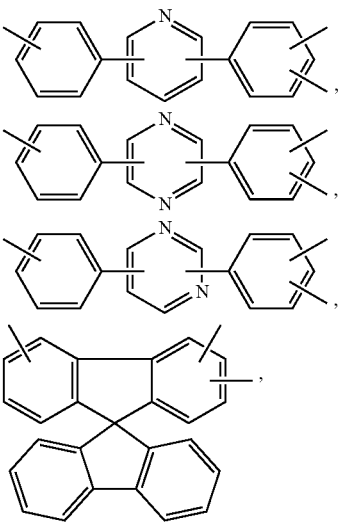

wherein,

R is a substituted or un-substituted $C_1$-$C_{10}$ alkyl group, a $C_1$-$C_{10}$ alkoxy group, a substituted or un-substituted $C_6$-$C_{20}$ aryl group, or a substituted or un-substituted $C_4$-$C_{20}$ heteroaryl; and Z is O, S, C(=O), CH(OH), S(=O)$_2$, Si(CH$_3$)$_2$, (CH$_2$)$_m$, (CF$_2$)$_n$, C(CH$_3$)$_2$, C(CF$_3$)$_2$, or C(=O)NH, wherein m is an integer from 1 to 10, and n is an integer from 1 to 10;

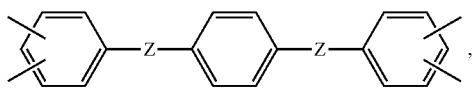

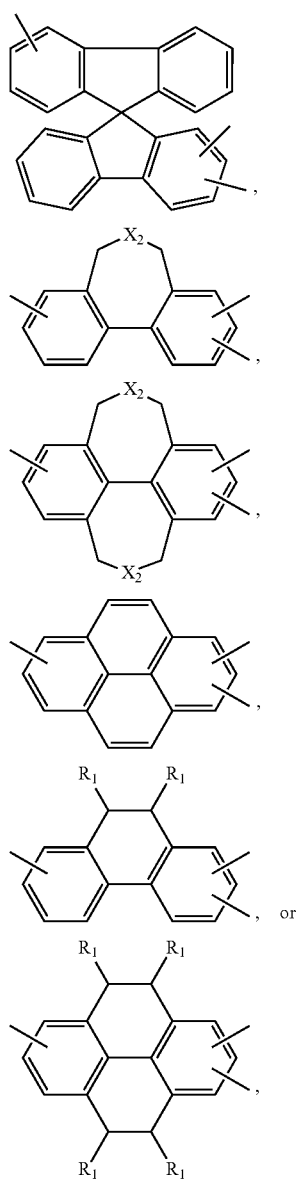
wherein,
R₁ is selected from hydrogen, a substituted or un-substituted $C_1$-$C_{10}$ alkyl group, a substituted or unsubstituted $C_1$-$C_{10}$ alkoxy group, a substituted or un-substituted $C_6$-$C_{20}$ aryl group, or a substituted or un-substituted $C_4$-$C_{20}$ heteroaryl group.
More preferably, $Ar_2$ of repeating units of Formulae I-III is selected from the following structures:
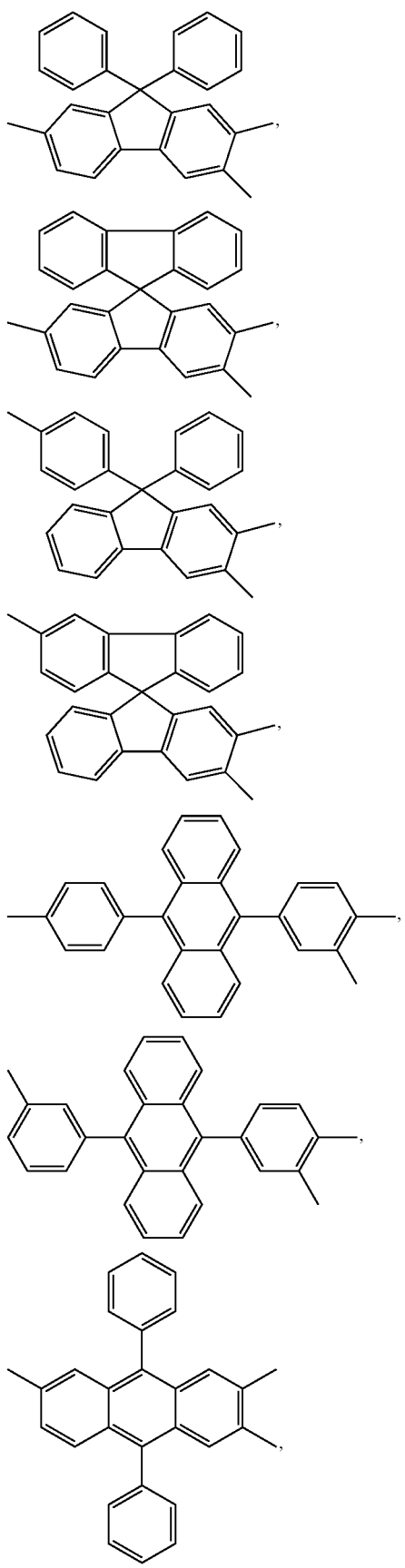

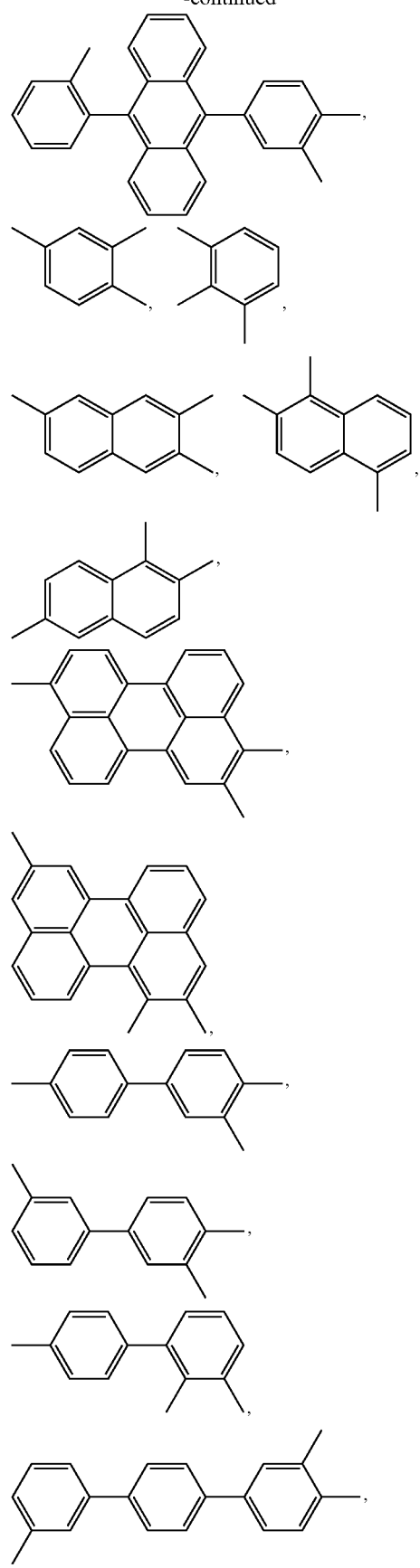

-continued
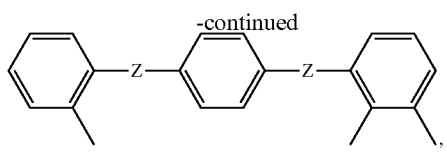
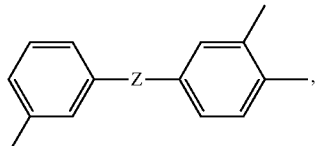
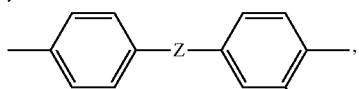
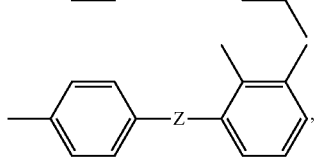
wherein Z is O, S, C(=O), CH(OH), S(=O)$_2$, Si(CH$_3$)$_2$, CH$_2$, CF$_2$, C(CH$_3$)$_2$, C(CF$_3$)$_2$, or C(=O)NH;
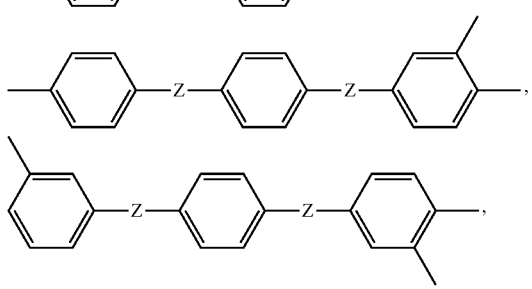
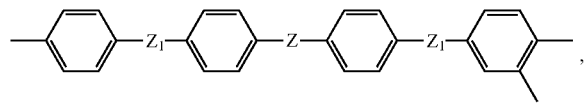
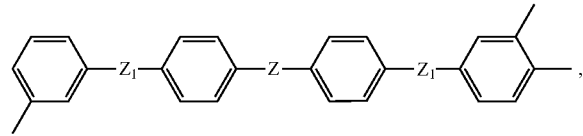
wherein:
Z$_1$ is O, S, S(=O)$_2$, or C(=O); and Z is as defined above;
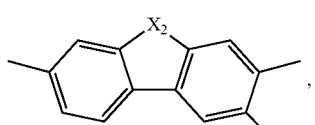
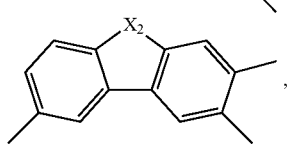
-continued
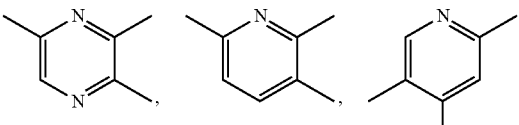
wherein:
X$_2$ is S, O, NR, Se, or SiR$_2$;
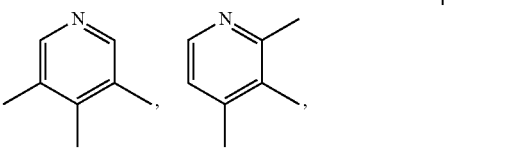
wherein:
X$_1$ is N, O, or S; and X$_2$ is as defined above;

-continued
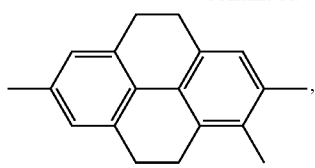
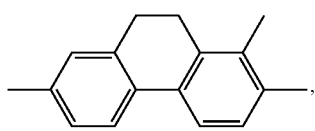
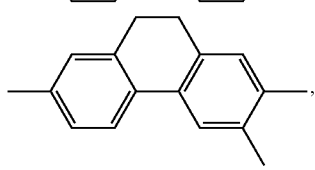
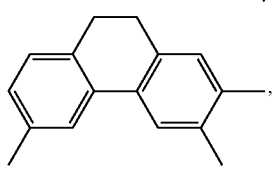
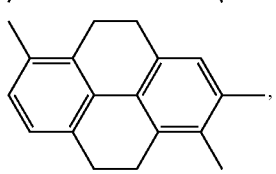
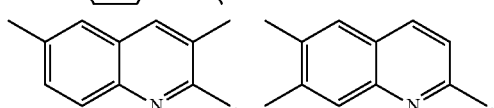
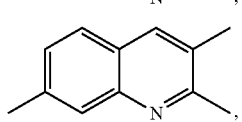
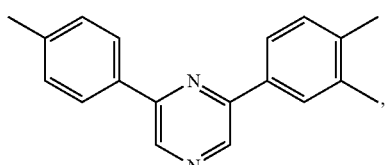
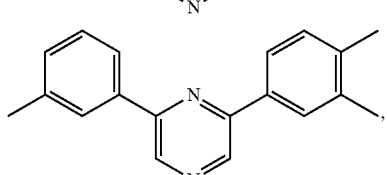
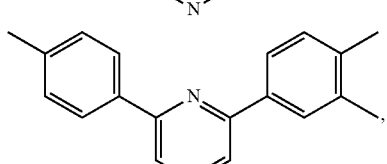
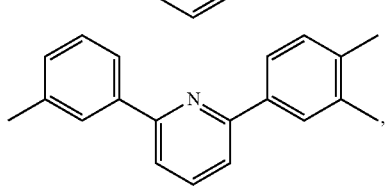
-continued
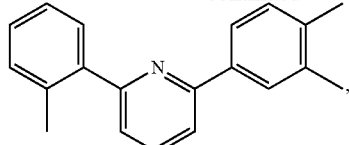
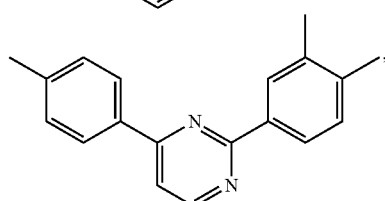
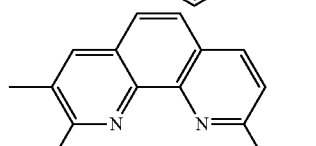
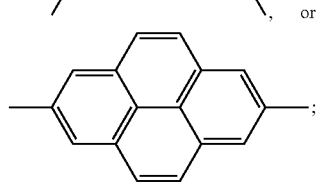, or
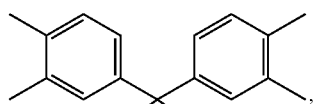;
Preferably, X and Y of the repeating units of Formulae I-III are selected from O, S, NH, and N-aryl. More preferably, X and Y are selected from O, S, NH, and N-phenyl.
A preferred embodiment comprises a polymeric material comprising repeating units of Formulae I-III, wherein:
$Ar_1$ is selected from the following structures:
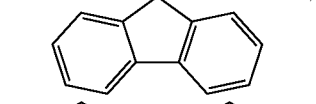
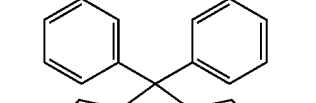
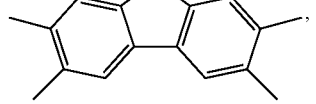
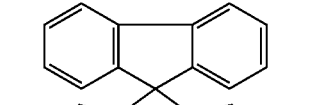
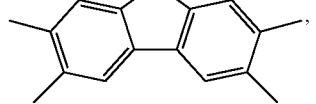
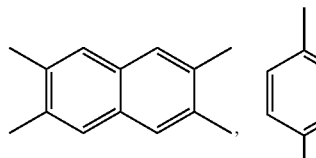

-continued
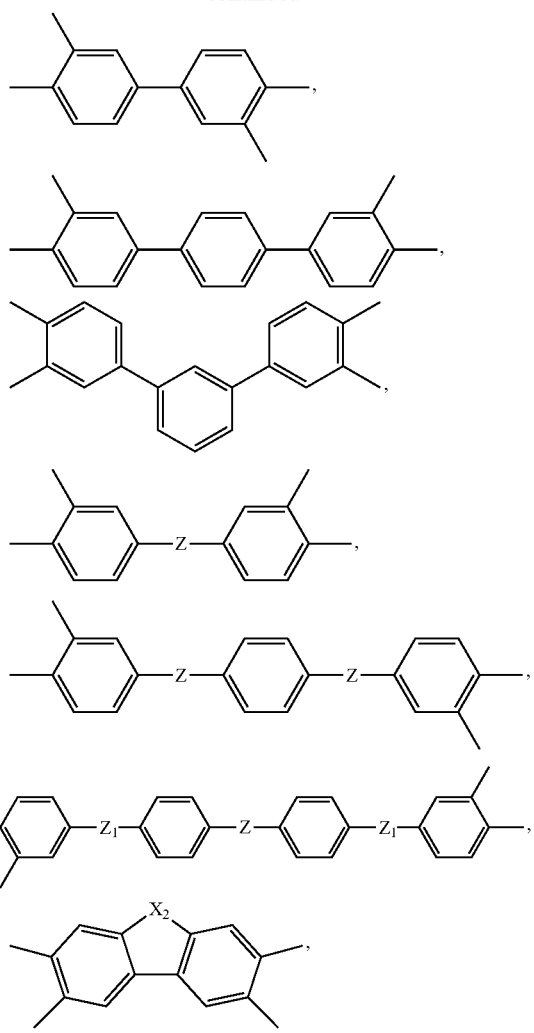
wherein:
Z is O, S, C(=O), S(=O)$_2$, CH$_2$, CF$_2$, C(CH$_3$)$_2$, or C(CF$_3$)$_2$;
Z$_1$ is O, S, S(=O)$_2$, or C(=O); and
X$_2$ is S, O, or N-phenyl;
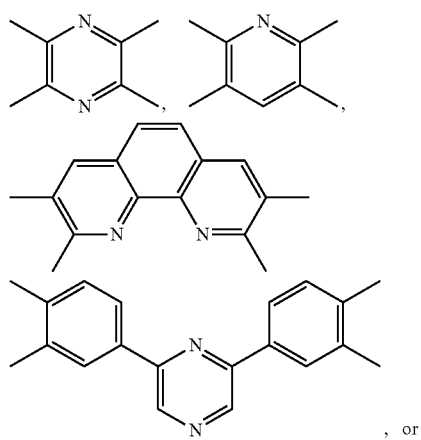, or
-continued
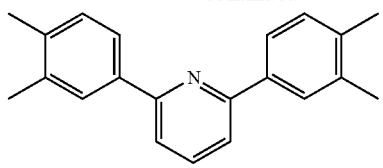
Ar$_2$ is preferably selected from the following structures:
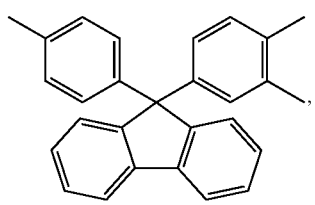
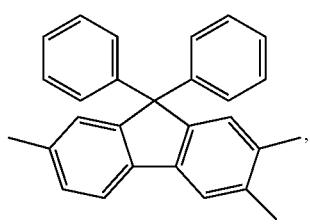
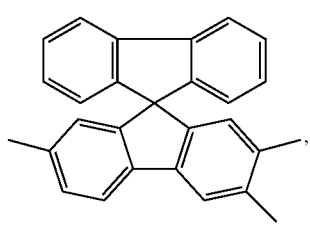
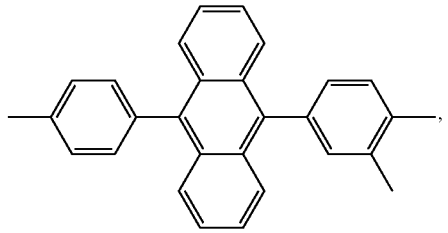
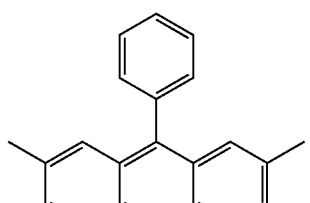
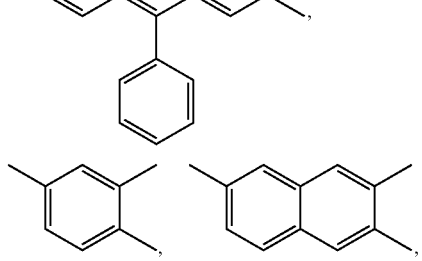

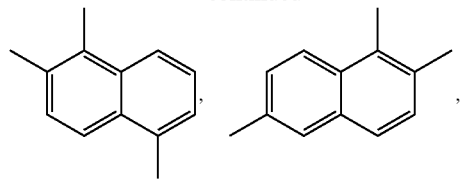
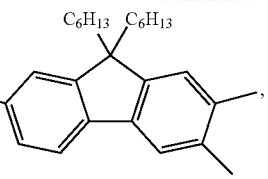
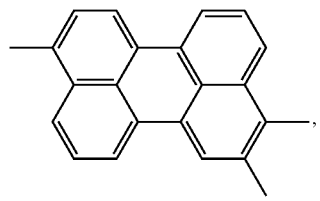
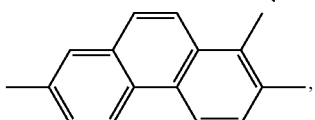
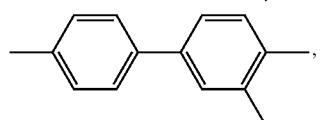
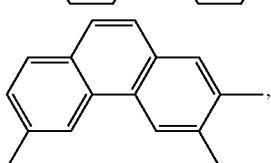
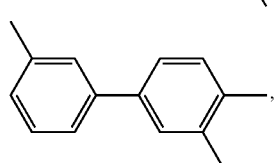
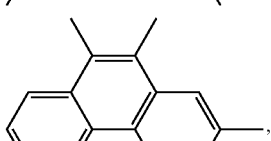
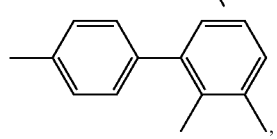
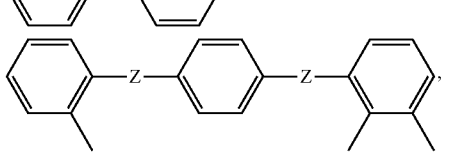
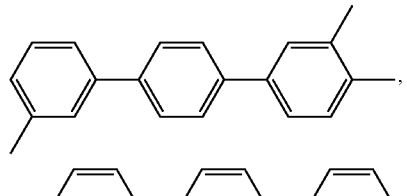
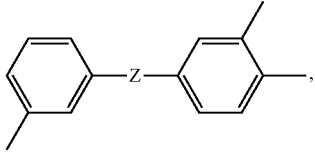
wherein Z is O, S, C(=O), CH(OH), S(=O)$_2$, CH$_2$, CF$_2$, C(CH$_3$)$_2$, or C(CF$_3$)$_2$,
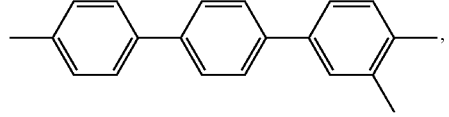
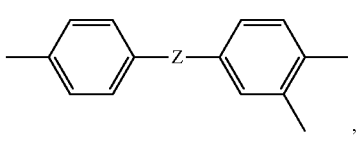
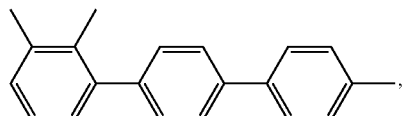
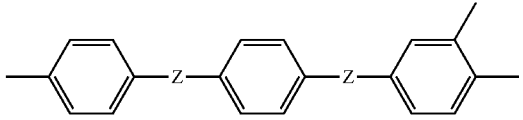
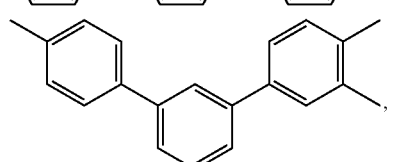
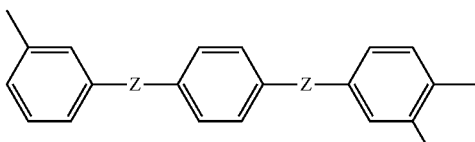
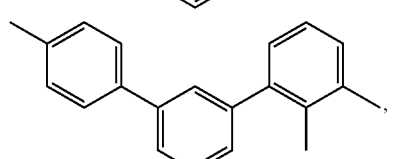
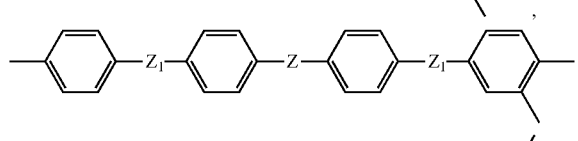
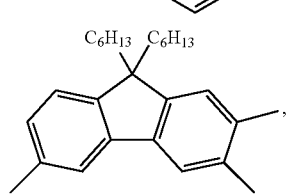
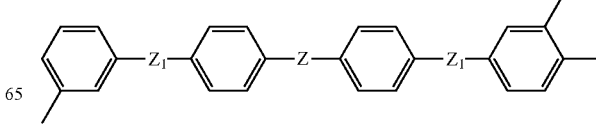

wherein:
$Z_1$ is O, S, S(=O)$_2$, or C(=O); and Z is as defined above;
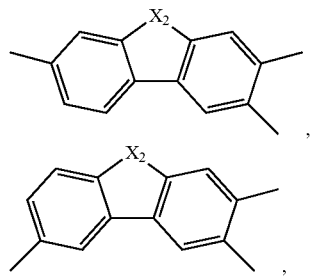
wherein:
$X_2$ is S, O, or N-phenyl;
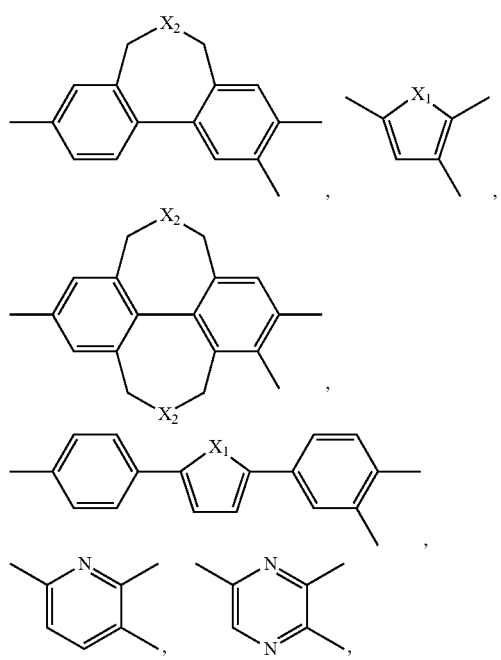
wherein:
$X_1$ is N, O, or S; and $X_2$ is as defined above;
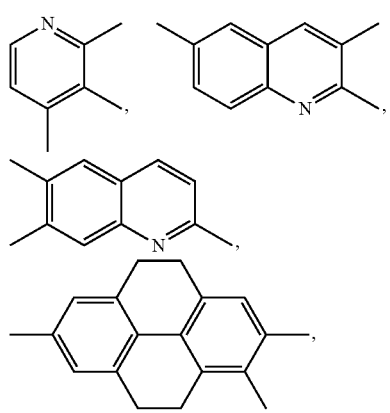
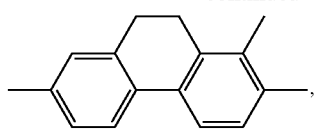
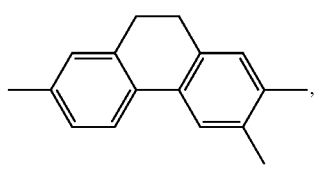
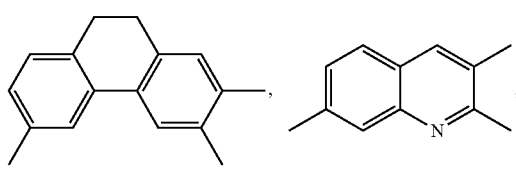
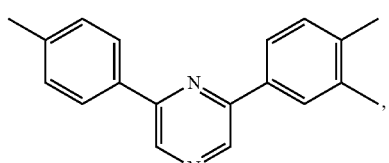
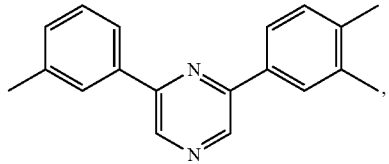
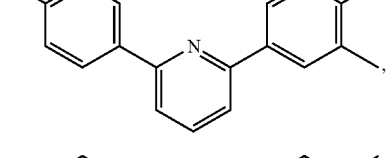
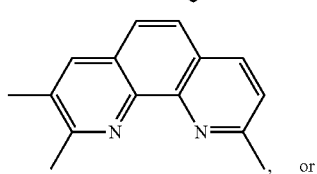
and X and Y of repeating units of Formulae I-III are selected from O, S, and N-phenyl.
Another preferred embodiment is a polymeric material comprising repeating units of Formulae I-III, wherein:

Ar₁ is selected from the following structures:
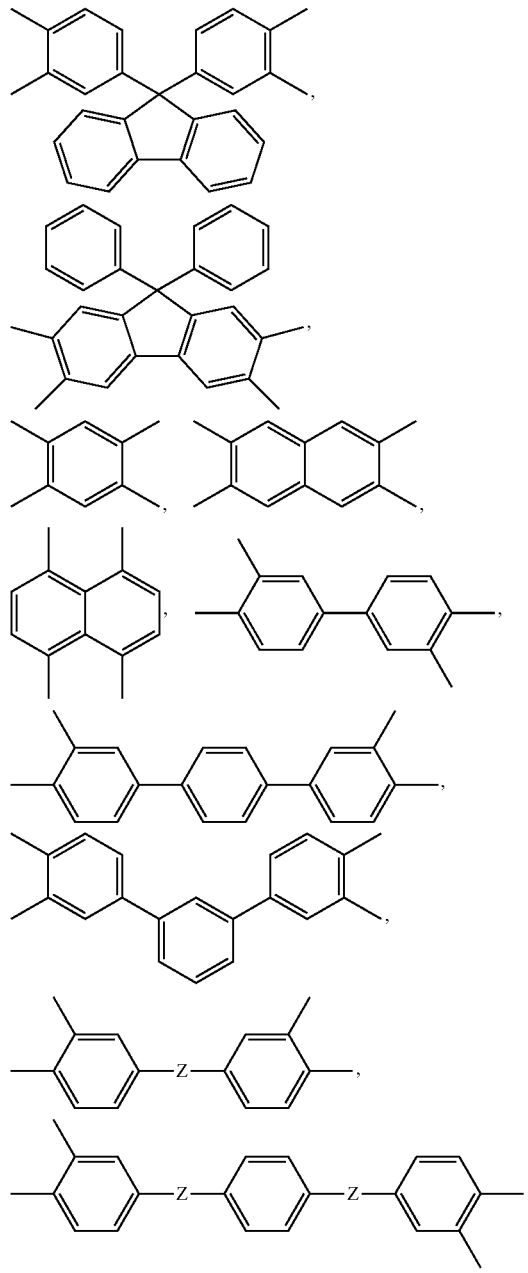
wherein Z is O, C(=O), S(=O)₂, CH₂, CF₂, C(CH₃)₂, or C(CF₃)₂; or
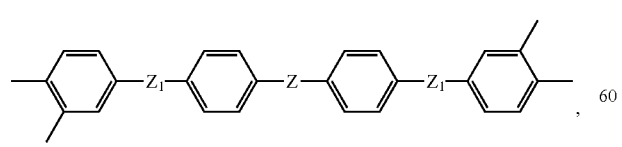
wherein:
Z₁ is O, S, S(=O)₂, or C(=O); and Z is as defined above;
Ar₂ is preferably selected from the following structures:
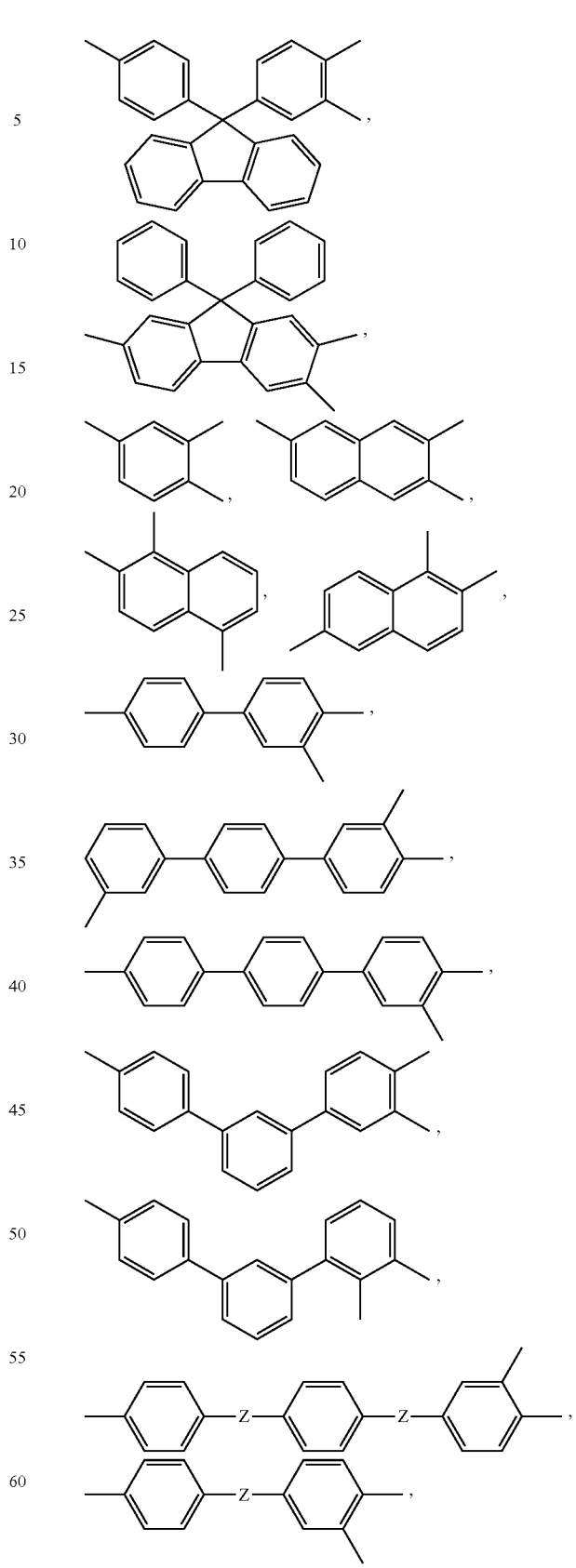
wherein Z is O, S, C(=O), CH(OH), S(=O)₂, CH₂, CF₂, C(CH₃)₂, or C(CF₃)₂,

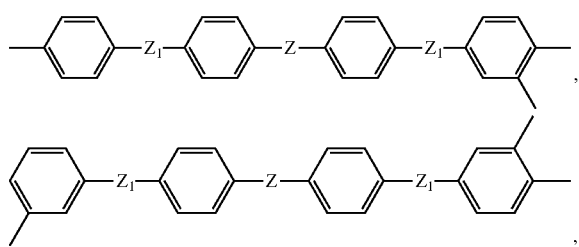
wherein:
$Z_1$ is O, S, S(=O)$_2$, or C(=O); and Z is as defined above; and X and Y are selected from O, S, and N-phenyl.
Another preferred embodiment is a polymeric material comprising repeating units of Formulae I-III, wherein:
$Ar_1$ is selected from the following structures:
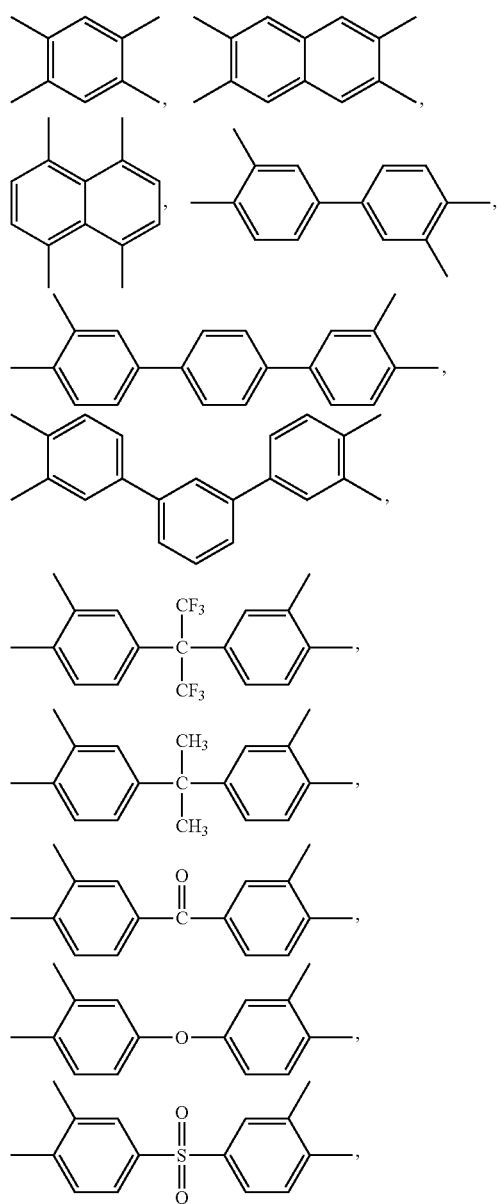
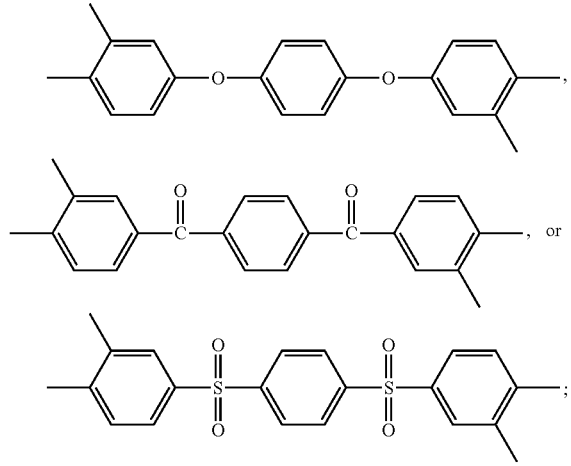
-continued
$Ar_2$ is selected from the following structures:
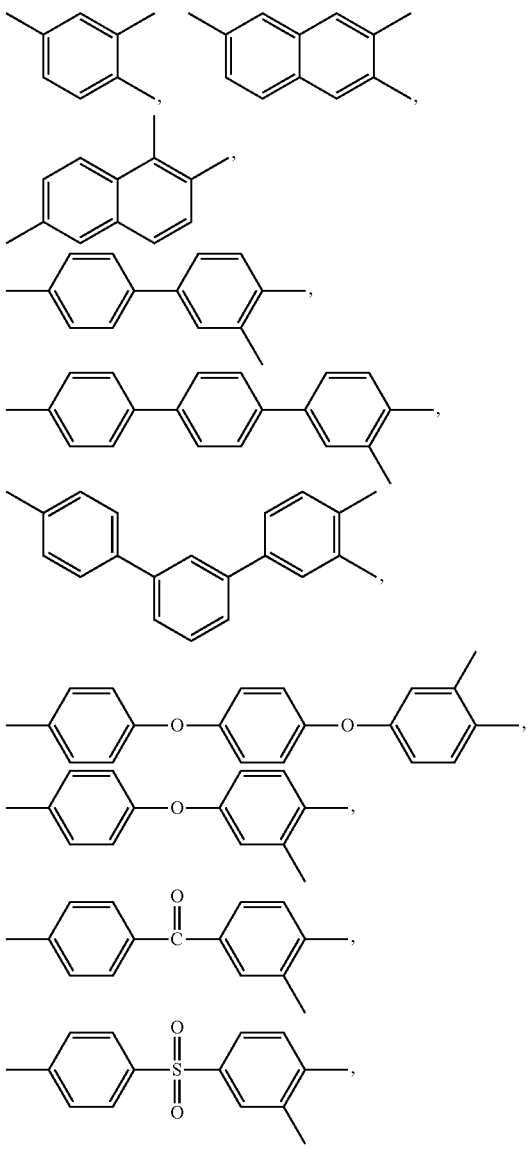

-continued

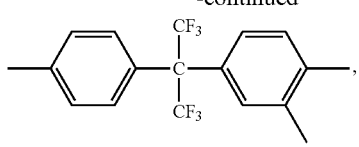

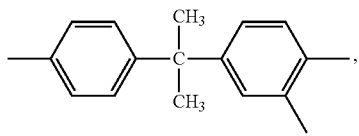

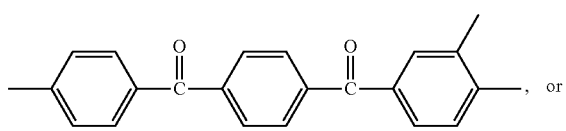, or

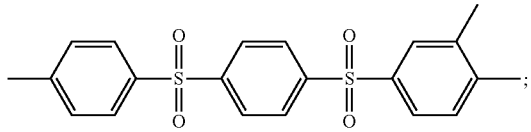;

and X and Y are selected from O, S, and N-phenyl.

Another preferred embodiment is a polymeric material comprising repeating units of Formulae I-III, wherein:

Ar$_1$ is selected from the following structures:

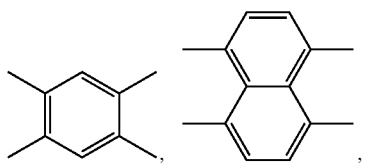

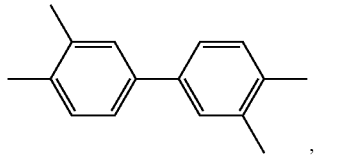,

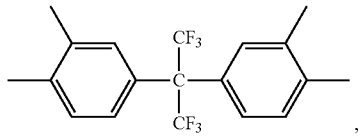,

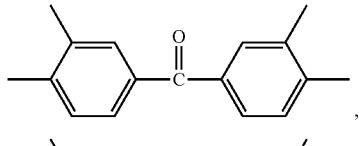,

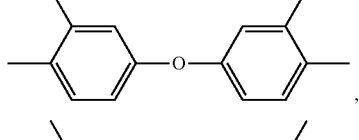,

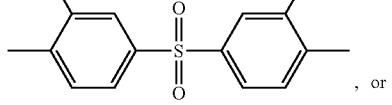, or

-continued

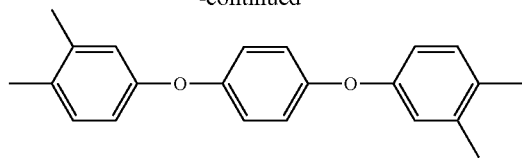;

Ar$_2$ is selected from the following structures:

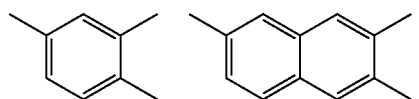,

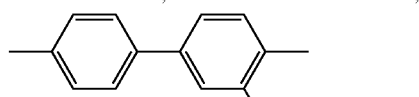,

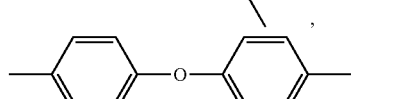,

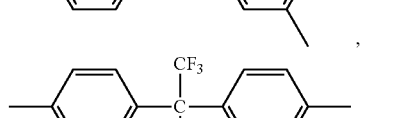,

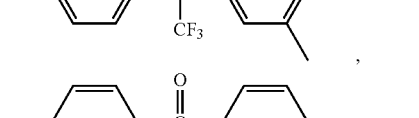, or

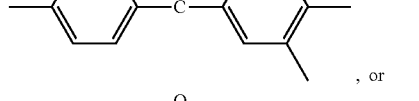;

and X and Y are selected from O, S, and N-phenyl.

Another preferred embodiment is a polymeric material comprising repeating units of Formulae I-III, wherein:

Ar$_1$ is selected from the following structures:

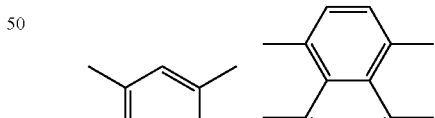,

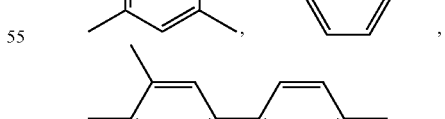,

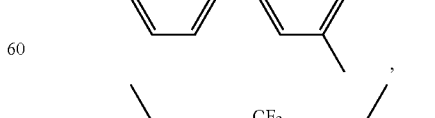,

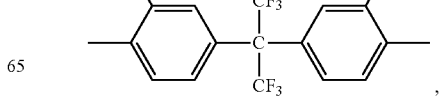,

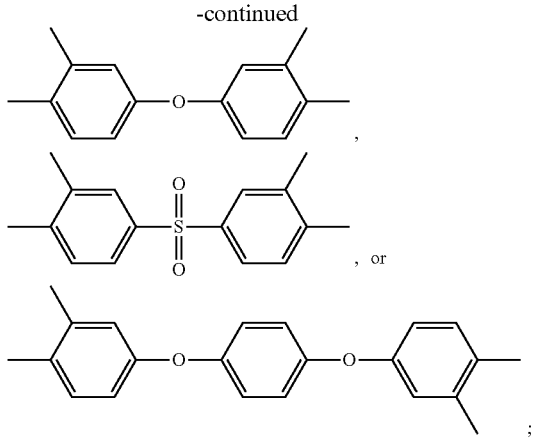

Ar₂ is selected from the following structures:

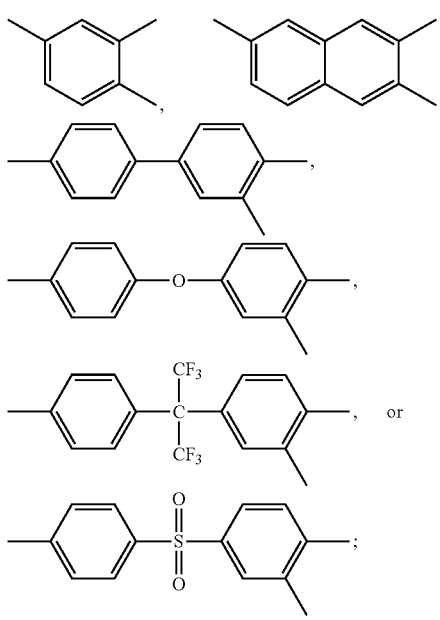

and X and Y are selected from O, and N-phenyl.

Another aspect of the present invention is a method for preparing a polymeric material comprising repeating units of Formulae I-III. The method comprises the step of thermally treating an aromatic polyimide precursor comprising repeating unit of Formula IV containing ortho-positioned functional groups of —OH, —SH, —NH₂, —NHR via irreversible intermolecular and intermolecular rearrangement at about 350° C. to 500° C.:

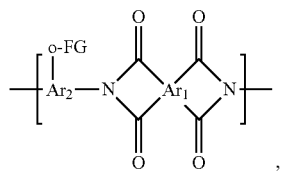

Formula IV wherein:

Ar$_1$ is a tetravalent C$_6$-C$_{24}$ arylene group, or a tetravalent C$_4$-C$_{24}$ heteroarylene, which is unsubstituted or substituted with at least one substituent selected from the group consisting C$_1$-C$_{10}$ alkyl or C$_1$-C$_{10}$ haloalkyl, C$_1$-C$_{10}$ alkoxy or C$_1$-C$_{10}$ haloalkoxy, or two or more of Ar$_1$ are fused together to form a fuse ring or covalently bonded to each other via a functional group selected from the group consisting of O, S, C(=O), CH(OH), S(=O)$_2$, Si(CH$_3$)$_2$, (CH$_2$)$_m$, (CF$_2$)$_n$, C(CF$_3$)$_2$, C(=O)NH, wherein m is an integer of from 1 to 10, and n is an integer of from 1 to 10;

Ar$_2$ is a trivalent C$_6$-C$_{24}$ arylene group, or a trivalent C$_4$-C$_{24}$ heteroarylene, which is unsubstituted or substituted with at least one substituent selected from the group consisting C$_1$-C$_{10}$ alkyl or C$_1$-C$_{10}$ haloalkyl, C$_1$-C$_{10}$ alkoxy or C$_1$-C$_{10}$ haloalkoxy, or two or more of Ar$_2$ are fused together to form a fuse ring or covalently bonded to each other via a functional group selected from the group consisting of O, S, C(=O), CH(OH), S(=O)$_2$, Si(CH$_3$)$_2$, (CH$_2$)$_m$, (CFA, C(CF$_3$)$_2$, C(=O)NH, wherein m is an integer of from 1 to 10, and n is an integer of from 1 to 10;

Ar$_1$ and Ar$_2$ are identical or different arylene or heteroarylene ring structures relative to each other; and o-FG is an ortho-positioned functional group (ortho to nitrogen of the imide ring) selected from —OH, —SH, —NH$_2$, and —NHR, wherein R is selected from a substituted or un-substituted C$_1$-C$_{10}$ alkyl or C$_1$-C$_{10}$ alkoxy group, or a substituted or un-substituted C$_6$-C$_{20}$ aryl group, or a substituted or un-substituted C$_4$-C$_{20}$ heteroaryl group.

The polymer can be described as an example of an AB-CC type copolymer where AB (or BA) represents the asymmetric diamine monomer with two different amine groups. The A side comprises a functional group (FG) such as thio, hydroxyl, or amino group ortho to the amine group whereas the B group does not. The CC represents the original dianhydride monomer. AB and CC cannot react with themselves. This leads to a pseudo atactic polymer differing only in the insertion direction of the AB group and results in a random but uniform distribution of the functional group throughout the polymer. After the high temperature thermal treatment, the functional group reacts with the imide to form a benzoxazole, benzthiozole or benzimide. This leads to a random but uniform distribution of benzoxazole, benzoxazole, benzthiozole or benzimide and imide groups along the polymer chain.

A segment of the polymer can be represented, for example, as follows:

-AB-CC-BA-CC-BA-CC-AB-CC-AB-CC-AB-CC-BA-CC-BA-CC-AB-CC-, wherein
(B-CC-B) is equivalent to Formula I
(A-CC-A) is equivalent to Formula II
(A-CC-B) or (B-CC-A) is equivalent to Formula III
(B-CC-B) can only be connected to (A-CC-A), or (A-CC-B), and can not connect to itself;
(A-CC-A) cab only be connected to (B-CC-B), or (B-CC-A), and can not connect to itself;
(A-CC-B) can be connected to (A-CC-A) or (A-CC-B), and (B-CC-A) can be connected to (B-CC-B) or (B-CC-A).

Therefore,
Formula I can be connected to Formula II or III, but can not be connected to itself;
Formula II can be connect to Formula I or III, but can not be connected to itself;
Formula III can be connected to Formula I or II or itself;

Preferably, Ar$_1$ of repeating units of Formula IV is selected from the following structures:

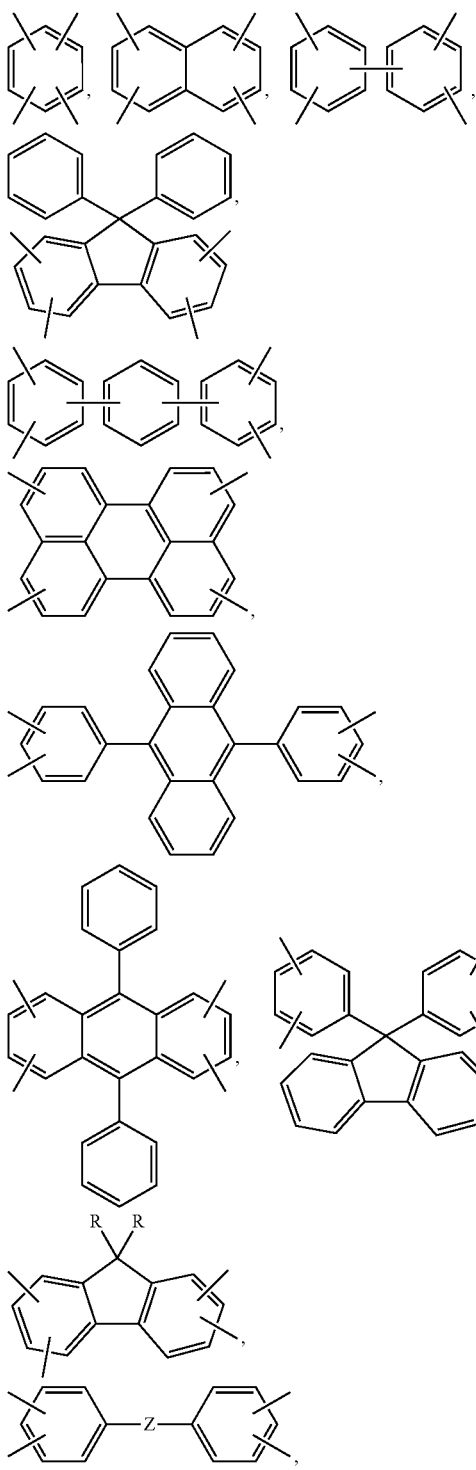

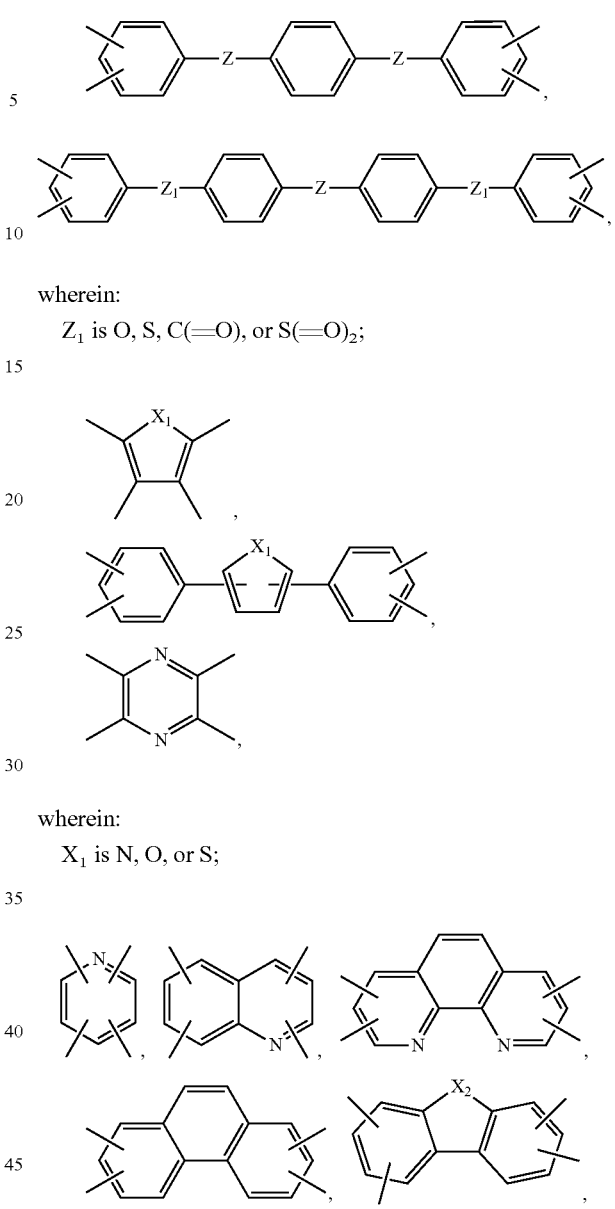

wherein:
R is a substituted or un-substituted $C_1$-$C_{10}$ alkyl or $C_1$-$C_{10}$ alkoxy group, or a substituted or un-substituted $C_6$-$C_{20}$ aryl group, or a substituted or un-substituted $C_4$-$C_{20}$ heteroaryl group; and Z is O, S, C(=O), CH(OH), S(=O)$_2$, Si(CH$_3$)$_2$, (CH$_2$)$_m$, (CFA, C(CH$_3$)$_2$, C(CF$_3$)$_2$, or C(=O)NH, wherein m is an integer of from 1 to 10, and n is an integer of from 1 to 10;

wherein:
Z$_1$ is O, S, C(=O), or S(=O)$_2$;

wherein:
X$_1$ is N, O, or S;

wherein:
X$_2$ is S, O, NR, Se, or SiR$_2$;

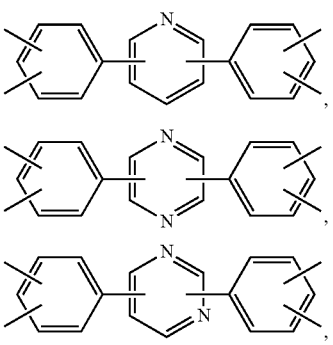

41
-continued

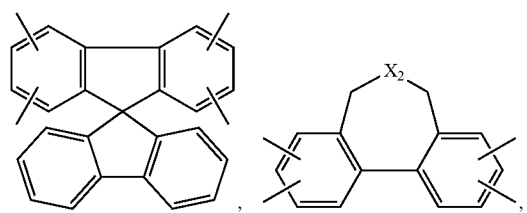

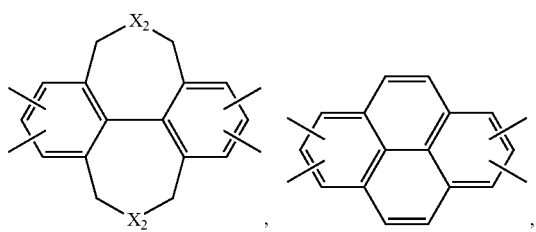

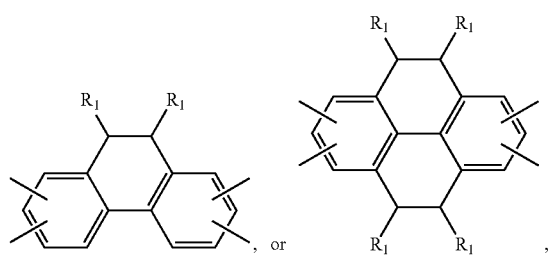

wherein:

$R_1$ is a substituted or un-substituted $C_1$-$C_{10}$ alkyl or $C_1$-$C_{10}$ alkoxy group, or a substituted or un-substituted $C_6$-$C_{20}$ aryl group, or a substituted or un-substituted $C_4$-$C_{20}$ heteroaryl group;

$Ar_2$ of repeating unit of Formula IV is selected from the following structures:

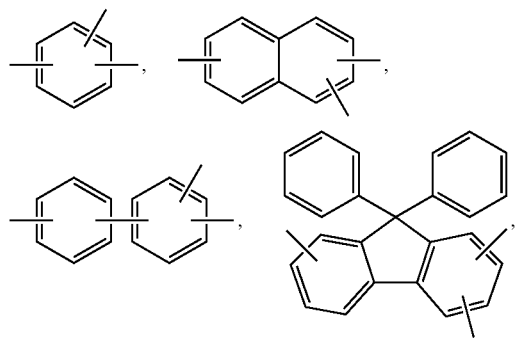

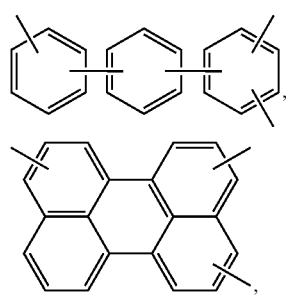

42
-continued

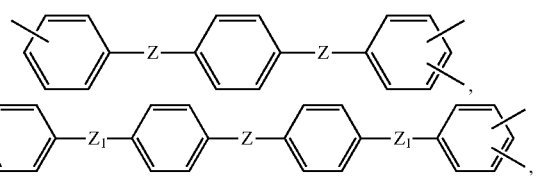

wherein:

R is a substituted or un-substituted $C_1$-$C_{10}$ alkyl or $C_1$-$C_{10}$ alkoxy group, or a substituted or un-substituted $C_6$-$C_{20}$ aryl group, or a substituted or un-substituted $C_4$-$C_{20}$ heteroaryl group; and Z is O, S, C(=O), CH(OH), S(=O)$_2$, Si(CH$_3$)$_2$, (CH$_2$)$_m$, (CF$_2$)$_n$, C(CH$_3$)$_2$, C(CF$_3$)$_2$, or C(=O)NH, wherein m is an integer of from 1 to 10, and n is an integer of from 1 to 10;

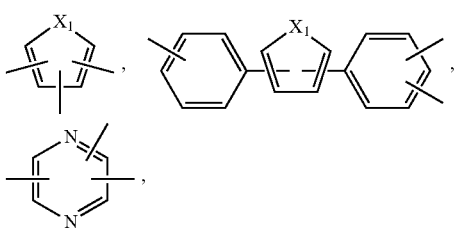

wherein:

$Z_1$ is O, S, C(=O), or S(=O)$_2$;

wherein:

$X_1$ is N, O, or S;

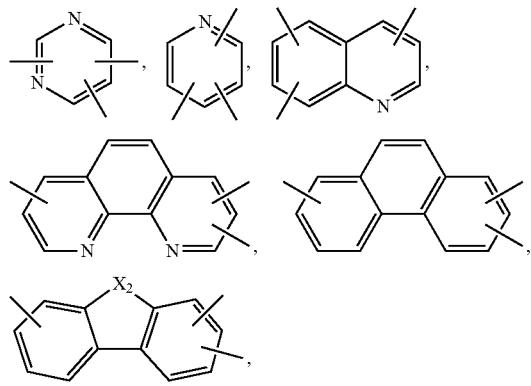

wherein:

$X_2$ is S, O, NR, Se, or $SiR_2$:

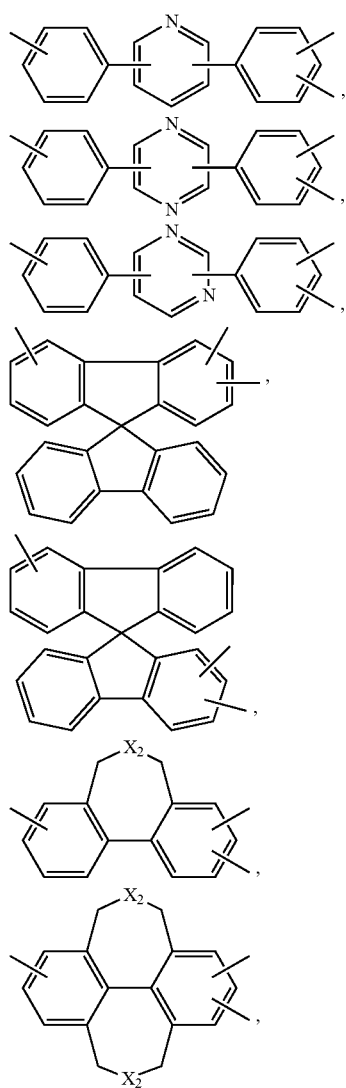

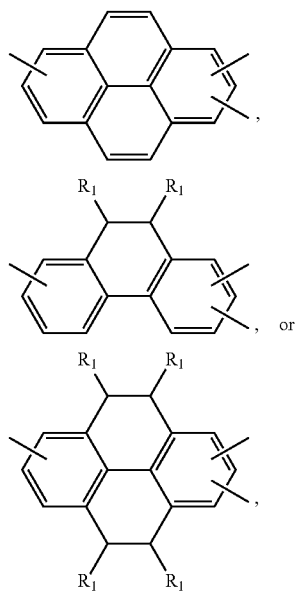

wherein:

$R_1$ is hydrogen, a substituted or un-substituted $C_1$-$C_{10}$ alkyl or $C_1$-$C_{10}$ alkoxy group, or a substituted or un-substituted $C_6$-$C_{20}$ aryl group, or a substituted or un-substituted $C_4$-$C_{20}$ heteroaryl group; and o-FG is an ortho-positioned functional group (ortho to nitrogen of the imide ring) selected from —OH, —SH, —NH$_2$, and —NHR, wherein R is selected from a substituted or un-substituted $C_6$-$C_{20}$ aryl group, or a substituted or un-substituted $C_4$-$C_{20}$ heteroaryl group.

More preferably, $Ar_1$ of repeating unit of Formula IV is selected from the following structures:

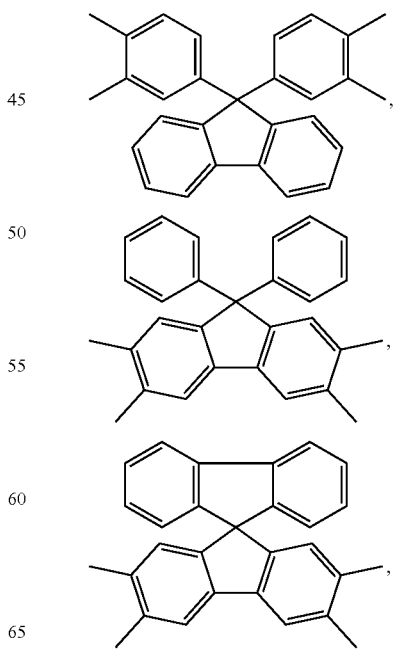

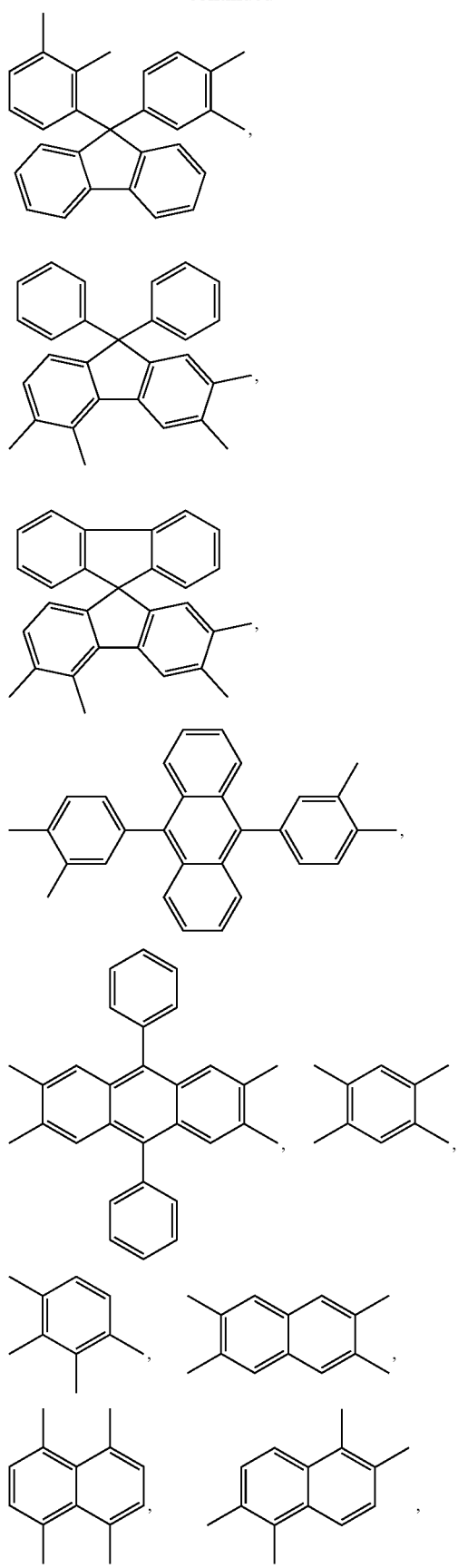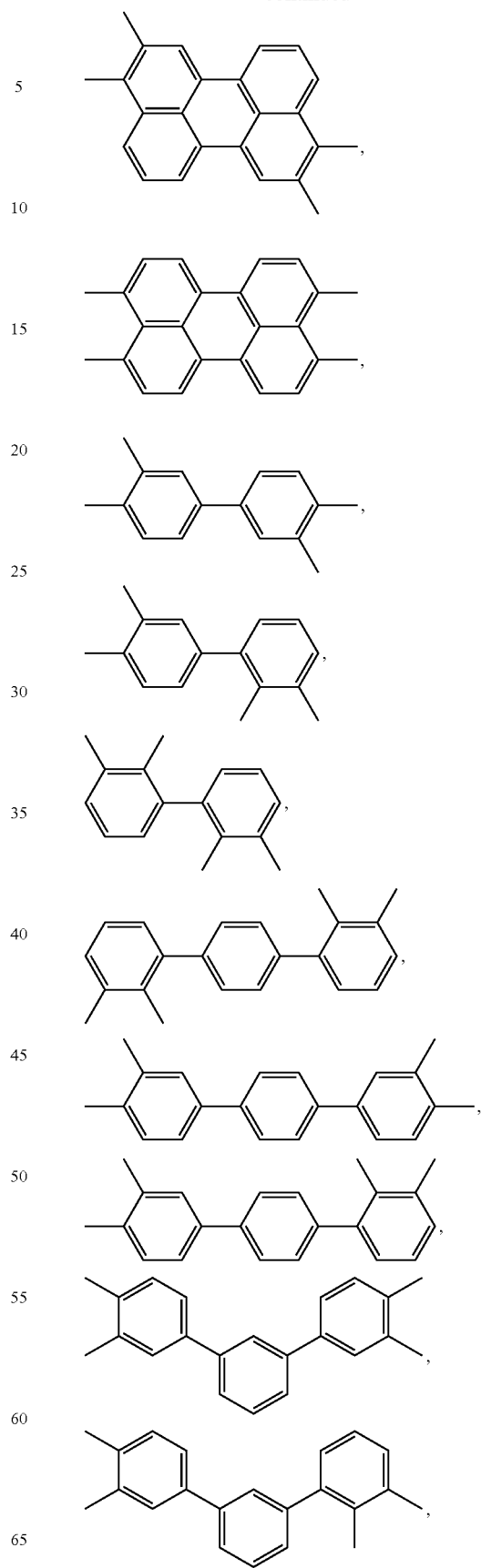

-continued
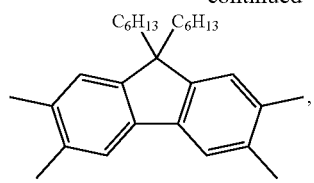
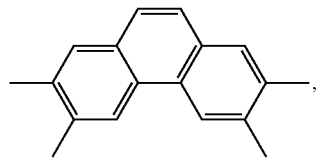
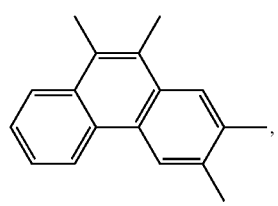
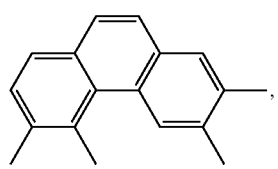
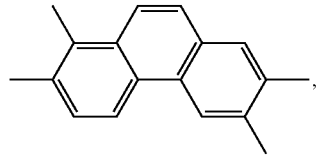
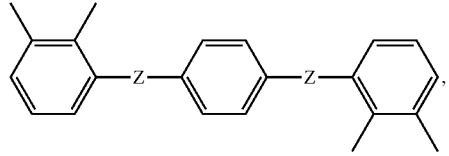
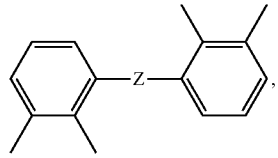
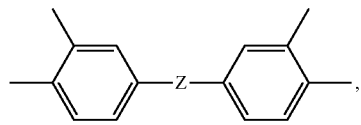
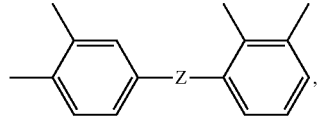
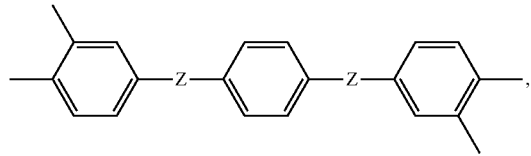
-continued
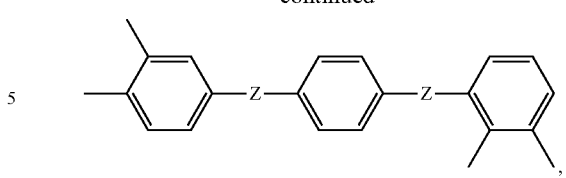
wherein Z is O, S, C(=O), CH(OH), S(=O)$_2$, Si(CH$_3$)$_2$, CH$_2$, CF$_2$, C(CH$_3$)$_2$, C(CF$_3$)$_2$, or C(=O)NH;
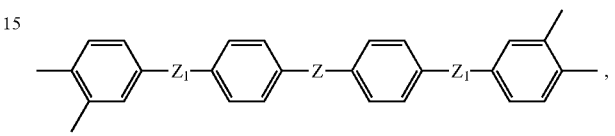
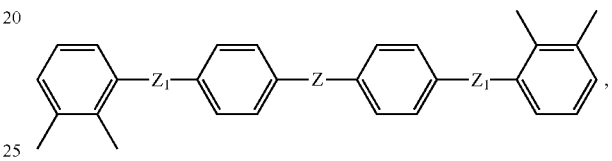
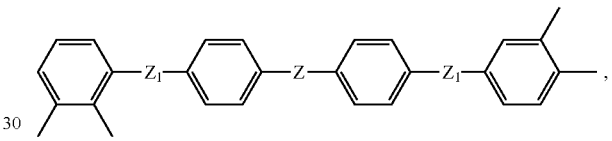
wherein:
Z$_1$ is O, S, S(=O)$_2$, or C(=O); and Z is as defined above;
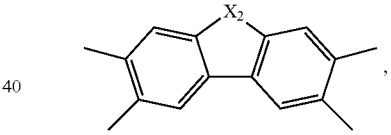
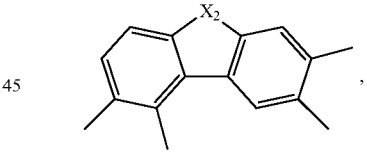
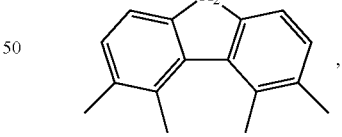
wherein:
X$_2$ is S, O, NR, Se, or SiR$_2$;
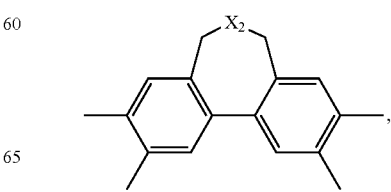

-continued
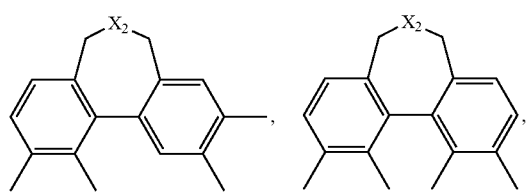
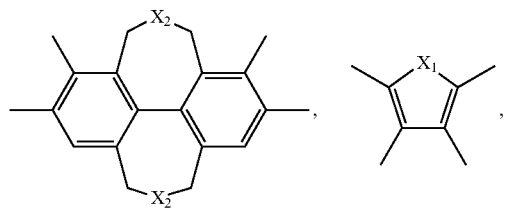
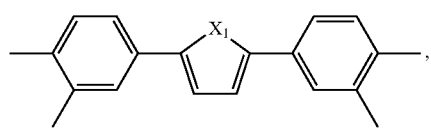
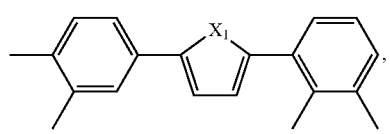
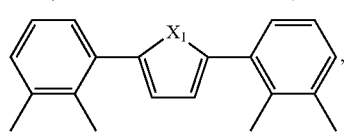
wherein:
X$_1$ is N, O, or S; and X$_2$ is as defined above;
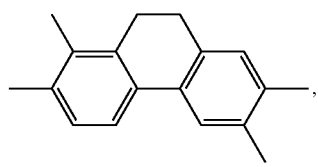
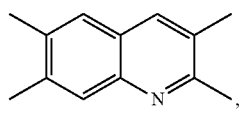
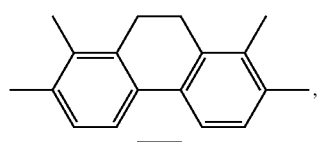
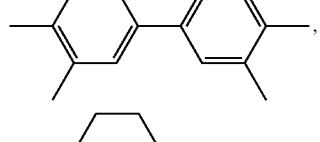
-continued
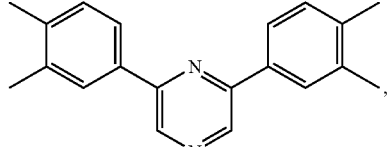
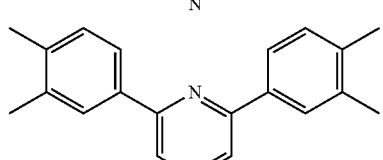
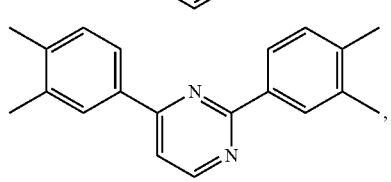
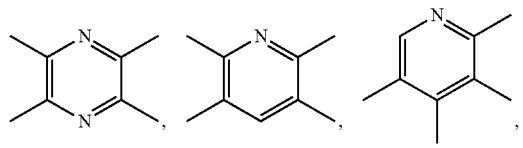
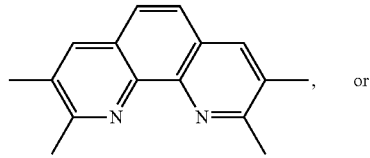
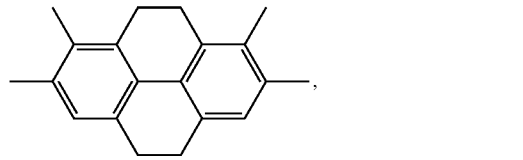
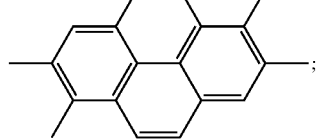, or
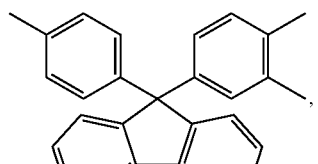;
Ar$_2$ of repeating unit of Formula IV is selected from the following structures:
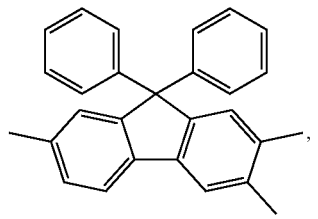

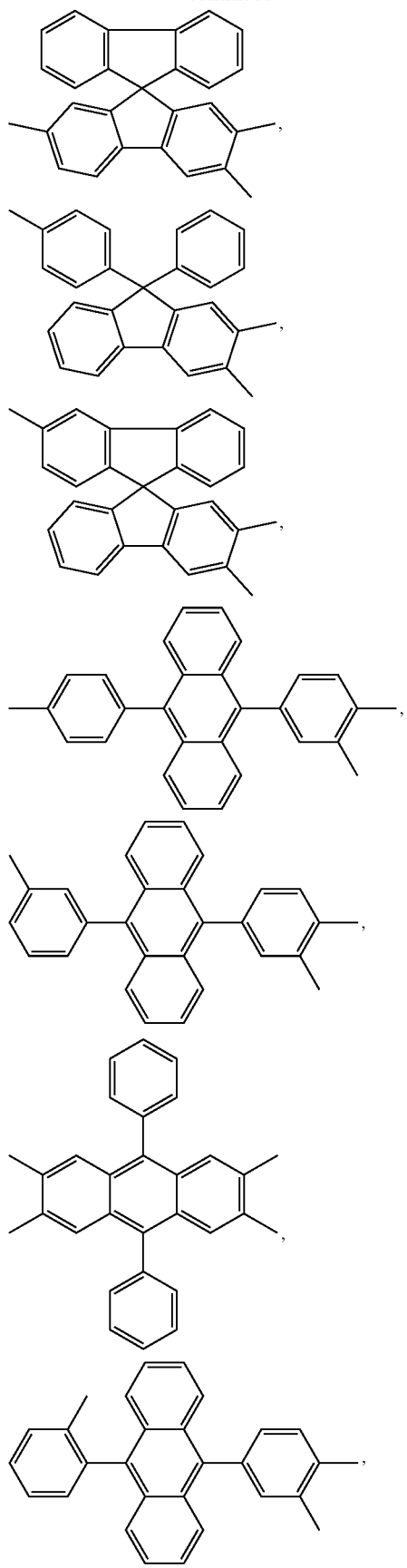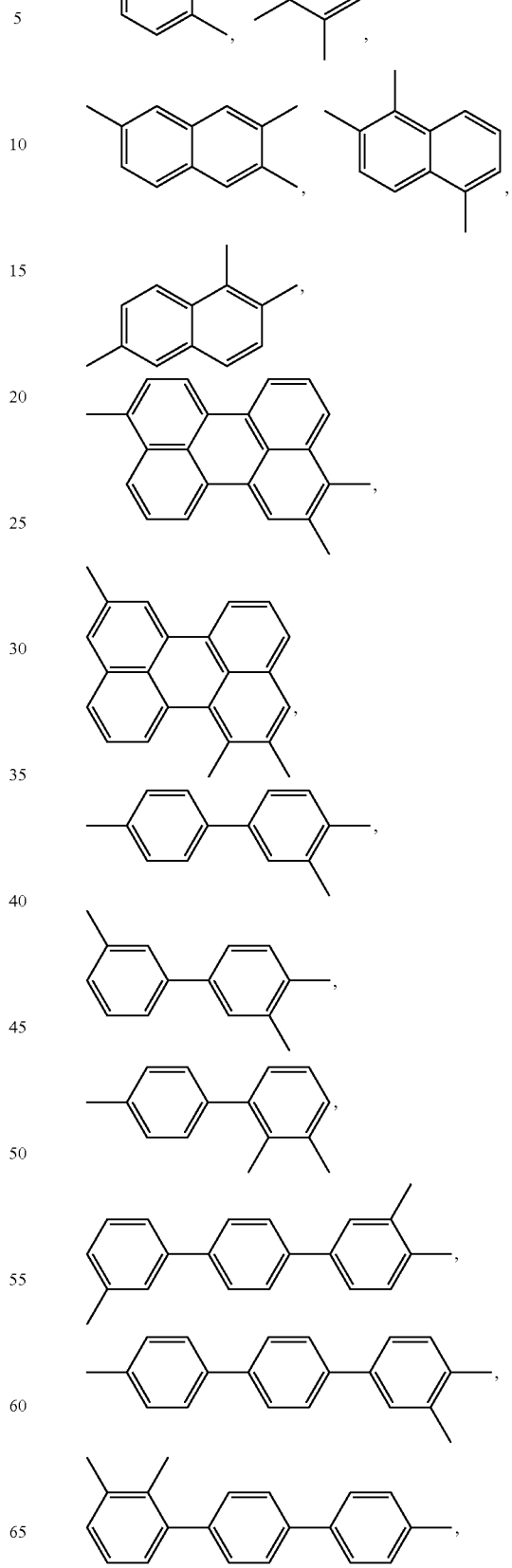

-continued
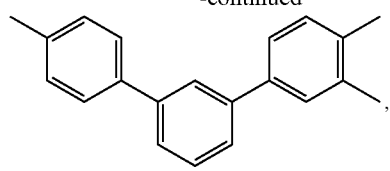
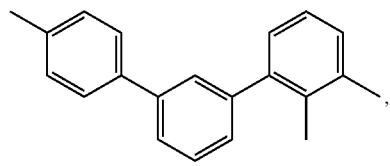
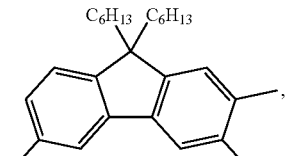
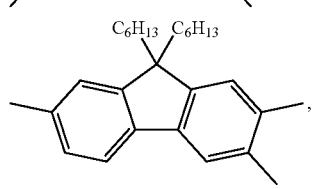
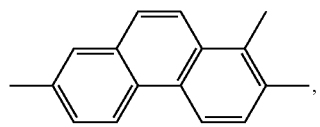
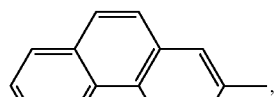
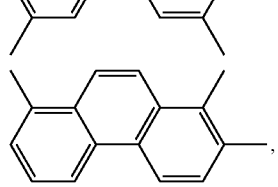
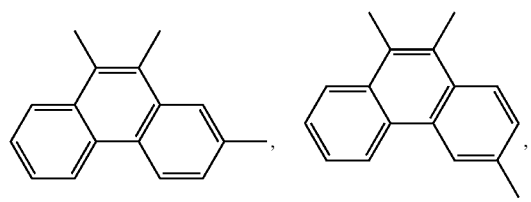
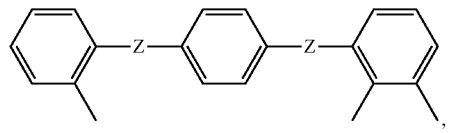
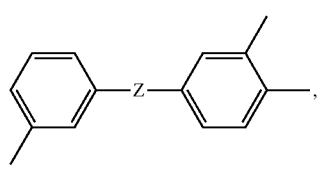
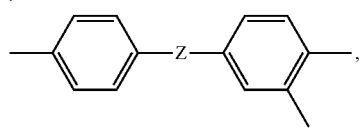
-continued
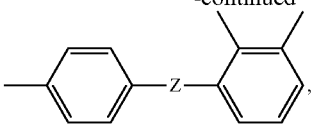
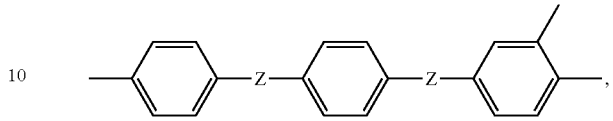
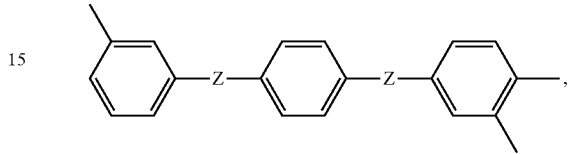
wherein Z is O, S, C(=O), CH(OH), S(=O)$_2$, Si(CH$_3$)$_2$, CH$_2$, CF$_2$, C(CH$_3$)$_2$, C(CF$_3$)$_2$, or C(=O)NH;
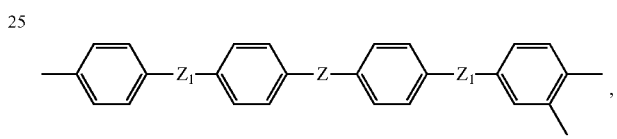
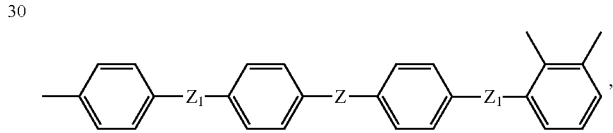
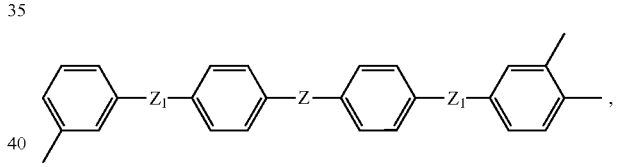
wherein:
Z$_1$ is O, S, S(=O)$_2$, or C(=O); and Z is as defined above;
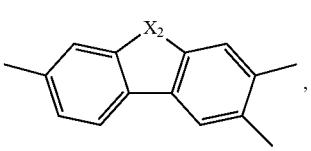
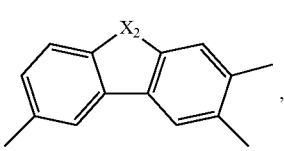
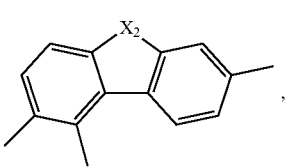

wherein:
X$_2$ is S, O, NR, Se, or SiR$_2$;
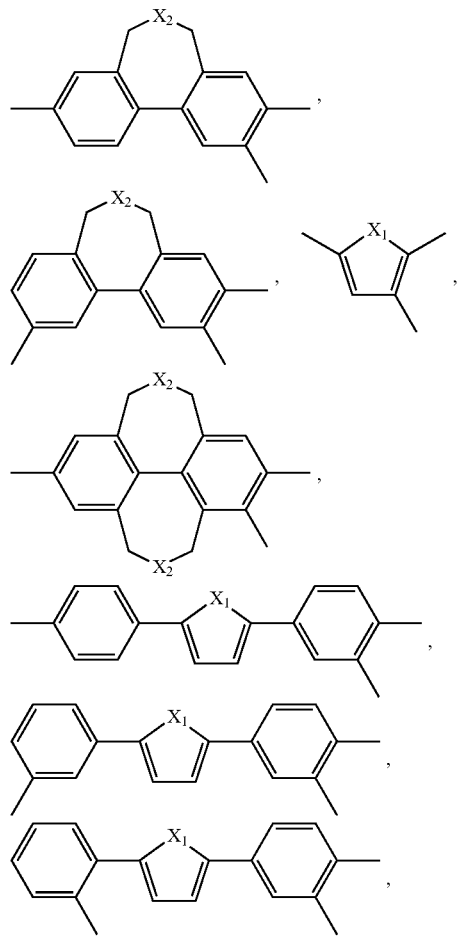
wherein:
X$_1$ is N, O, or S; and X$_2$ is as defined above;
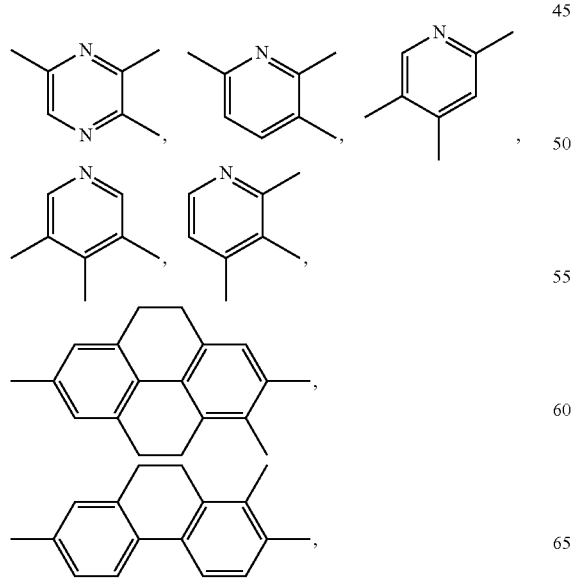
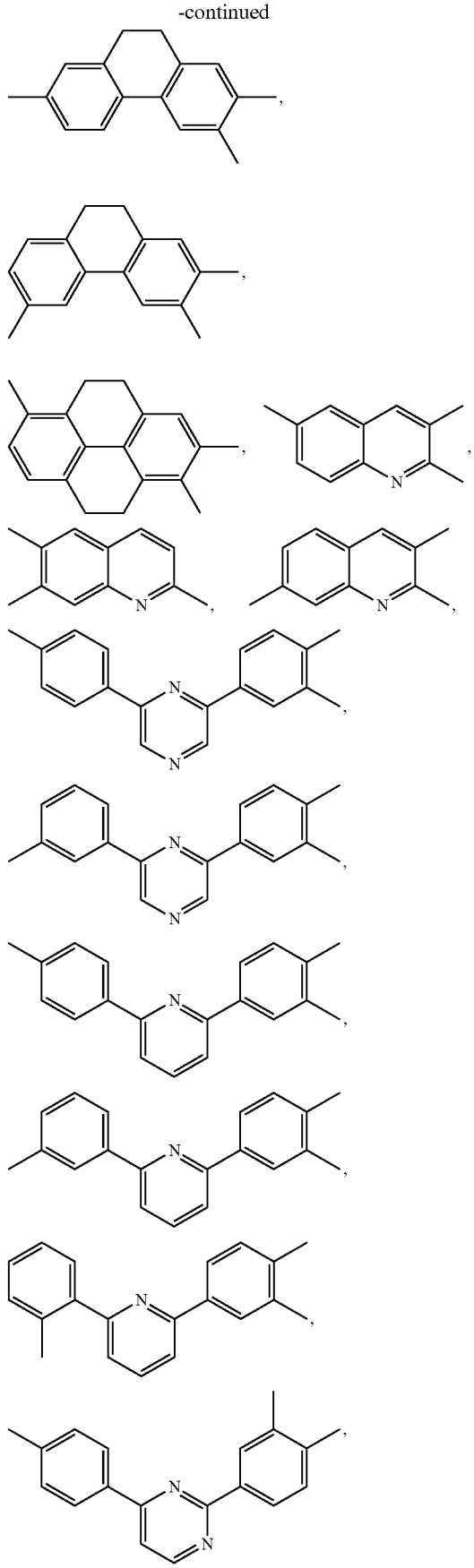

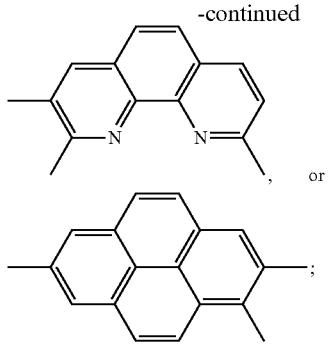

and o-FG is an ortho-positioned functional group (ortho to nitrogen of the imide ring) selected from —OH, —SH, and —NHR, wherein R is selected from a substituted or un-substituted $C_6$-$C_{20}$ aryl group, or a substituted or un-substituted $C_4$-$C_{20}$ heteroaryl group.

A preferred embodiment comprises heat treatment of aromatic polyimide precursor comprising repeating unit of Formula IV via irreversible molecular rearrangement of, wherein $Ar_1$ is selected from the following structures:

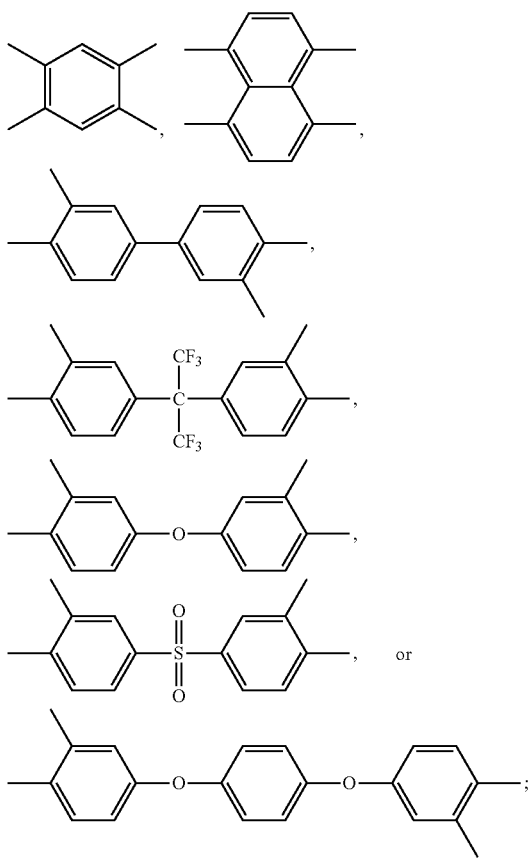

$Ar_2$ is selected from the following structures:

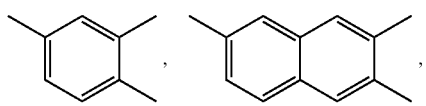

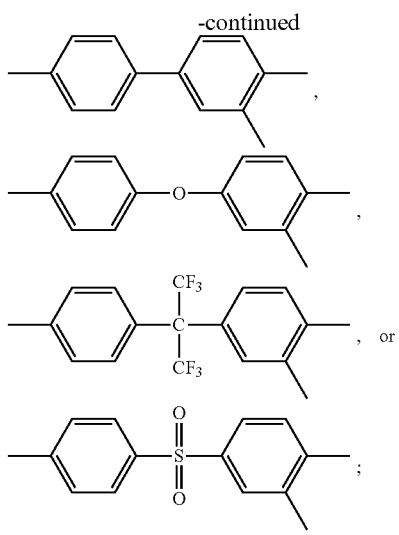

and o-FG is an ortho-positioned functional group (ortho to nitrogen of the imide ring) selected from —OH, —SH, and —NH-phenyl.

The aromatic polyimide precursor comprising repeating unit of Formula IV can be produced by methods well known in the art, e.g., reacting an aromatic tetracarboxylic dianhydride component with an aromatic diamine component at a pre-determined ratio in a polar solvent whereby a polyamic acid is formed first, followed by dehydration and ring closure to form polyimide.

The tetracarboxylic dianhydride and diamine components can be used either individually or as a mixture of two or more thereof or in combination to produce polyimide polymer or copolymer.

It is desired for a polyimide to have a relatively high molecular weight to produce membranes as hollow fibers or flat sheets with good mechanical properties. Thus, the polymerization and imidation reaction between a tetracarboxylic dianhydride component and a diamine component at a ratio close to 1 results in polyimide with a relatively high molecular weight. The molar ratio of a tetracarboxylic acid component and a diamine component is preferred to be 0.95:1 to 1.05:1, more preferably 0.98:1 to 1.02:1, to obtain a polyimide component having a relatively high molecular weight.

The polymerization and imidation reaction is carried out by reacting a tetracarboxylic dianhydride component and a diamine component at a predetermined ratio in a polar solvent at a temperature from 0° C. to 250° C. (the temperature not being higher than the boiling point of the solvent) for 2 to 48 hours, whereby polyamic acid is formed, followed by dehydration and ring closure to form an imide group. The imidation step can be carried out by thermal or chemical means. By thermal means, the polyamic acid solution is either heated at a temperature from 120° C. to 250° C. for 1 to 48 hours, or by casting the polyamic acid solution onto a substrate, and thermal treating the resulting coating in solid state at 100 to 300° C. for 15 minutes to 5 hours under an inert atmosphere or vacuum. By chemical means, the polyamic acid solution is heated with a dehydrating agent at a temperature of 30° C. to 180° C. for 1 to 48 hours. In some cases wherein the diamine component is protonated by an acid such as hydrochloric acid or sulfuric acid, the polyamic acid is formed in situ and imidized thermally at elevated temperature. Or the protonated diamine component can be released by neutralizing with a base such as triethylamine or pyridine, and then free diamine can react with tetracarboxylic dianhydride to form polyamic acid.

The aromatic polyimide precursor comprising repeating unit of Formula IV containing ortho-positioned functional groups of —OH, —SH, —NHR are thermally treated to convert to polymeric material of the present invention represented by Formulae I-III as polybenzoxaloles (X=Y=O), polybenzothiazoles (X=Y=S), and polybenzimidazole (X=Y=N-phenyl) via irreversible intermolecular and intermolecular rearrangement.

The thermal treatment of the aromatic polyimide precursor comprising repeating unit of Formula IV is preferably carried out in the form of membrane such as flat sheet or film, or fibers. The membrane of the aromatic polyimide precursor comprising repeating unit of Formula IV is prepared either by casting the polymer solution to form a free standing film sheet, or spun as a hollow fiber.

The invention also contemplates the use of copolymers, such as copolyimides, including linear and branched structures, as well as physical blends of two or more of these materials. Branched polymers include graft polymers, star polymers, dendrimers, and hyperbranched polymers.

To enhance mechanical properties of the aromatic polyimide precursor comprising repeating unit of Formula IV and the polymeric material comprising repeating units of Formulae I-III, crosslinking additives can be utilized to promote crosslinking after the membrane is formed from the aromatic polyimide precursor. This can be done thermally, chemically, electrically or with radiative exposure.

There are numerous methods for crosslinking that are familiar to one skilled in the art. Some representative crosslinking strategies include, but are not necessarily limited to:

a) reacting an amine or carboxylic acid or other Lewis basic units with di-epoxide crosslinkers;
b) reacting epoxide units within the polymer with difunctional amines, carboxylic acids, or other difunctional Lewis basic unit;
c) irradiative or radical-initiated crosslinking of double bond-containing units, such as acrylates, methacrylates, cinnamates, or other vinyl groups;
d) reacting multivalent metal salts with ligating groups within the polymer (the reaction of zinc salts with carboxylic acid-containing polymers is an example);
e) using crosslinkable moieties that react via the Knoevenagel condensation reaction, such as (2-acetoacetoxy)ethyl acrylate and methacrylate;
f) reacting amine, thiol, or carboxylic acid groups with a divinyl compound (such as bis(vinylsulfonyl) methane) via a Michael addition reaction;
g) reacting carboxylic acid units with crosslinkers having multiple aziridine units or carbodiimide units;
h) reacting crosslinkers having multiple isocyanate units with amines, thiols, or alcohols within the polymer;
i) mechanisms involving the formation of interchain sol-gel linkages, such as the trimethoxysilyl moiety;
j) thermal crosslinking of ethynyl groups attachment to the polymer;
k) auto oxidative crosslinking, such as employed by alkyd resins;
l) sulfur vulcanization;
m) processes involving ionizing radiation; and
n) thermal cyclization of trifluorovinylether to form perfluorocyclobutane.

The crosslinking moieties are preferable attached to polymer backbone as pedant side chain. For example, the crosslinking moiety can be incorporated into monomers as substituted aromatic tetracarboxylic dianhydrides, or aromatic diamines.

The molecular weight of the aromatic polyimide precursor comprising repeating unit of Formula IV is important in the formation of a membrane. Preferably, the aromatic polyimide precursor comprising repeating unit of Formula IV has a molecular weight above the entanglement molecular weight of the polymer to achieve materials that have high strength and are not brittle. If the molecular weight of the polymer is too low, the membrane is too brittle. If the molecular weight is too high, processability can become difficult. The aromatic polyimide precursor comprising repeating unit of Formula IV preferably have an average molecular weight of from 10,000 to 400,000, more preferably from 20,000 to 350,000, still more preferably from 25,000 to 300,000.

The membranes produced from aromatic polyimide precursor comprising repeating unit of Formula IV can take any form known in the art, for example hollow fibers, tubular shapes, spiral wound, pleated, flat sheet, or polygonal tubes. A preferred form for the hollow fiber membranes is integrally skinned or composite asymmetric hollow fibers, which provides both a very thin selective skin layer and a high packing density, to facilitate use of large membrane areas. Multiple hollow fiber membrane tubes are preferred for their relatively large contact area. The contact area may be further increased by adding additional tubes or tube contours.

Hollow fibers can be formed, for example, by extruding a polymer solution through an annular capillary nozzle, e.g., a spinneret, with a core fluid used for the purpose of retaining the hollow fiber geometry. The process involves the phase inversion of the glassy polymer solution of the present invention. A phase inversion process is a known film formation technique in which a polymer solution is brought into contact with a coagulation bath to cause phase inversion. The phase inversion process described by Loeb, et al. in U.S. Pat. No. 3,133,132, which is incorporated herein by reference. U.S. Pat. No. 3,133,132 discloses forming a polymer solution into film, evaporating the solvent from the film of the polymer solution, which can lead to the development of a dense layer, then immersing the film into a coagulating bath (a solvent miscible with the solvent of the polymer solution and non-solvent for the polymers (incapable of dissolving the polymer)) to induce phase separation thereby to form fine pores, which can lead to the formation of a porous support layer. The dense layer has such denseness as to have substantially different permeation rates depending on gas species and therefore functions to separate gas species. On the other hand, the porous support layer has such porosity as to have practically no gas separation functionality.

Asymmetric hollow fiber membrane can be provided by extruding a solution of polymer through a spinneret into hollow fiber geometry. The polymer solution is forced through a spinneret with a core fluid used for the purpose of retaining the hollow fiber geometry. Immediately thereafter, the extruded hollow fibers are passed through an air or nitrogen gas atmosphere and then immersed in a coagulation bath substantially incapable of dissolving the polymer components and compatible with the solvent of the glassy polymer solution to form an asymmetric structure. Subsequently, the hollow fibers are dried and, if desired, heat treated to make a separation membrane.

These fibers typically have a diameter similar to a human hair and offer the advantage of very high surface area per unit volume. Industrial hollow fiber membrane modules typically contain up to hundreds of thousands of individual hollow fibers. Specifically, to maximize productivity, the hollow fibers typically include an ultrathin (<2000 Angstroms) dense layer on a porous support. Gas separation is accomplished through this selective dense layer. This selective dense layer may be supported on the same polymer to form an integrally skinned asymmetric hollow fiber membrane. The selective dense layer may be located on either the outer or inner surface of the hollow fiber. The most advanced membranes have an asymmetric sheath with the selective dense layer supported on an inexpensive porous core support layer (different polymer) to form a composite hollow fiber membrane as described in U.S. Pat. No. 5,085,676, the contents of which are hereby incorporated by reference. The glassy polymer of the present invention can be used both as dense layer and support layer for the hollow fiber membrane.

To maintain the hollow fiber shape immediately after the extrusion, the solution of the aromatic polyimide precursor comprising repeating unit of Formula IV to be extruded through the spinneret can have a solution viscosity of 20,000 to 300,000 centipoise, preferably 30,000 to 250,000 centipoise, more preferably 40,000 to 200,000 centipoise, at the spinning temperature of between 25° C. to 100° C. Coagulation is preferably carried out by first immersion in a first coagulation bath where the membrane is coagulated to an extent enough to retain its hollow fiber shape, taking up the membrane by a guide roll, and a second immersion in a second coagulating bath, and optionally into additional successive baths, where the membrane is thoroughly coagulated and effectively washed to remove solvent and non-solvents. The hollow fiber membranes then undergo an efficient drying process to remove the coagulating liquid.

In the present invention, the membrane prepared from a polymeric material comprising repeating units of Formulae I-III is achieved by the thermal treatment of the membrane prepared from the aromatic polyimide precursor comprising repeating unit of Formula IV at 350° C. to 500° C. for 15 minutes to 24 hours under vacuum or an intert atmosphere. The thermal treatment can be conducted on the membrane prepared from the aromatic polyimide precursor comprising repeating unit of Formula IV in a batch or a continuous mode. In the continuous mode, the process can be conducted during the membrane fabrication or off-line after membrane drying. The batch mode can be conducted on membrane fiber bundles for situations where exposure times are not amenable for continuous operations.

Selection of solvent for the polymer solutions used in the production of the membrane depends on the solubility characteristics of the polymer and the viscosity requirement of the solution. Typically, the amount of polymer in solution can vary from about 10 to 60 weight percent, preferably 15 to 50 weight percent, more preferably 20 to 45 weight percent. If the concentration is too low and solution has low viscosity, the membrane is prone to have defects during phase inversion process. If the concentration is too high and the solution has high viscosity, the membrane tends to have thicker dense layer or reduced porosity as porous support layer resulting in reduced rate of permeation.

A viscosity enhancing agent or viscosity enhancing salt may be useful for making a polymer solution suitable for spinning into hollow fibers. Viscosity enhancing salts can be most useful when the molecular weight of the polymer is near the low end of the molecular weight range.

Typical solvents for solution of the aromatic polyimide precursor comprising repeating unit of Formula IV include but are not limited to solvents such as dimethyl formamide, N,N-dimethylacetamide, N-methylpyrrolidone, dimethyl sulfoxide and the like.

Mixtures of solvents also may be used in the solution of the aromatic polyimide precursor comprising repeating unit of Formula IV employed to form the layers of the membrane. The specific mixture of solvents may vary depending on the solubility parameters of the polymer and the viscosity of the solution. For example, two or more solvents may be used which vary in volatility or solvation power.

The solvent mixture can also contain additional components, such as polymer swelling agents, and non-solvent components. These added components may be useful, for example, to achieve a desired anisotropy in a layer by moving the polymer solution closer to its point of incipient gelation. These additional components may be characterized as extractable or non-extractable in the coagulation bath. Extractable components, that is, materials which are extractable in an aqueous-based coagulation bath, may be useful, for example, as pore formers in a layer. Examples of extractable components include inorganic salts, and polymers, such as polyvinyl pyrrolidone. Non-extractable components may find utility as, for example, membrane permeation modifiers. Non-extractable materials vary in composition dependent on whether the end use of the polymer is the dense separating layer or the porous support layer, the composition of the polymer, solvent mixture and coagulation bath. Examples of the additional components which may be employed include, for example, discrete monomeric materials which are insoluble in the composition of the coagulation bath, polymerizable materials, such as moisture-curable siloxanes, and compatible or non-compatible polymers. These examples of additional components are merely illustrative and should not be considered limiting.

Suitable coagulation baths for the membranes vary depending on the composition of the polymer solutions employed and the results desired. Generally, the coagulation bath is miscible with the solvents of the polymers, but is a non-solvent for the polymers of each layer. However, the coagulation bath may be varied to achieve desired properties in the layer. This may be desirable depending on the solubility parameters of the dense layer polymer, or when specialized membrane configurations are desired. For example, the solvent of the dense layer polymer solution may be immiscible in the coagulation bath whereas the solvent of the support layer polymer solution may be miscible in the coagulation bath. A coagulation bath therefore may be a multi-component mixture of water and an organic solvent that is miscible with water and the solvent to be removed from the polymer. The temperature and composition of the bath also may be controlled to affect the extent and rate of coagulation. The desired coagulation media is water as it is nontoxic, nonflammable, low cost and usually an excellent coagulation media for the polymers. Water/alcohol mixtures or other water mixtures with soluble organic species to optimize the membrane properties can also be considered.

Hollow fibers can be employed in bundled arrays potted at either end to form tube sheets and fitted into a pressure vessel thereby isolating the insides of the tubes from the outsides of the tubes. Devices of this type are known in the art. Sheets can be used to fabricate a flat stack permeator, which includes a multitude of membrane layers alternately separated by feed-retentate spacers and permeate spacers. The layers can be glued along their edges to define separate feed-retentate zones and permeate zones. Devices of this type are described in U.S. Pat. No. 5,104,532, the contents of which are hereby incorporated by reference.

Hollow fibers can be employed in bundled arrays of a few hollow fibers to several hundreds of thousands of hollow fiber membranes potted at either end to form tube sheets and fitted into a pressure vessel. The resulting hollow fiber membrane element has at least a mixed gas inlet, a permeate outlet, and a retentate (non-permeate) outlet in such a manner that the space leading to the inside of the individual hollow fibers and the space leading to the outside of the hollow fibers are isolated from each other. A gas mixture is fed from the mixed gas inlet to the space in contact with the inside or outside of the hollow fiber membrane. While the mixed gas flows along the hollow fiber membrane, a specific component in the mixed gas selectively passes through the membrane. The permeate gas is discharged from the permeate outlet, while the retentate gas that has not passed through the membrane is discharged from the retentate outlet, thus accomplishing gas separation. Devices of this type are known in the art.

The number of fibers bundled together will depend on fiber diameters, lengths, and porosities and on desired throughput, equipment costs, and other engineering considerations understood by those in the art.

The membranes can be fabricated into appropriate modules and included in a separation system for gas separation applications. Such system can include an outer perforated shell surrounding one or more inner tubes that contain the membranes. In one mode of operation, a gaseous mixture enters the separation system and the gaseous mixture passes through the inner tubes. As the gaseous mixture passes through the inner tubes, one or more components of the mixture permeate out of the inner tubes.

The membranes can be included in a cartridge and used for permeating contaminants from a gaseous mixture. The contaminants can permeate out through the membrane, while the desired components continue out of the membrane cartridge.

The membranes may be stacked within a perforated tube to form the inner tubes or may be interconnected to form a self-supporting tube. Each one of the stacked membrane elements may be designed to permeate one or more components of the gaseous mixture. For example, one membrane may be designed for removing carbon dioxide, a second for removing hydrogen sulfide, and a third for removing nitrogen. The membranes may be stacked in different arrangements to remove various components from the gaseous mixture in different orders.

Different components may be removed into a single contaminant collection zone and disposed of together, or they may be removed into different zones. The membranes may be arranged in series or parallel configurations or in combinations thereof depending on the particular application.

The membranes may be removable and replaceable by conventional retrieval technology, such as wire line, coil tubing, or pumping. In addition to replacement, the membrane elements may be cleaned in place by pumping gas, liquid, detergent, or other material past the membrane to remove materials accumulated on the membrane surface.

A gas separation system including the membranes described herein may be of a variable length depending on the particular application.

The gaseous mixture can flow through the membrane(s) following an inside-out flow path where the mixture flows into the inside of the tube(s) of the membranes and the components which are removed permeate out through the tube. Alternatively, the gaseous mixture can flow through the membrane following an outside-in flow path.

To prevent or reduce possibly damaging contact between liquid or particulate contaminates and the membranes, the flowing gaseous mixture may be caused to rotate or swirl within an outer tube. This rotation may be achieved in any known manner, for example using one or more spiral deflectors. A vent may also be provided for removing and/or sampling components removed from the gaseous mixture.

The membranes are preferably durable, resistant to high temperatures, and resistant to exposure to liquids. The materials may be coated, ideally with a polymer, to help prevent fouling and improve durability. Examples of suitable polymers include those described in U.S. Pat. Nos. 5,288,304 and 4,728,345, the contents of which are hereby incorporated hereinby reference. Barrier materials may also be used as a pre-filter for removing particulates and other contaminants that may damage the membranes.

The membrane of the present invention is particularly useful for separating fluid (i.e., gas and/or liquid) components. For example, applications include enrichment of air by nitrogen or oxygen, nitrogen or hydrogen removal from methane streams, removal of carbon dioxide, hydrogen sulfide and water vapor from natural gas streams, or carbon monoxide from syngas streams. The membrane can also be used in hydrogen separation from refinery streams and other process streams, for example from the dehydrogenation reaction effluent in the catalytic dehydrogenation of paraffins. Generally, the membrane may be used in any separation process with fluid mixtures involving, for example, hydrogen, nitrogen, methane and other hydrocarbons, carbon dioxide, carbon monoxide, helium or other noble gases, oxygen, water vapor and hydrogen sulfide. In preferred embodiments, separation is performed on a feed fluid comprising a gas pair selected from the group consisting of $O_2/N_2$, $CO_2/CH_4$, $CO_2/N_2$, $H_2/N_2$, $He/N_2$, $H_2/CH_4$, $He/CH_4$, $He/H_2$, $H_2/CO_2$ and $He/CO_2$.

Of particular interest is air separation, where nitrogen as the non-permeating gas stream is enriched and available for use as a blanketing atmosphere for flammable fluid protection (such as oil, gasoline and other flammable chemical storage and transportation). A prominent example of this is a membrane system used onboard oil tankers to provide a blanketing nitrogen atmosphere. Another well-known use is the use of membranes to provide nitrogen atmospheres for perishable food and flowers. Nitrogen atmosphere blanketing using membranes is also employed for annealing, carbonizing, sintering, wave soldering and laser cutting. Nitrogen from membranes is also employed for tire inflation. Air enrichment of oxygen for enhanced combustion applications would benefit from membranes of the present invention. Another application involves $CO_2/CH_4$ separation with primary emphasis on natural gas separation from various natural gas sources including landfill gas, enhanced oil recovery applications involving $CO_2$ injection and coal bed methane purification. Another $CO_2$ separation of future potential interest involves $CO_2/N_2$ separation of flue gas to collect the $CO_2$ for environmental sequestration. Hydrogen sulfide removal from natural gas is another application presently employing membranes relevant to this invention. Hydrogen separation processes of interest include $H_2/N_2$ separation of ammonia purge gas and $H_2/CH_4$ separation for various petrochemical processes. $H_2/CO$ separation is another separation of interest in the petrochemical industry. The membranes can be utilized in gas separation hybrid processes involving purification of streams for pressure swing adsorption or cryogenic separation of gases. Helium purification from natural gas sources or helium recovery from applications, such as helium based blimps and deep-diving applications are also within the scope of the invention. Dehydration of compressed air or natural gas, a well-known membrane separation method, is also of interest. Specific membranes of the present invention can be useful for alkane/alkene separation, such as propane/propylene or ethane/ethylene.

While the invention has been described in detail and with reference to specific examples thereof, it will be apparent to one skilled in the art that various changes and modifications can be made therein without departing from the spirit and scope thereof.

EXAMPLES

The invention and its advantages are further illustrated by the following specific examples.

Scheme 1 provides the polymer structures synthesized in the following examples.

In the following examples, unless stated otherwise, weight average molecular weight ($M_w$) was obtained by size exclusion chromatography (GPC) on a Waters Alliance 2690 Separator System connected to 2410 RI and 2996 PDA detectors using PLgel 10 um MIXED-BLS 300×7.5 mm GPC columns. HPLC grade tetrahydrofuran (THF) was employed as mobile phase and N-methylpyrrolidone (NMP) as a flow mark. Samples of the polymer for GPC analysis were prepared in the following manner. About 20 mg amount of the polymer was charged into a 20 mL sample vial. A 10 g of THF with a drop of NMP was also added into the 20 mL vial to dissolve the polymer and provide a 0.15% to 0.2% weight concentration solution. About 1.0 mL of the solution was filtered through a 0.45 um nylon filter, and then transferred into a sample vial and place on the auto sample carousel, and was analyzed via GPC at a temperature of 40° C. and a flow rate of 1 mL/min to determine the molecular weight using polystyrene as a standard.

Thermal gravity analysis (TGA) was performed on a TA Instruments model TGA Q5000 at a heating rate of 10° C./min to 600° C. under a nitrogen flow of 25 ccm/minute.

X-ray diffraction analysis: A ½"×½" piece was cut from larger sheets of each sample film and placed on a zero-background mount. Each sample was scanned on the MPD between $1.5° \leq 2\theta \leq 80°$ using X'Celerator optics, Co radiation, a 0.033° step size, and a 1600 sec count time.

$^{13}$C NMR analysis: The samples wAS dissolved in DMSO-d6 with 0.02M chromium acetylacetonate added as a relaxation agent for the $^{13}$C experiments. The NMR experiments were performed at ambient temperature employing the Bruker Avance 500 FT-NMR spectrometer equipped with a 10 mm BBO probe. Quantitative $^{13}$C NMR data was acquired using inverse-gated decoupling, a 30° pulse, and a 6 second relaxation delay. The $^{13}$C chemical shift scale was referenced to the solvent peak.

Scheme 1. Polymer Structures

Example 1

Synthesis of Polymer P2

Polymer P2 was prepared as following: An oven dry 3-neck 500 mL round-bottomed flask was equipped with a mechanical stirrer, a nitrogen inlet, a thermocouple, and a Dean-Stark trap and a condenser capped with a drying tube. To the flask was added 4,4'-(hexafluoroisopropylidene)diphthalic anhydride (6FDA, purchased from DuPont Company) (15.63 g, 0.035 mol), 2,4-diaminophenol hydrochloride (DAPH, purchased from Aldrich Chemical Company) (6.93 g, 0.035 mol), N-methylpyrrolidone (NMP, electronic grade purchased from Mallankroft) (77.43 g), and xylenes (20.0 g). The polymerization concentration in NMP was targeted for 20% solid of polymer. The Dean-Stark trap was filled with 29.2 g of xylenes (purchased from Aldrich Chemical Company). The polymerization temperature was maintained at 160-165° C. for 24 hours. Xylenes was distilled from Dean-Stark trap. After cooling to room temperature, the polymer was precipitated into water and collected by vacuum filtration. The polymer was washed with water by soaking in water for 2 hours under stirring, filtered and dried under vacuum at 100° C. overnight. Polymer was obtained as an yellow solid with a slight brown tint at 16.45 g (88% yield). GPC indicated the polymer has a weight average molecular weight of 139,110.

Example 2

Synthesis of Polymer P3

Polymer P3 was prepared using the same procedure as P2, except that the polymerization concentration in NMP was targeted for 15% solid of polymer, and the polymerization temperature was maintained at 175° C. for 16 hours. Some gel

C-P1

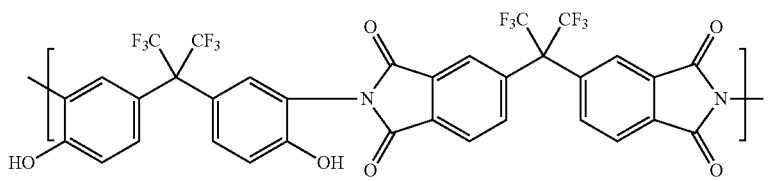

P2, P3, P4

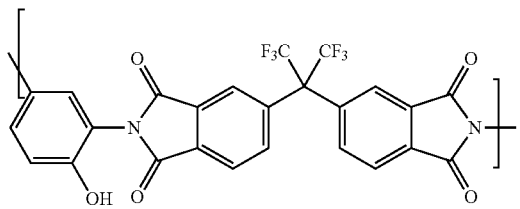

P5

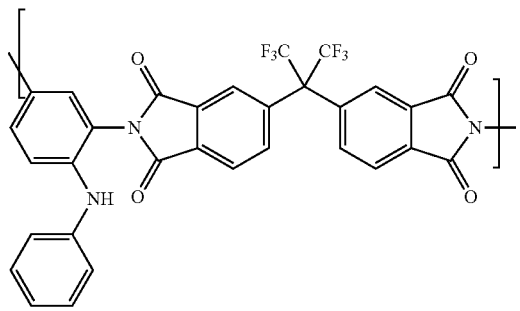

formation was observed at the end of polymerization. GPC indicated the polymer has a weight average molecular weight of 14,729.

Example 3

Synthesis of Polymer P4

An oven dry 3-neck 500 mL round-bottomed flask was equipped with a mechanical stirrer, a nitrogen inlet, a thermocouple, and a drying tube. To the flask was added 2,4-diaminophenol hydrochloride (DAPH, purchased from Aldrich Chemical Company) (6.93 g, 0.035 mol), and N-methylpyrrolidone (NMP, electronic grade purchased from Mallankroft) (49.5 g). DAPH did not dissolve in NMP. After stirring for 30 minutes at room temperature, triethylamine (purchased from Aldrich Chemical Company) (7.83 g, 0.077 mol) was added. Reaction temperature increased slightly and DAPH mostly dissolved while some salt formation occurred and precipitated. The reaction was heated up to 50-55° C. for 2 hours and cooled to room temperature by removing the heating source. The reaction was then cooled in an ice bath. To the cooled mixture was added 4,4'-(Hexafluoroisopropylidene)diphthalic anhydride (6FDA, purchased from DuPont Company) (15.63 g, 0.035 mol) which was split into 5 equal additions at 15 minutes interval for each addition to maintain temperature lower than 4° C. At each addition, 4.8 g of NMP was added as well. The reaction was warmed up to room temperature by removing the ice bath. To the reaction was added 20.5 g of xylenes (purchased from Aldrich Chemical Company). The drying tube was replaced with a Dean-Stark trap and a condenser, and the drying tube was now connected to the condenser. The Dean-Stark trap was filled with 25.6 g of xylenes. The polymerization concentration in NMP was targeted for 20% solid of polymer. The polymerization temperature was maintained between 150° C. for 24 hours. After cooling to room temperature, the polymer was precipitated into 1 liter of de-ionized water in a warring blender. The polymer was filtered, washed with water by soaking in water for 2 hours under stirring, filtered again, and dried under vacuum at 100° C. overnight. GPC indicated the polymer has a weight average molecular weight of 95,771.

Example 4

Synthesis of Polymer P5

An oven dry 3-neck 500 mL round-bottomed flask was equipped with a mechanical stirrer, a nitrogen inlet, a thermocouple, and a drying tube. To the flask was added 2,4-diaminodiphenylamine (DADPA, purchased from TCI America) (17.03 g, 0.086 mol) and N-methylpyrrolidone (NMP, electronic grade purchased from Mallankroft) (154 g). The solution was cooled in an ice bath. To the cooled solution was added 4,4'-(Hexafluoroisopropylidene)diphthalic anhydride (6FDA, purchased from DuPont Company) (37.97 g, 0.086 mol) which was split into 5 equal additions at 15 minutes interval for each addition to maintain temperature lower than 4° C. At each addition, 13 g of NMP was added as well. Noticeable viscosity increase was observed at the $3^{rd}$ addition. The solution was stirred under nitrogen overnight during which time the reaction temperature warmed up to room temperature. To the reaction was added acetic anhydride (purchased from Aldrich Chemical Company) (60.76 g, 0.59 mol), and triethylamine (purchased from Aldrich Chemical Company) (17.2 g, 0.17 mol). The reaction temperature increased slightly. The reaction was then heated to 80° C. for 8 hours. The reaction was cooled down to room temperature and the polymer was precipitated into 1.5 liter of deionized water in a warring blender. The polymer was filtered, washed with water by soaking in water for 2 hours under stirring, filtered again, and dried under vacuum at 100° C. overnight. GPC indicated the polymer has a weight average molecular weight of 145,216.

Comparative Example 1

Synthesis of Polymer C-P1

An oven dry 3-neck 500 mL round-bottomed flask was equipped with a mechanical stirrer, a nitrogen inlet, a thermocouple, and a drying tube. To the flask was added 4,4'-(Hexafluoroisopropylidene)diphthalic anhydride (6FDA, purchased from DuPont Company) (41.30 g, 0.093 mol) and N-methylpyrrolidone (NMP, electronic grade purchased from Mallankroft) (96.5 g). The mixture was stirred under nitrogen at room temperature for half hour. 2,2-(3-amino-4-hydroxyphenyl)hexafluoropropane (bisAPAF, purchased from Central Glass Corporate, Japan) (33.70 g, 0.093 mol) was dissolved in 101 g of NMP and added to an additional funnel. The bisAPAF solution was added drop wise to the 6FDA/NMP mixture in the flask to maintain temperature below 40° C. After addition, the additional funnel was rinsed with 27.5 g of NMP. The viscous solution was stirred at room temperature under nitrogen overnight. To the reaction was added 27 g of xylenes (purchased from Aldrich Chemical Company). The drying tube was replaced with a Dean-Stark trap and a condenser, and the drying tube was now connected to the condenser. The Dean-Stark trap was filled with 22 g of xylenes. The reaction was heated up slowly with a heating mantle to reflux. The polymerization temperature was maintained between 160 to 180° C. After 24 hours of heating, xylenes was distilled from Dean-Stark trap. After distillation, the polymerization was held at 186° C. for an hour and then cooled down to room temperature. The polymer solution contained about 25% polymer in NMP. A sample of polymer was precipitated into cold water. The polymer was filtered, rinsed with water and dried under vacuum at 100° C. overnight. GPC indicated the polymer has a weight average molecular weight of 164,218.

Preparation of Films and Testing

Preparation of Polymer Films

Polymer P5 8.61 g was dissolved in 23.83 g of N-methylpyrrolidone (NMP, electronic grade purchased from Mallankroft) in a 4 oz glass bottle. The bottle was placed on a roller mill and rolled overnight to obtain a homogenous solution. A 8 in.×8 in. glass plate was cleaned by sonicating in soapy de-ionized water for at least 10 minutes, and rinsed with de-ionized water. After drying in air, the glass plate was rinsed and wiped with acetone and then heptane using cleanroom wipes and allowed to air dry.

About 2 g of solution was poured on the glass plate in a line and drawn down using a 20 mil drawdown bar. The wet coating was placed in a $N_2$ purge box at room temperature to limit the exposure to humidity and covered with another glass plate to slow solvent evolution using a ½ in. spacer. After overnight, the glass plate and coating was removed from nitrogen purge box and placed in DI water. The coating separated from the glass plate in a few minutes as a flexible film and was allowed to air dry. The film was then dried under vacuum at 100° C. overnight. Thermal treatment of the film was carried out by curing the film in a box furnace. The film was placed between two porous alumina plates. The thermal curing program is as following: hold at 30° C. for 30 minutes with about 1 liter/minute house $N_2$ flow throughout, ramp to 250° C. at 10° C./minute and, hold for 1 hour. After cooling to room temperature, the film was evaluated for gas permeation.

Gas Permeation Testing

Permeation coefficients were measured on a Dow Cell permeation unit. The apparatus is used to evaluate the permeability of polymer film to pure gases. A polymer film is sealed by a viton o-ring into a brass or SS cell. The film forms a semi-permeable barrier between two components in the cell. During the experiment, a slow purge of test gas is passed across the upper surface of the film and vented thru a silicone oil-filled bubbler. The opposite film surface and cell compartment is initially under vacuum. The permeability of the gas is determined by measuring the pressure rise in the second compartment as a function of time, generally up to 3 torr. The measurement is performed until repeatable permeation values are achieved. Historical data indicate that permeation coefficients are accurate to within 10% of the value. The test results are summarized in Table 1.

TABLE 1

Permeation testing results

| Sample | $P(CO_2)$ | $P(CH_4)$ | Alpha $(CO_2/CH_4)$ |
|---|---|---|---|
| C-P1-400C | 227.6 | 4.53 | 50.2 |
| P2-250C | 7.0 | 0.14 | 50.0 |
| P2-450C | 223.3 | 5.30 | 42.1 |
| P3-400C | 48.9 | 0.73 | 67.0 |
| P4-200C | 5.9 | 0.095 | 62.1 |
| P4-350C | 30.4 | 0.44 | 69.1 |
| P4-400C | 100.8 | 1.76 | 57.3 |
| P5-250C | 16.0 | 0.35 | 45.7 |
| P5-400C | 33.8 | 0.77 | 43.9 |
| P5-450C | 68.0 | 1.67 | 40.7 |

| | $P(O_2)$ | $P(N_2)$ | Alpha $(O_2/N_2)$ |
|---|---|---|---|
| P3-400C | 6.5 | 1.2 | 5.4 |

Mechanical Property Testing

The microtensile test was carried out using ASTM D1708 method at 0.2 in/minute crosshead speed, 72 F, and 50% humidity. The results are summarized in Table 2. The tensile strength and elongation at break of P5 showed much improvement over comparative example C-P1.

TABLE 2

Microtensile test results

| Sample | Tensile strength (MPa) | Elongation at break (%) |
|---|---|---|
| C-P1-120C | 58.6 | 3.3 |
| C-P1-400C | 32.7 | 1.6 |
| P5-250C | 147.1 | 9.4 |
| P5-400C | 132.1 | 8.0 |

The invention claimed is:

1. A polymeric material comprising repeating units of the following Formulae I-III:

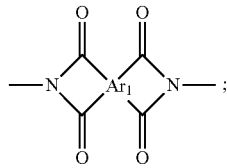

Formula I

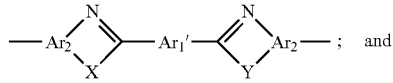

Formula II

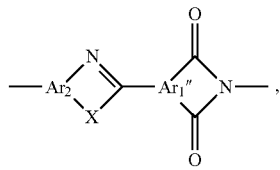

Formula III wherein:
Formula I can be connected to Formula II or III, but can not be connected to itself;
Formula II can be connect to Formula I or III, but can not be connected to itself; and
Formula III can be connected to Formula I or II or itself,
wherein:
$Ar_1$ is:
a) a tetravalent arylene group having 6 to 24 carbon atoms which is unsubstituted or substituted with at least one substituent selected from the group consisting of $C_1$-$C_{10}$ alkyl, $C_1$-$C_{10}$ haloalkyl, $C_1$-$C_{10}$ alkoxy, and $C_1$-$C_{10}$ haloalkoxy;
b) a tetravalent $C_4$-$C_{24}$ heteroarylene, which is unsubstituted or substituted with at least one substituent selected from the group consisting of $C_1$-$C_{10}$ alkyl, $C_1$-$C_{10}$ haloalkyl, $C_1$-$C_{10}$ alkoxy, and $C_1$-$C_{10}$ haloalkoxy; or
c) two or more of $Ar_1$ are fused together to form a fuse ring or are covalently bonded to each other via a functional group selected from the group consisting of O, S, C(=O), CH(OH), S(=O)$_2$, Si(CH$_3$)$_2$, (CH$_2$)$_m$, (CF$_2$)$_n$, C(CF$_3$)$_2$, and C(=O)NH, wherein m is an integer from 1 to 10, and n is an integer from 1 to 10;
$Ar_2$ is:
a) a $C_6$-$C_{24}$ trivalent arylene group;
b) a $C_4$-$C_{24}$ trivalent heteroarylene, which is unsubstituted or substituted with at least one substituent selected from the group consisting of $C_1$-$C_{10}$ alkyl, $C_1$-$C_{10}$ haloalkyl, $C_1$-$C_{10}$ alkoxy, and $C_1$-$C_{10}$ haloalkoxy; or
c) two or more of $Ar_2$ are joined together to form a fused ring or are covalently bonded to each other via a functional group selected from the group consisting of O, S, C(=O), CH(OH), S(=O)$_2$, Si(CH$_3$)$_2$, (CH$_2$)$_m$, (CF$_2$)$_n$, C(CF$_3$)$_2$, and C(=O)NH, wherein m is an integer from 1 to 10, and n is an integer from 1 to 10, wherein
$Ar_1$ and $Ar_2$ can be identical or different arylene or heteroarylene ring structures relative to each other;
$Ar_1'$ is a divalent group derived from $Ar_1$;
$Ar_1''$ is a trivalent group derived from $Ar_1$; and
X and Y are identical or different from each other, and are selected from O, S, NH, and NR, wherein R is a substituted or un-substituted $C_1$-$C_{10}$ alkyl or $C_1$-$C_{10}$ alkoxy, or a substituted or un-substituted $C_6$-$C_{20}$ aryl group, or a substituted or un-substituted $C_4$-$C_{20}$ heteroaryl group.

2. The polymeric material of claim 1, wherein Ar$_1$ is selected from the following structures:

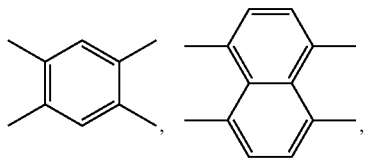

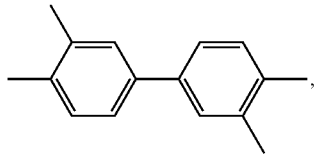

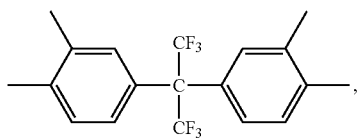

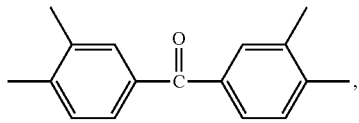

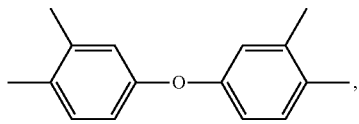

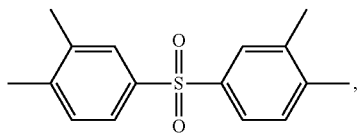

, and

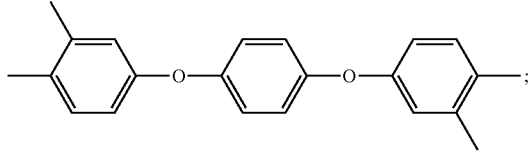

Ar$_2$ is selected from the following structures:

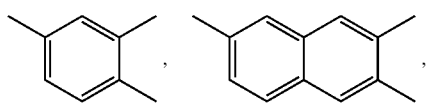

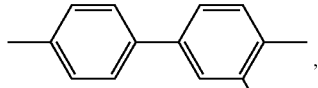

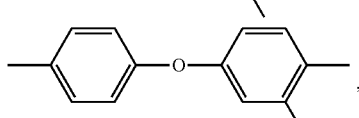

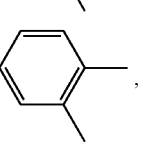

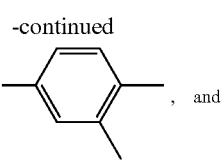

, and

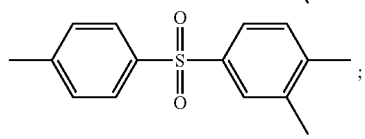

;

and X and Y are selected from O, S, and N-phenyl.

3. A method for preparing a polymeric material comprising repeating units of Formulae I-III:

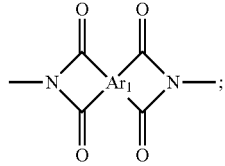

Formula I

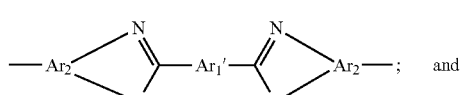

Formula II

; and

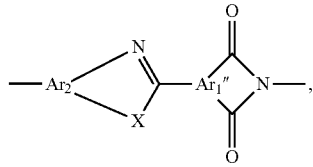

Formula III wherein:
Formula I can be connected to Formula II or III, but can not be connected to itself;
Formula II can be connect to Formula I or III, but can not be connected to itself; and
Formula III can be connected to Formula I or II or itself,
said method comprising the step of thermally treating an aromatic polyimide precursor comprising repeating unit of Formula IV via irreversible intermolecular and intermolecular rearrangement at about 350° C. to 500° C., wherein Formula IV has the structure:

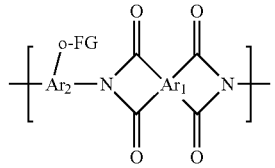

Formula IV wherein:
Ar$_1$ is a tetravalent C$_6$-C$_{24}$ arylene group, or a tetravalent C$_4$-C$_{24}$ heteroarylene, which is unsubstituted or substituted with at least one substituent selected from the group consisting C$_1$-C$_{10}$ alkyl or C$_1$-C$_{10}$ haloalkyl, C$_1$-C$_{10}$ alkoxy or C$_1$-C$_{10}$ haloalkoxy, or two or more of Ar$_1$ are fused together to form a fuse ring or covalently bonded to each other via a functional group selected from the group consisting of O, S, C(=O), CH(OH), S(=O)$_2$, Si(CH$_3$)$_2$, (CH$_2$)$_m$, (CF$_2$)$_n$, C(CF$_3$)$_2$, C(=O)NH, wherein m is an integer of from 1 to 10, and n is an integer of from 1 to 10;

Ar$_2$ is a trivalent C$_6$-C$_{24}$ arylene group, or a trivalent C$_4$-C$_{24}$ heteroarylene, which is unsubstituted or substituted with at least one substituent selected from the group consisting C$_1$-C$_{10}$ alkyl or C$_1$-C$_{10}$ haloalkyl, C$_1$-C$_{10}$ alkoxy or C$_1$-C$_{10}$ haloalkoxy, or two or more of Ar$_2$ are fused together to form a fuse ring or covalently bonded to each other via a functional group selected from the group consisting of O, S, C(=O), CH(OH), S(=O)$_2$, Si(CH$_3$)$_2$, (CH$_2$)$_m$, (CFA, C(CF$_3$)$_2$, C(=O)NH, wherein m is an integer of from 1 to 10, and n is an integer of from 1 to 10;

Ar$_1$ and Ar$_2$ are identical or different arylene or heteroarylene ring structures relative to each other; and o-FG is an ortho-positioned functional group (ortho to nitrogen of the imide ring) selected from —OH, —SH, —NH$_2$, and —NHR, wherein R is selected from a substituted or un-substituted C$_1$-C$_{10}$ alkyl or C$_1$-C$_{10}$ alkoxy group, or a substituted or un-substituted C$_6$-C$_{20}$ aryl group, or a substituted or un-substituted C$_4$-C$_{20}$ heteroaryl group.

4. The method of claim 3, wherein

Ar$_1$ is selected from the following structures:

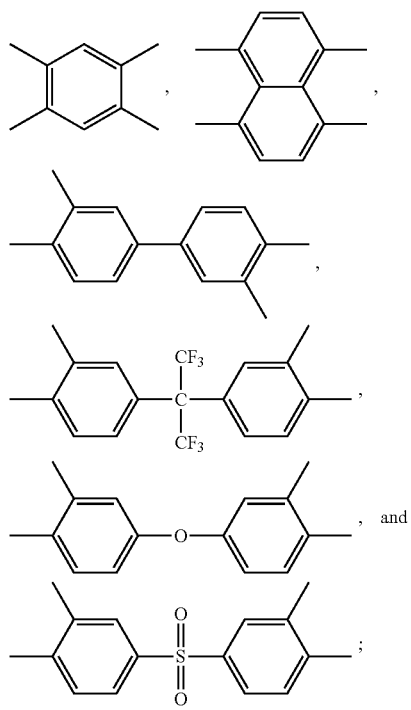

Ar$_2$ is selected from the following structures:

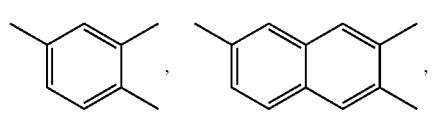

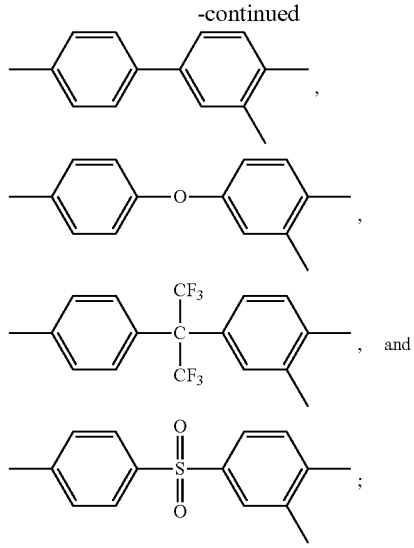

and o-FG is an ortho-positioned functional group (ortho to nitrogen of the imide ring) selected from —OH, —SH, and —NH-phenyl.

5. The method of claim 3, wherein thermal treatment is carried out at 350° C. to 500° C. for 15 minutes to 24 hours under vacuum or an inert atmosphere.

6. The method of claim 3, wherein the aromatic polyimide precursors comprising repeating units of Formula IV have an average molecular weight of 10,000 to 400,000.

7. A gas separation membrane comprising a polymeric material of claim 1.

8. The membrane of claim 7, which is an asymmetric gas separation membrane.

9. The membrane of claim 7, which is a hollow fiber membrane.

10. A method for separating components of a fluid, said method comprising:

providing a separation device comprising a polymeric material of claim 1 as a separation membrane;

feeding a feed fluid to the separation device, wherein the feed fluid comprises a mixture of a first fluid and at least one second fluid; and collecting a product from the separation device, wherein the product contains the first fluid at a higher purity than the feed fluid.

11. The method of claim 10, wherein the feed fluid comprises a gas pair selected from the group consisting of O$_2$/N$_2$, CO$_2$/CH$_4$, CO$_2$/N$_2$, H$_2$/N$_2$, He/N$_2$, H$_2$/CH$_4$, He/CH$_4$, He/H$_2$, H$_2$/CO$_2$ and He/CO$_2$.

12. The polymeric material of claim 1 wherein Ar$_1$ of the repeating units of Formulae I-III is selected from the following structures:

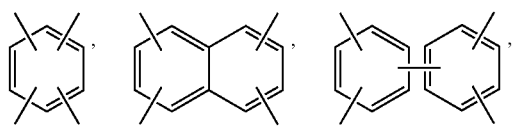

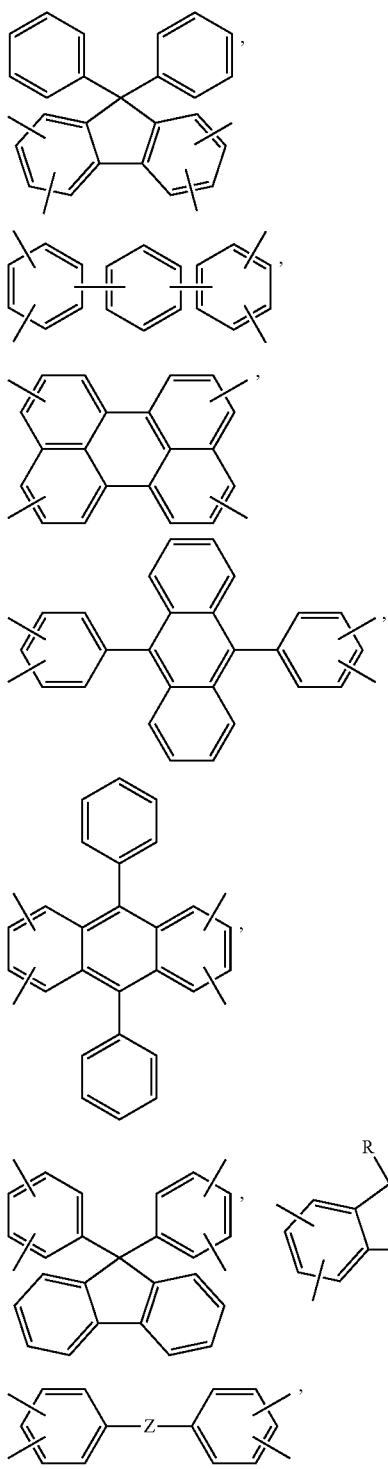

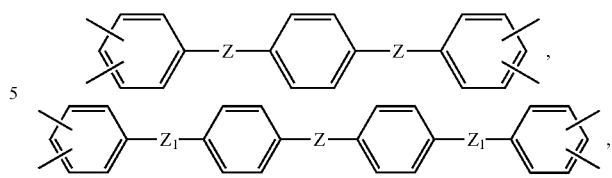

wherein,
$Z_1$ is O, S, C(=O), or S(=O)$_2$; and Z is as defined above;

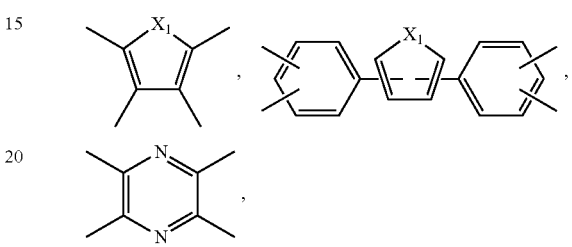

wherein:
$X_1$ is N, O, or S;

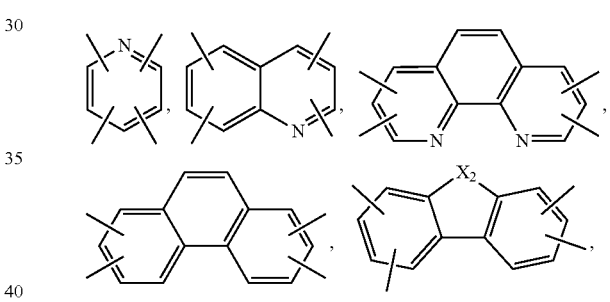

wherein:
$X_2$ is S, O, NR, Se, or SiR$_2$; and

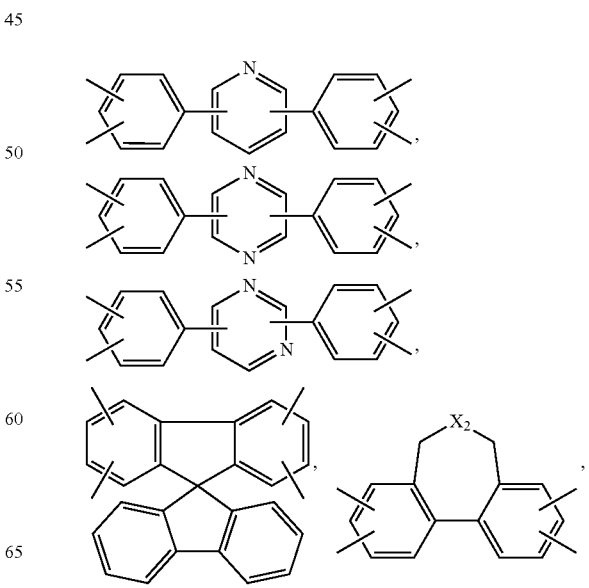

wherein,
R is a substituted or un-substituted $C_1$-$C_{10}$ alkyl or $C_1$-$C_{10}$ alkoxy group, or a substituted or un-substituted $C_6$-$C_{20}$ aryl group, or substituted or un-substituted $C_4$-$C_{20}$ heteroaryl group; and Z is O, S, C(=O), CH(OH), S(=O)$_2$, Si(CH$_3$)$_2$, (CH$_2$)$_m$, (CF$_2$)$_n$, C(CH$_3$)$_2$, C(CF$_3$)$_2$, or C(=O)NH, wherein m is an integer from 1 to 10, and n is an integer from 1 to 10;

-continued

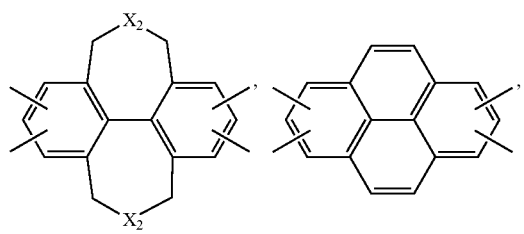

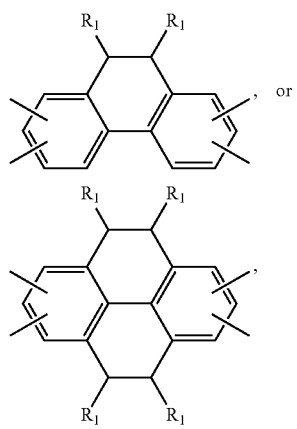

wherein:

R₁ is selected from hydrogen, a $C_1$-$C_{10}$ substituted or un-substituted alkyl group, a substituted or un-substituted $C_1$-$C_{10}$ alkoxy group, a substituted or un-substituted $C_6$-$C_{20}$ aryl group, or a substituted or un-substituted $C_4$-$C_{20}$ heteroaryl group.

13. The polymeric material of claim 1 wherein Ar₁ of repeating units of Formulae I-III is selected from the following structures:

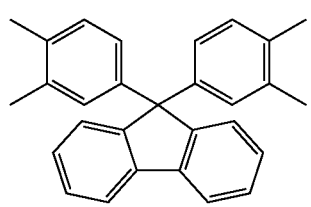

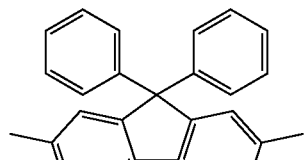

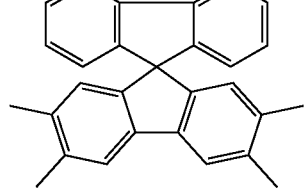

-continued

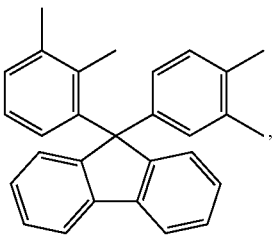

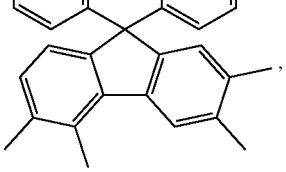

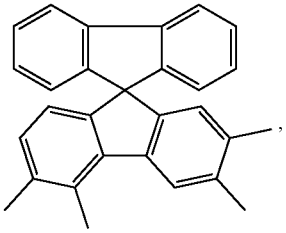

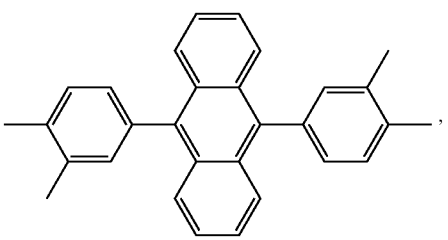

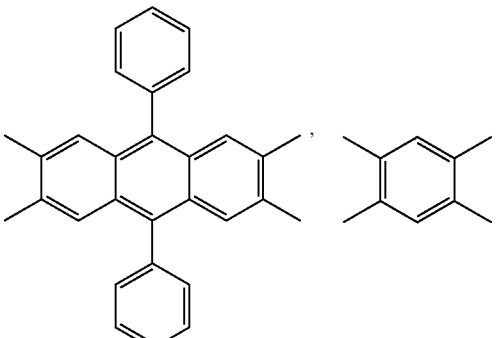

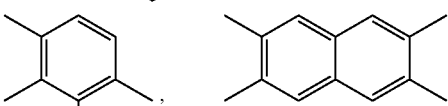

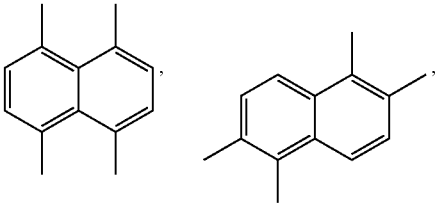

-continued
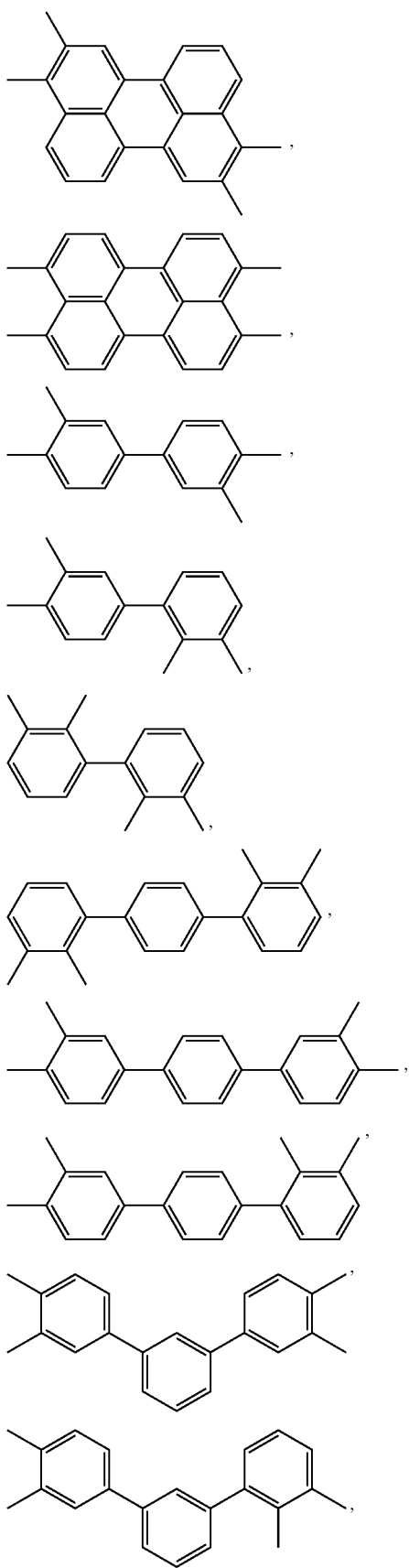
-continued
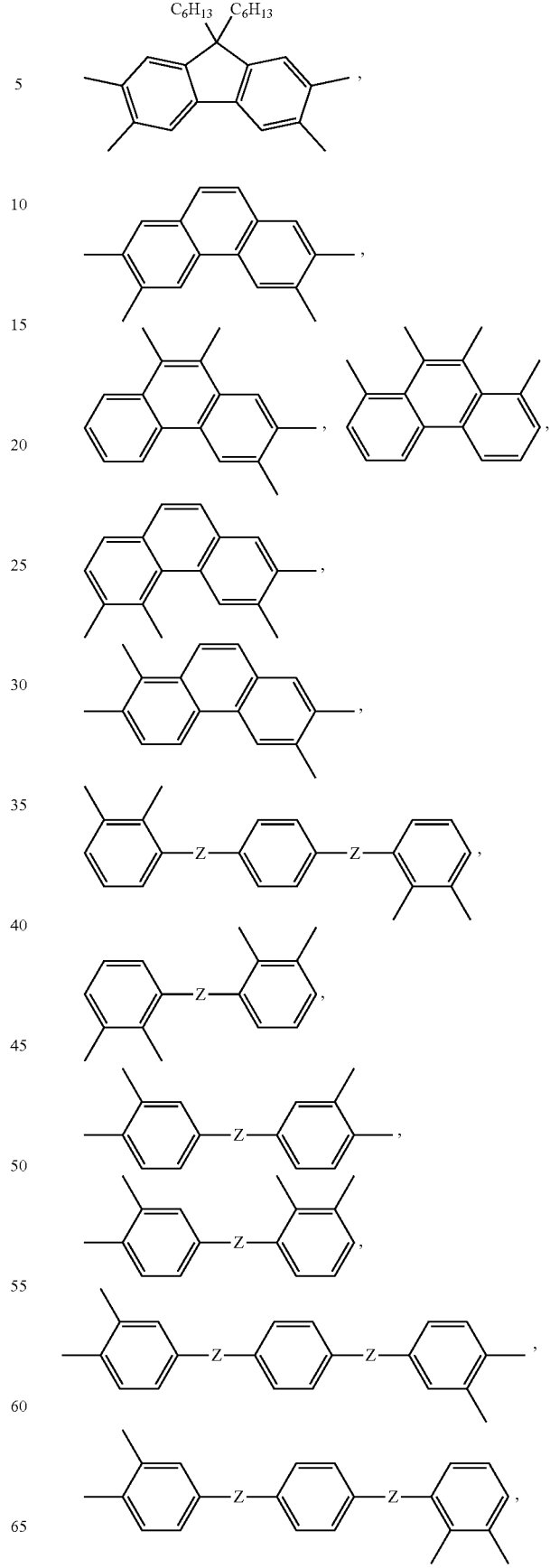

wherein Z is O, S, C(=O), CH(OH), S(=O)₂, Si(CH₃)₂, CH₂, CF₂, C(CH₃)₂, C(CF₃)₂, or C(=O)NH;
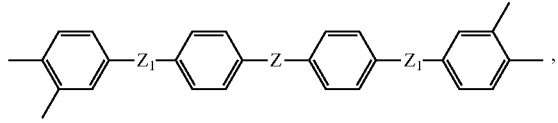
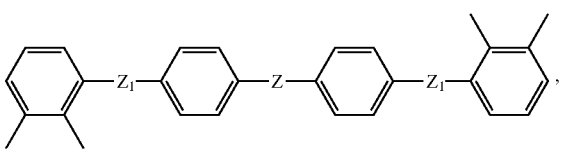
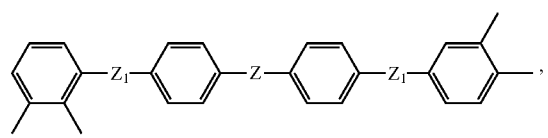
wherein:
Z₁ is O, S, S(=O)₂, or C(=O); and Z is as defined above;
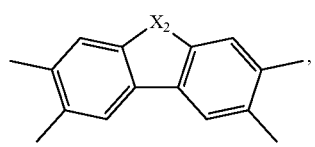
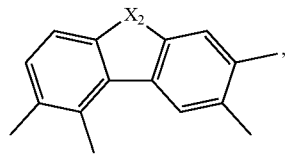
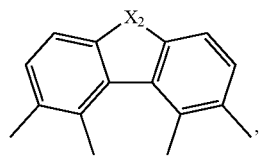
wherein:
X₂ is S, O, NR, Se, or SiR₂; and
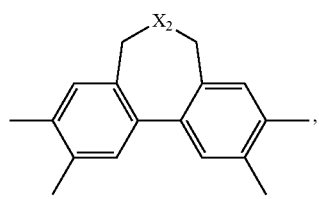
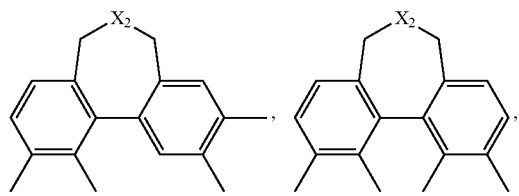
-continued
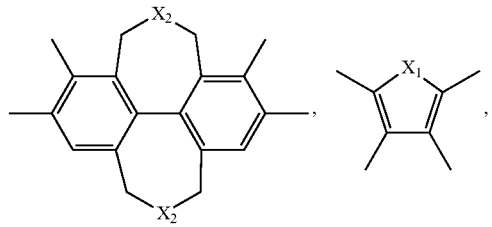
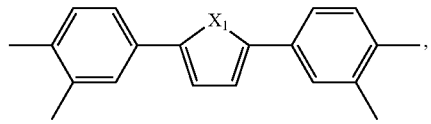
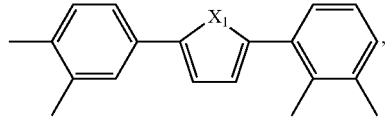
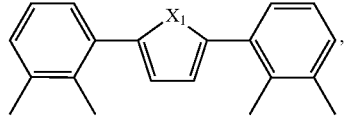
wherein:
X₁ is N, O, or S; and X₂ is as defined above.
14. The polymeric material of claim 1 wherein Ar₁ of repeating units of Formulae I-III is selected from the following structures:
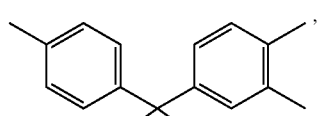
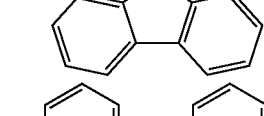
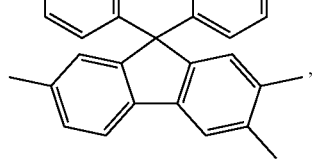
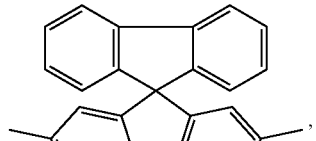
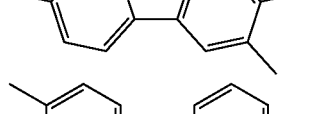
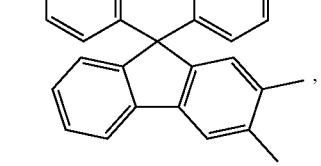

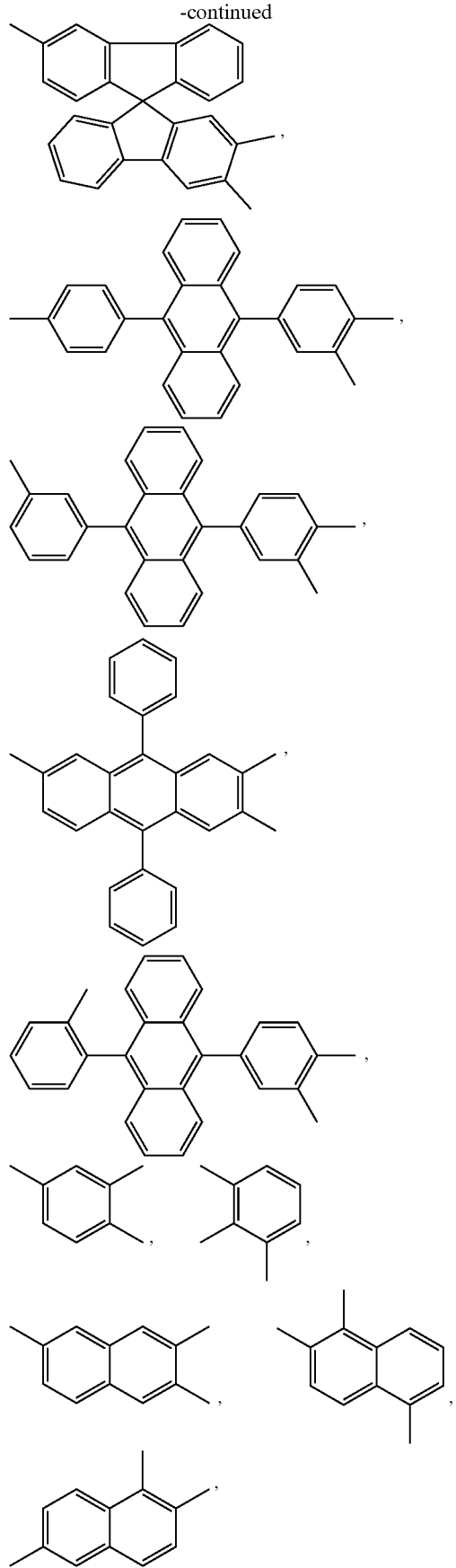
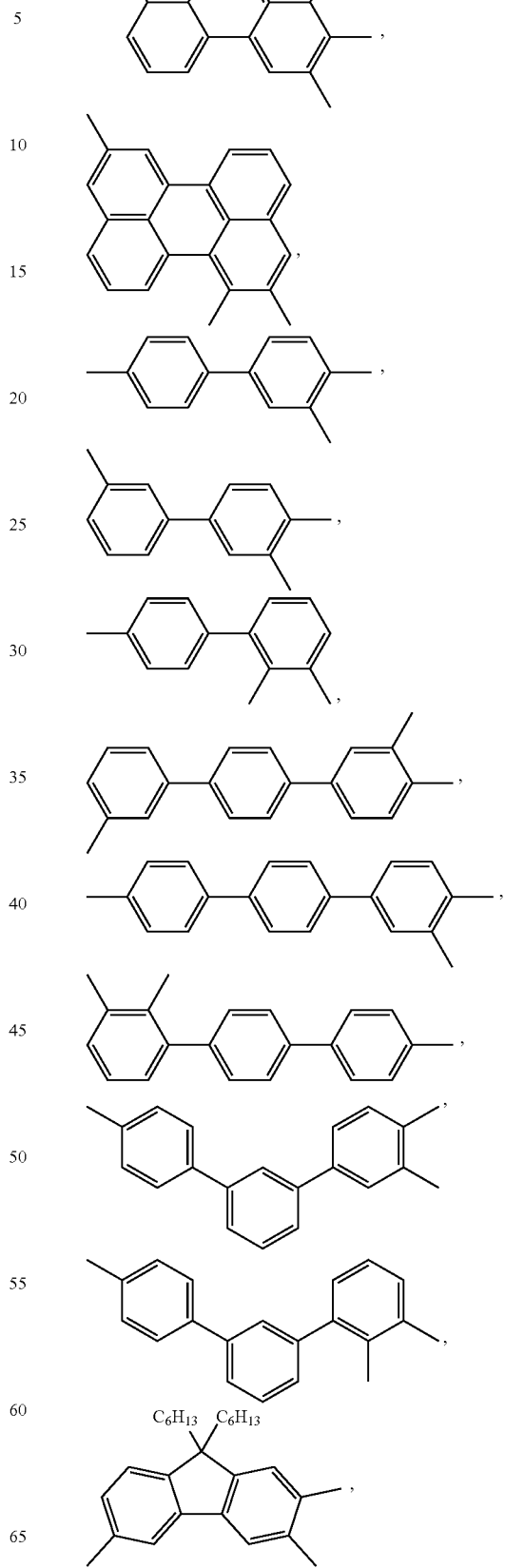

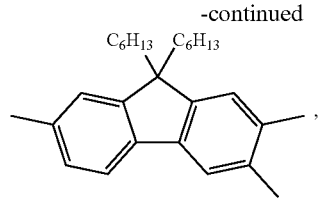
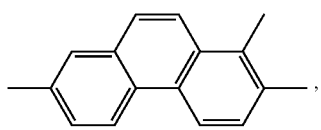
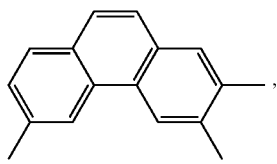
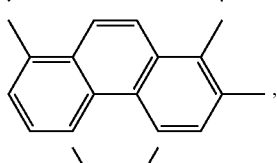
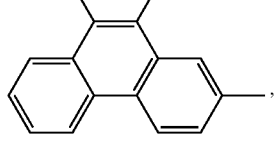
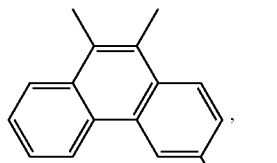
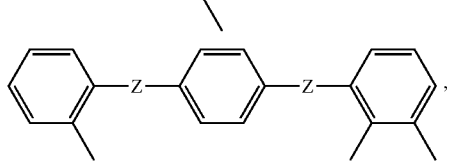
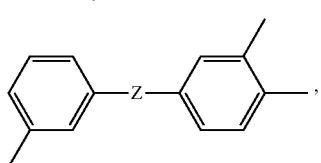
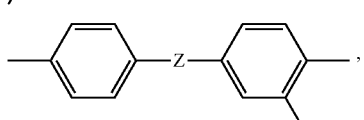
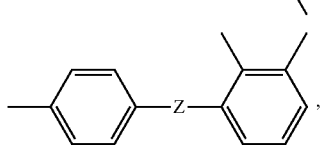
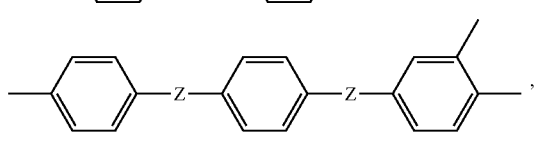
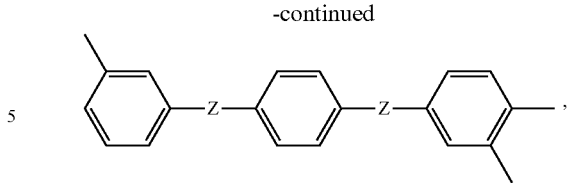
wherein Z is O, S, C(=O), CH(OH), S(=O)$_2$, Si(CH$_3$)$_2$, CH$_2$, CF$_2$, C(CH$_3$)$_2$, C(CF$_3$)$_2$, or C(=O)NH;
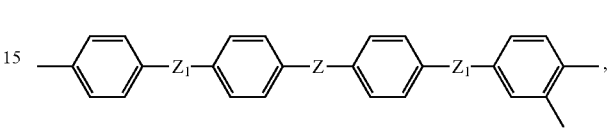
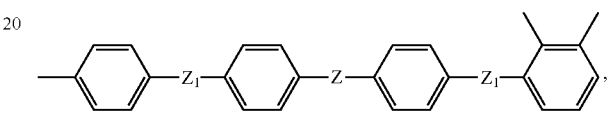
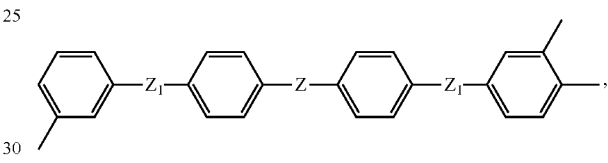
wherein:
Z$_1$ is O, S, S(=O)$_2$, or C(=O); and Z is as defined above;
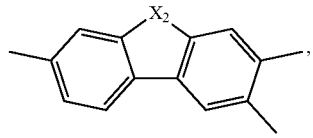
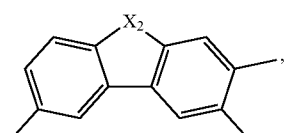
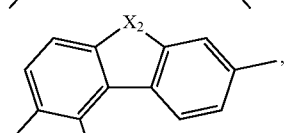
wherein:
X$_2$ is S, O, NR, Se, or SiR$_2$;
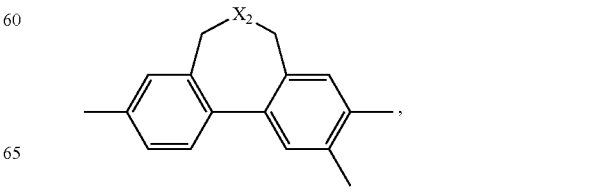

-continued
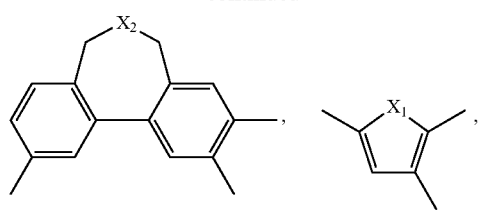
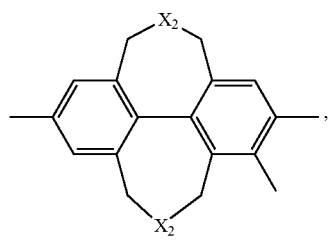
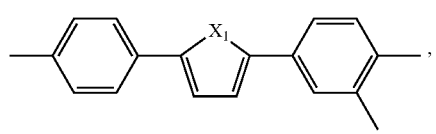
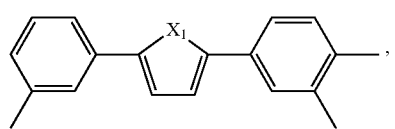
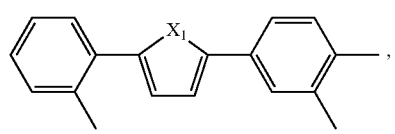
wherein:
$X_1$ is N, O, or S; and $X_2$ is as defined above;
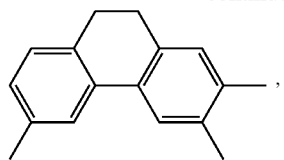
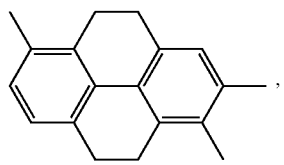
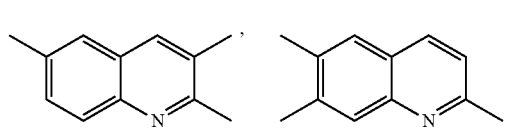
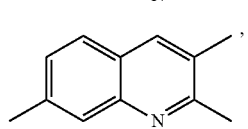
-continued
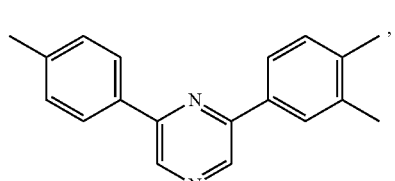
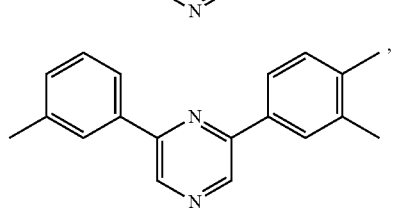
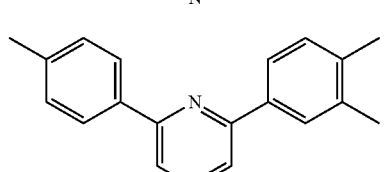
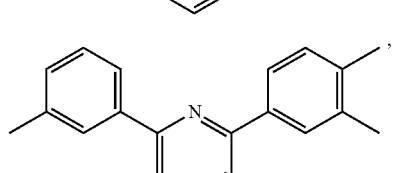
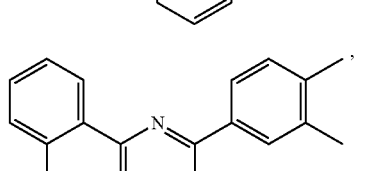
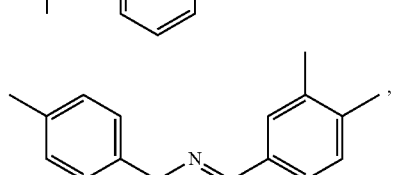
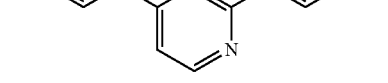

-continued
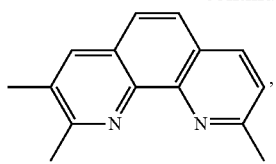
and
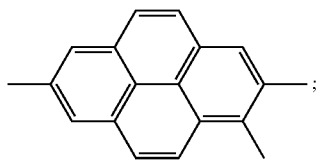
;
and
X and Y are selected from O, S, NH, and N-phenyl.
15. The polymeric material of claim 1 wherein:
Ar$_1$ is selected from the following structures:
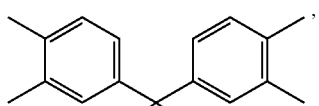
,
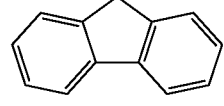
,
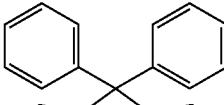
,
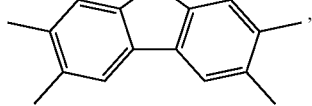
, 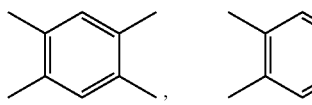,
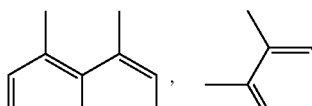
, 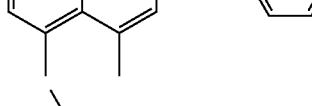,
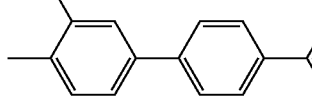
,
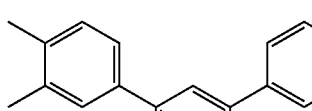
,
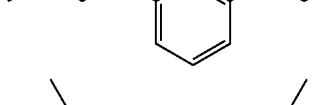
,
-continued
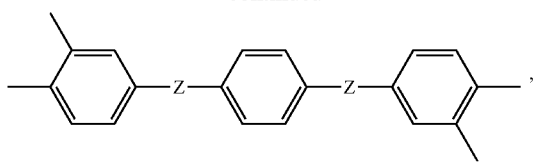
,
wherein Z is O, C(=O), S(=O)$_2$, CH$_2$, CF$_2$, C(CH$_3$)$_2$, or C(CF$_3$)$_2$; or
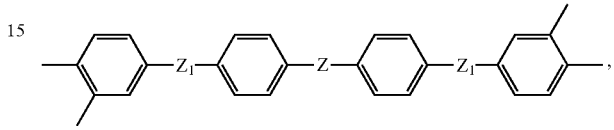
,
wherein:
Z$_1$ is O, S, S(=O)$_2$, or C(=O); and Z is as defined above;
Ar$_2$ is preferably selected from the following structures:
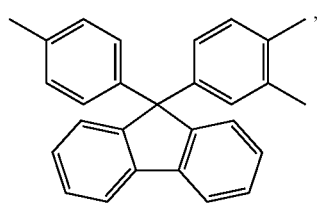
,
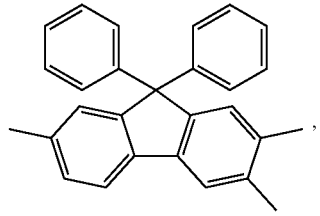
,
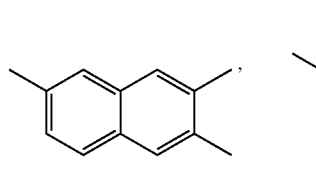
, 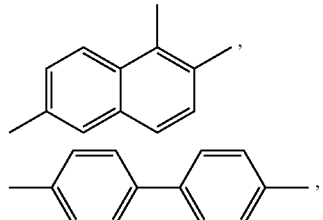,
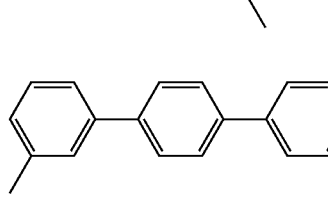
,
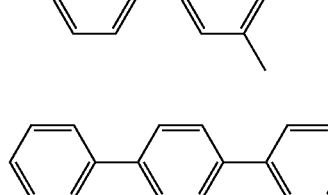
,
,

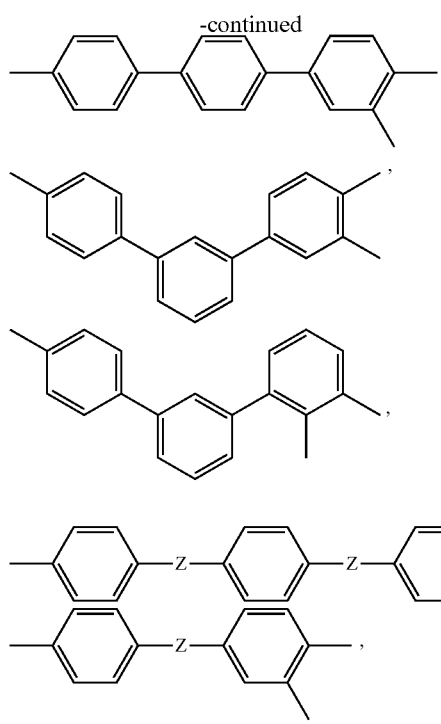
wherein Z is O, S, C(=O), CH(OH), S(=O)$_2$, CH$_2$, CF$_2$, C(CH$_3$)$_2$, or C(CF$_3$)$_2$,
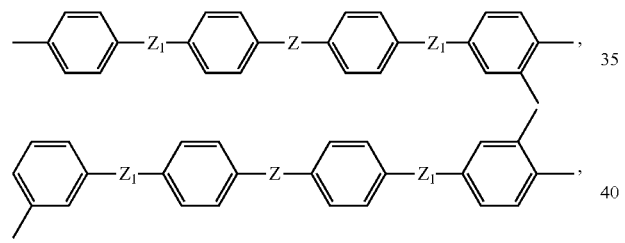
wherein:
Z$_1$ is O, S, S(=O)$_2$, or C(=O); and Z is as defined above; and X and Y are selected from O, S, and N-phenyl.
16. The polymeric material of claim 1 wherein:
Ar$_1$ is selected from the following structures:
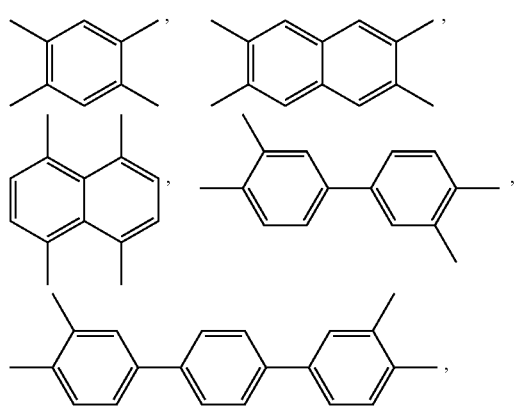
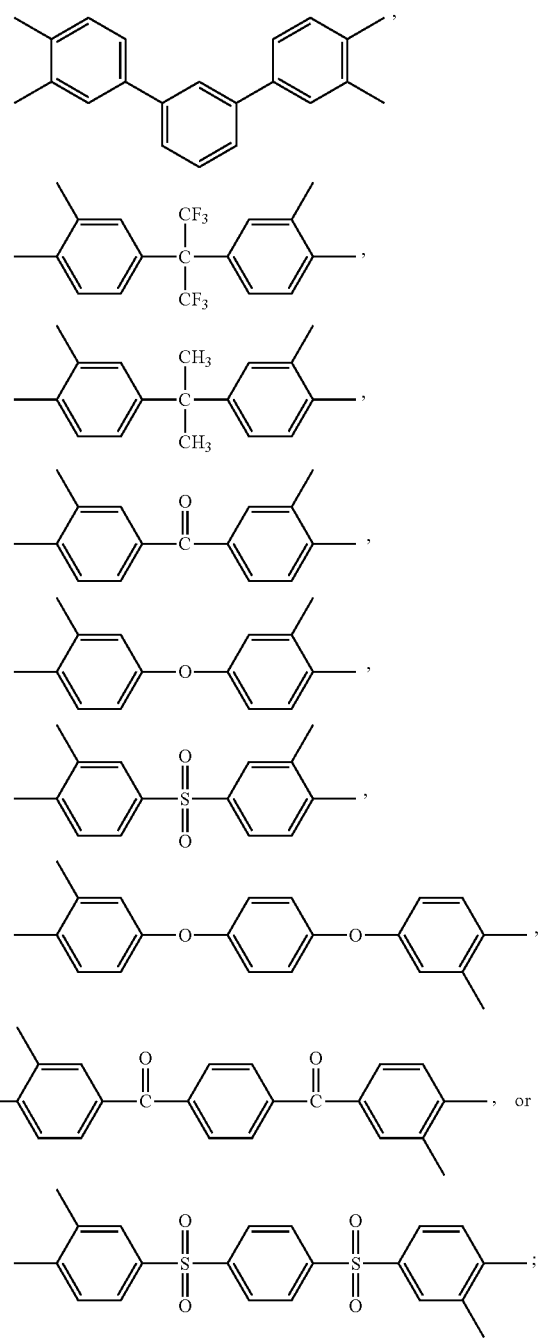
Ar$_2$ is selected from the following structures:
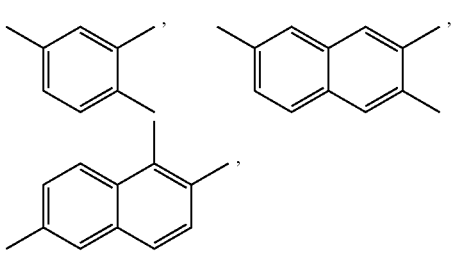

-continued
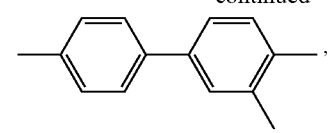
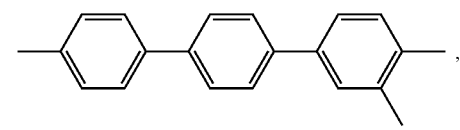
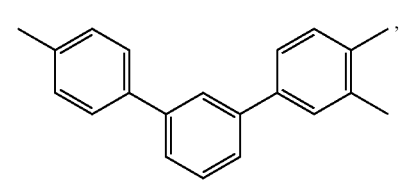
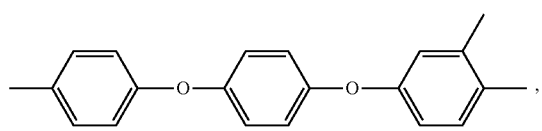
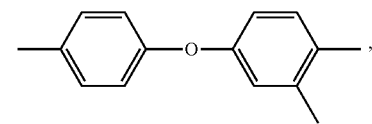
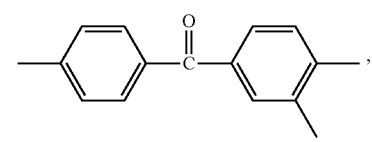
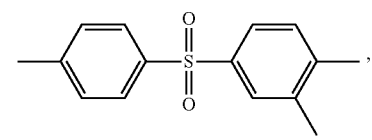
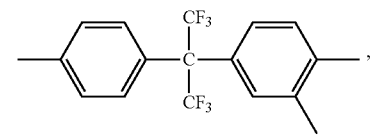
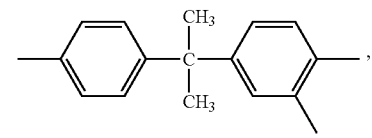
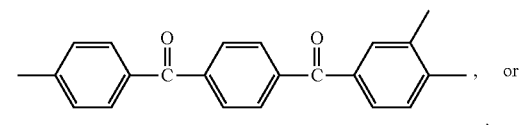, or
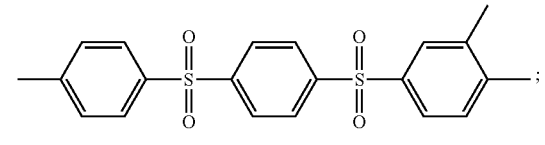;
and X and Y are selected from O, S, and N-phenyl.
17. The polymeric material of claim 1 wherein:
$Ar_1$ is selected from the following structures:
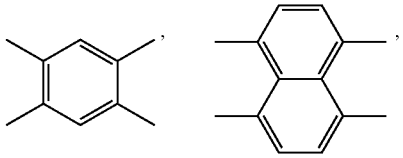
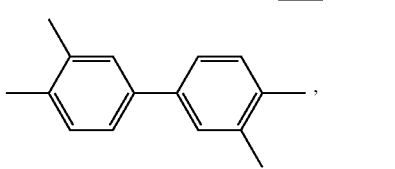
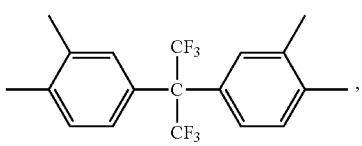
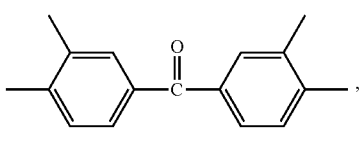
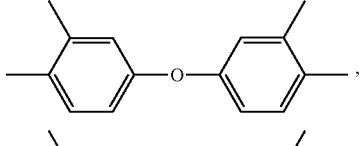
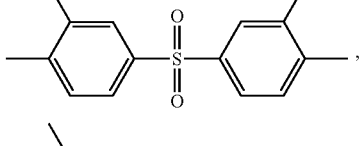, or
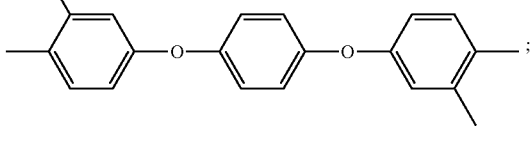;
$Ar_2$ is selected from the following structures:
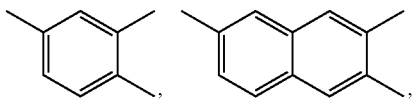
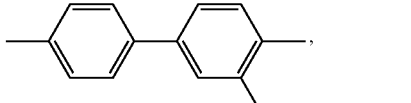
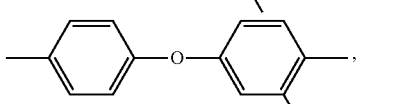
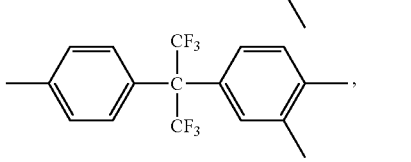

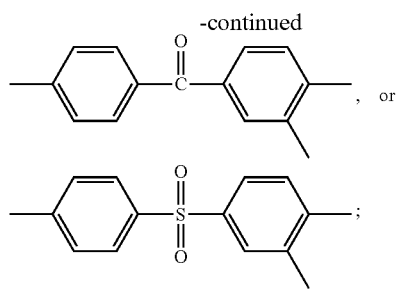, or

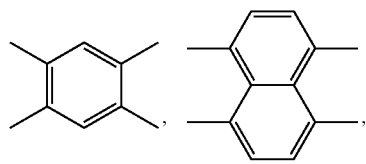;

and X and Y are selected from O, S, and N-phenyl.

18. The polymeric material of claim 1 wherein:
Ar₁ is selected from the following structures:

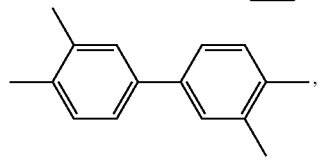,

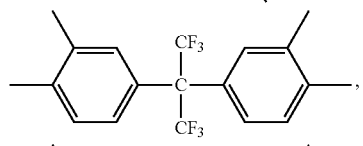,

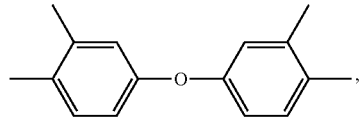,

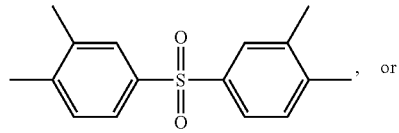, or

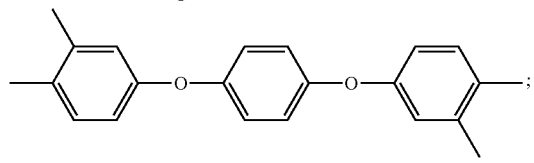;

Ar₂ is selected from the following structures:

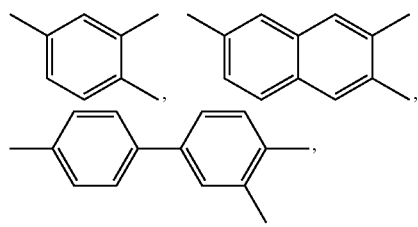

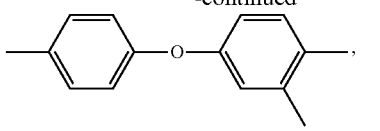,

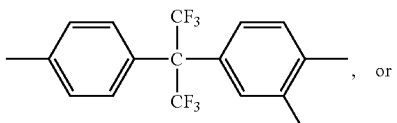, or

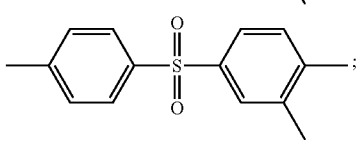;

and X and Y are selected from O, and N-phenyl.

19. The polymeric material of claim 18 wherein:
Ar₁ is

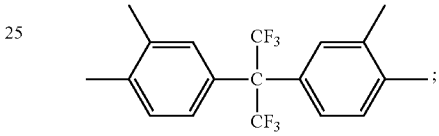;

and
Ar₂ is

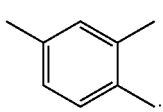.

20. The method of claim 4 wherein
Ar₁ is

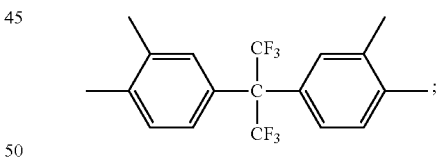

Ar₂ is

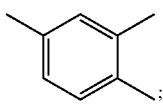;

and o-FG is selected from the group consisting of —OH and —NH-phenyl.

* * * * *

UNITED STATES PATENT AND TRADEMARK OFFICE
CERTIFICATE OF CORRECTION

PATENT NO. : 8,753,426 B2  
APPLICATION NO. : 13/566535  
DATED : June 17, 2014  
INVENTOR(S) : Shiying Zheng and Jeffrey Raymond Quay Page 1 of 1

It is certified that error appears in the above-identified patent and that said Letters Patent is hereby corrected as shown below:

In the Claims

Column 73, Line 15

In claim 3 delete "(CFA," and insert -- $(CF_2)_n$, --

Signed and Sealed this  
Twenty-first Day of April, 2015

Michelle K. Lee  
*Director of the United States Patent and Trademark Office*